United States Patent [19]
Gu et al.

[11] Patent Number: 6,097,853
[45] Date of Patent: Aug. 1, 2000

[54] USER DEFINABLE WINDOWS FOR SELECTING IMAGE PROCESSING REGIONS

[75] Inventors: Xueming Henry Gu; Sanjay Devappa Rai, both of Ft. Lauderdale; Ziqiang Huang, Weston, all of Fla.

[73] Assignee: Da Vinci Systems, Inc., Ft. Lauderdale, Fla.

[21] Appl. No.: 08/912,662

[22] Filed: Aug. 18, 1997

Related U.S. Application Data

[60] Provisional application No. 60/025,936, Sep. 11, 1996.

[51] Int. Cl.[7] ................................................. G06K 9/20
[52] U.S. Cl. .......................................... 382/282; 382/199
[58] Field of Search .................................... 382/282, 164, 382/167, 199, 197, 293, 295; 358/453, 452; 707/520, 521; 345/342; 348/564, 565, 566

[56] References Cited

U.S. PATENT DOCUMENTS

| | | | |
|---|---|---|---|
| 4,710,800 | 12/1987 | Fearing et al. | 358/22 |
| 4,782,384 | 11/1988 | Tucker et al. | 358/22 |
| 4,908,874 | 3/1990 | Gabriel | 382/41 |
| 4,952,051 | 8/1990 | Lovell et al. | 352/87 |
| 5,050,984 | 9/1991 | Geshwind | 352/38 |
| 5,051,928 | 9/1991 | Gruters | 364/521 |
| 5,252,953 | 10/1993 | Sandrew et al. | 345/122 |
| 5,327,501 | 7/1994 | Kato | 382/44 |
| 5,450,500 | 9/1995 | Brett | 382/162 |
| 5,495,540 | 2/1996 | Frankot et al. | 382/294 |
| 5,506,946 | 4/1996 | Bar et al. | 395/131 |
| 5,506,949 | 4/1996 | Perrin | 395/152 |
| 5,530,774 | 6/1996 | Fogel | 382/154 |

OTHER PUBLICATIONS

The Renaissance 8:8:8™ User's Guide (Version 1.7, Sep. 1, 1996), Chapter 5.
The DaVinci Renaissance 8:8:8™ User's Guide (Version 1.7, Sep. 1, 1996), Chapter 6.
Adobe Photoshop™ User Guide (Version 4.0, pp. 146–151).

*Primary Examiner*—Yon J. Couso
*Attorney, Agent, or Firm*—Morris, Manning & Martin, LLP

[57] ABSTRACT

A system and methods for creating user definable windows for applying image processing, particularly useful in a post-production color correction equipment. The luminance values of a key image are captured in a key frame buffer. The key image is edited in a "paint" mode to enhance the luminance values or eliminate regions of the image, to define a region of interest. The key image is then converted to a 1-bit image. The 1-bit image is vectorized to derive a user defined window. The user defined window, comprising a closed polygon, is converted on a frame-by-frame basis to a bit map matte that is keyed with image processing such as color correction values. The user defined windows can be edited and stored and recalled for use in other frames. A user defined window for a first frame of a scene can be transformed or morphed into a user defined window for a final frame of a scene, with the system automatically interpolating between the beginning window and the ending window so that the window is automatically moved, resized, and changed in geometry during the succession of frames in a scene.

71 Claims, 42 Drawing Sheets

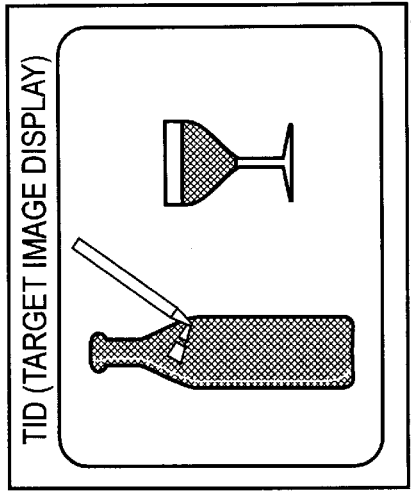

ORIGINAL COLOR IMAGE

FIG. 3A

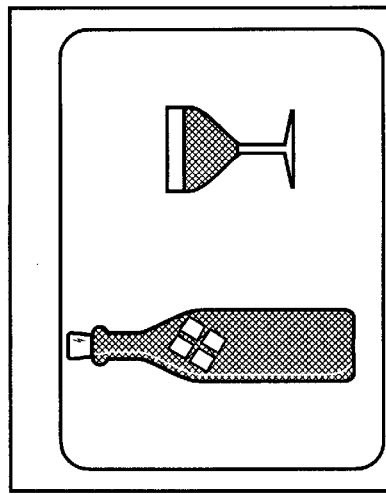

ADJUST LUMINANCE TO OBTAIN HIGH CONTRAST IMAGE

FIG. 3B

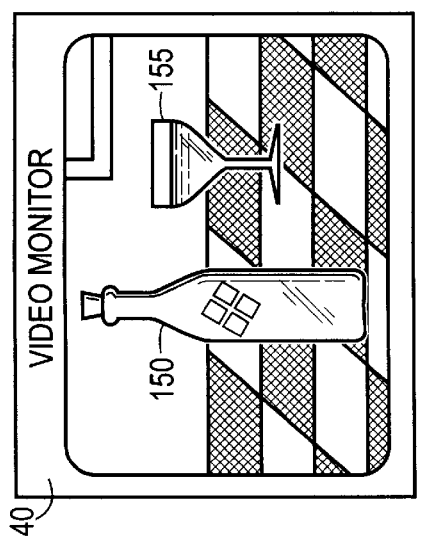

USE BRUSH & OTHER TOOLS TO ISOLATE AREA OF INTEREST (BOTTLE ONLY, WITHOUT CORK)

FIG. 3C

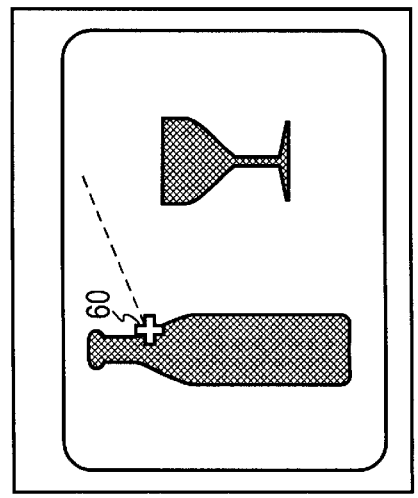

SELECT HIGH CONTRAST REGION FOR VECTORIZING; SELECT NUMBER OF POINTS FOR VECTORIZED REGION

FIG. 3D

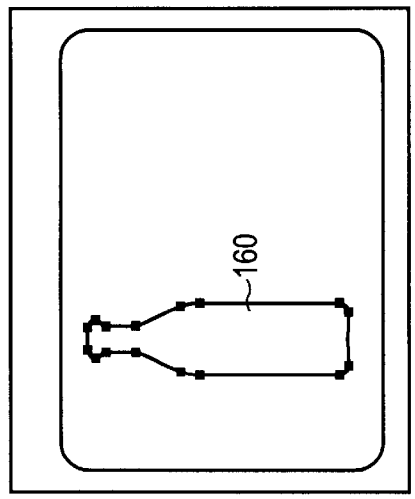

VECTORIZED KEY WINDOW CREATED AUTOMATICALLY, E.G. WITH n=16 POINTS, PIECEWISE LINEAR

FIG. 3E

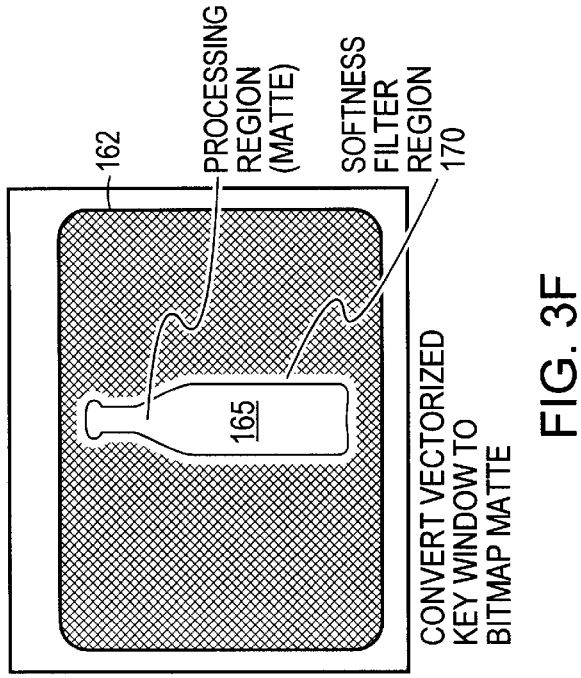

CONVERT VECTORIZED KEY WINDOW TO BITMAP MATTE

FIG. 3F

CONTROL WINDOW, KEYSTORE MODE

KEYSTORE MODE, EDIT BRUSH WINDOW

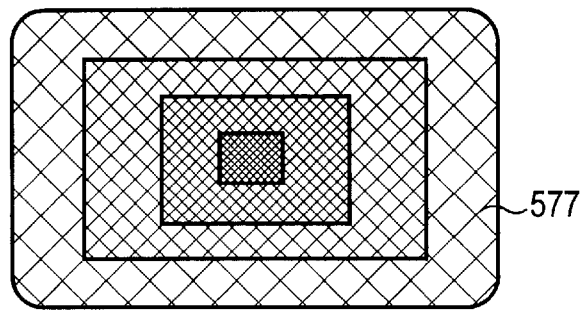
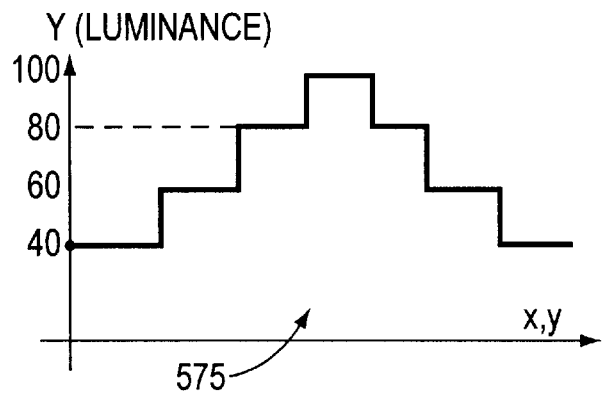
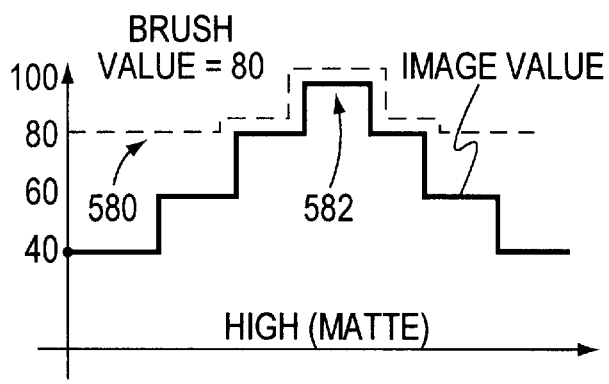
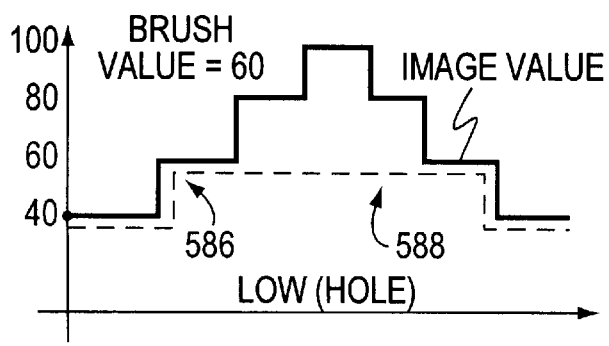
FIG. 11

POST-VECTORIZING CONTROL WINDOW, EDIT WINDOW MODE

WINDOW EDIT WINDOW, SINGLE POINT EDIT MODE

WINDOW EDIT WINDOW, MULTI POINTS EDIT MODE

WINDOW EDIT WINDOW, WINDOWS EDIT MODE

KEYSTORE MODE, ORIGINAL 10-BIT (LUMINANCE ONLY) IMAGE

KEYSTORE MODE, PARAMETER ADJUSTMENTS

KEYSTORE MODE, BRUSH EDITING OF KEY IMAGE

VECTOR MODE, PRE-VECTORIZING
1 BIT KEY IMAGE, READY TO VECTORIZE

SINGLE POINT EDIT MODE OPERATION, ADDING POINT

WINDOW EDIT WINDOW, MULTI POINTS EDIT MODE, SELECTION OF POINTS

WINDOW EDIT WINDOW, MULTI POINTS EDIT MODE,
SHIFT OF SELECTED POINTS

WINDOW EDIT WINDOW, MULTI POINTS EDIT MODE,
SIZING OF SELECTED POINTS

WINDOW EDIT WINDOW, MULTI POINTS EDIT MODE,
ROTATION OF SELECTED POINTS

WINDOW EDIT WINDOW, WINDOWS EDIT MODE, SELECTION OF WINDOW

WINDOW EDIT WINDOW, WINDOWS EDIT MODE,
SHIFT OF SELECTED WINDOW

WINDOW EDIT WINDOW, WINDOWS EDIT MODE,
SIZE OF SELECTED WINDOW

WINDOW EDIT WINDOW, WINDOWS EDIT MODE,
ROTATION OF SELECTED WINDOW

WINDOW EDIT WINDOW, WINDOWS EDIT MODE,
ZOOM MODE

WINDOW EDIT WINDOW, WINDOWS EDIT MODE,
ZOOM MODE, WINDOW ROTATED OFF

WINDOW EDIT WINDOW, WINDOWS EDIT MODE,
ZOOM MODE, WINDOW ROTATED BACK ON

USER DEFINABLE WINDOWS FOR SELECTING IMAGE PROCESSING REGIONS

This application claims benefit to provisional application Ser. No. 60/025,936, filed Sep. 11, 1996.

TECHNICAL FIELD

The present invention relates generally to image processing, and more particularly relates to a system and methods that allow a user of an image processing system such as a scene by scene color corrector to define a window derived from a key image for purposes of applying image processing only to selected regions of an image.

BACKGROUND OF THE INVENTION

In certain types of image processing systems, especially color correction systems employed in post-production equipment, system operators observe an image on a video monitor, adjust color and other parameters of the image until it is aesthetically satisfactory, store the parameters in system memory, and apply the parameter corrections to a sequence of images forming a scene. Various types of image processing are often employed to create, enhance, compress, filter, or otherwise modify characteristics of an image.

In a video signal color correction system, color corrections of motion picture film and/or video tape are typically made on a scene-by-scene basis. A "scene" is a sequential collection of images shot from the same camera, having the same viewpoint, composed in a certain way, etc. A system operator or "colorist" views a selected exemplary image or frame from a scene. The colorist then applies color corrections via a control panel to adjust video parameters such as hue, saturation, luminance, etc. of a frame image being viewed. The correction settings are stored in system memory.

After the colorist is satisfied with the adjustments he or she has made to the selected frame, the correction system, which is typically computer-controlled, applies the stored color corrections to each frame in the scene one at a time. The color-corrected frames of the scene are then recorded on film or videotape. The steps are repeated for other scenes in the film or video tape, often with different correction settings stored for different scenes. This process creates a color-corrected master film or video tape that reflects color adjustments to all frames in all scenes.

Devices are known in the art for defining a region of an image for applying one set of color corrections, with other regions of the image receiving another, separate set of color corrections. Such devices are useful when it is desired to isolate a certain area of an image to receive special image processing. For example, in color correcting a soft drink commercial it may be desirable to isolate the beverage can from the remainder of the image so as to make the colors of the beverage can stand out from the rest of the image.

U.S. Pat. No. 4,710,800 to Fearing et al. describes an apparatus for allowing operator selection of a color region of a video image based on color. The patent describes a system for generating and positioning a cursor on a video monitor to allow selection of a color region as defined by a particular hue as opposed to a geometric region. Circuitry responsive to the cursor location selects one of a plurality of color correction circuits to become operative for directing video parameter corrections such as hue, saturation, and luminance only to regions in the video image corresponding to the hue selected by the cursor. This system therefore allows application of image processing, namely color correction, to all regions of the image bearing the color that was selected with the cursor. While this system is suitable for allowing delineation of regions for receiving image processing based on color, it does not operate on the geometry of regions.

U.S. Pat. No. 4,782,384 to Tucker et al. describes a video parameter control system operative for selecting a spatial region or window in a video image for correction. A track ball allows selection of a spatial region by dragging a cursor to draw a window around an object of interest in the picture. The operator then adjusts controls that affect only the selected window or region. A first set of correction signals is stored for the selected region, and a separate second set of correction signals is stored for areas of the picture outside the selected region, thereby allowing multiple sets of corrections for a given frame. Although the Tucker et al. patent provides some teaching regarding movement of the window over a plurality of frames to effect a dissolve, the region is essentially static and the geometry is invariably that of a box.

Certain prior art image processing computer software, e.g. ADOBE PHOTOSHOP™, manufactured by Adobe Systems Corporation, Mountain View, Calif., employs edge detection algorithms for detecting color regions and creating paths or Bezier curves between points. Such edge detection algorithms rely upon color differences between regions to define the paths and produce odd results if there are discontinuities in the edges of a region, or if the colors defining the regions are not sufficiently dissimilar. The PHOTOSHOP™ software, for example, vectorizes an entire color region and provides no control over the number of points in the region. There is no way to modify a defined region except by changing region qualification parameters. For these and other reasons, this software is not suitable for real time applications such as a scene by scene color corrector.

Image region selecting capability known as the "Simple Windows" and "Power Windows" features are extensions of the foregoing Tucker et al. system. These features are provided in the RENAISSANCE 8:8:8™ digital color enhancer system, manufactured by the assignee of the present invention. In the Simple Windows feature, a window is a predetermined regularly shaped area or region of the video image that can be varied in size. The colors within the window are independently adjustable from the colors of the rest of the image. Primary or secondary color enhancements can occur both inside and outside a window, and each adjustment is independent of the other. The Simple Windows feature entails use of a simple geometric form—a square or rectangle—for a window shape. A Simple window is always rectangular and is defined by four points. Lines defining the window are always straight vertical or horizontal. Furthermore, there are no soft edges, that is, there is a sharp delineation between the inside and outside of the window, which sometimes produces undesirable image effects at the boundaries.

The more recent "Power Windows" feature provided more choices of the shape for the window, for example, circular, rectangular, half screen, split in the middle, etc. Windows comprising multiple squares, multiple diamonds (essentially rotated squares), horizontal and vertical bars, circles, ellipses (a warped circle), etc. can be selected by the operator. The sizes of these windows could be varied as long as the shape remained regular. Furthermore, a "soft edges" feature was provided so as to provide a gradual transition in color correction from the inside to the outside of the selected window. Power Windows, however, are still confined to regular shapes, with predefined geometry.

Many prior art systems do not effectively handle a "dissolve", where the region of interest changes in size, shape, location, and/or geometry over several frames in a scene. An object or area of interest often moves around in an image or changes geometry during a number of frames in a scene. For example, consider the case of a bottle and a glass in a scene where only the color characteristics of the bottle are desired to be adjusted. During the scene, the bottle (viewed from the side) is lifted from an initial upright position to a tilted position, rotated so that the mouth of the bottle is facing the viewer, moved toward the glass, and poured into the glass. In this scenario, the geometry of the bottle—the overall outline—changes from essentially a side view of the bottle (an irregular shape) to a top view of the bottle (a round shape). The bottle, which is not a "regular" shape, also changes in location and size.

Prior art systems that allow the definition only of pre-defined geometric areas are incapable of defining regions that move and change size and geometry with respect to a number of frames in a scene. Moreover, most objects in the world are not regularly shaped in the sense of being only rectangles, circles, etc. Accordingly, there is a need for a system that allows definition of an arbitrarily shaped window in accordance with a region of interest in an image, and that provides the capability for that region of interest to move as well as change size and geometry over a plurality of frames.

SUMMARY OF THE INVENTION

The present invention employs the concept of a key well known in the television arts to define regions for receiving image processing. A good example of the use of a key is that of a television weatherman superimposed on a map. The weatherman is typically shot with a video camera standing in front of a solid blue color background. Other equipment automatically generates the video weather map. Image processing equipment is readily able to discern the outline of the weatherman relative to the blue background by use of color values. The image of the weatherman, which is called a "key", is overlaid on the map by essentially providing transparency for the blue regions of the key outside the weatherman's body. This allows the weather map to show through in the blue areas, and superimposes the weatherman on top of the map.

Related principles are employed in the present invention for defining a user defined key corresponding with a predetermined region of an image and utilizing the key to derive a user defined window. Image processing such as a set of color corrections is applied within the region defined by the key-derived user defined window. A separate second type of image processing, for example a second set of color corrections, is applied in regions outside the user defined window.

Briefly described, the present invention comprises a system and methods that allow creation of user definable windows for selecting image processing regions. These windows can vary in geometry, size, and location during a number of frames in a scene. The invention is particularly useful for allowing a colorist in a video image color correction system to define windows for selecting regions for color correction. The user typically starts by capturing an exemplary image or frame of a scene for use as a "key image" or "key frame". The key image is manipulated by adjusting parameters such as gain, clip, and limit to derive one or more key regions of the image to serve as keys. The key regions are vectorized and stored in a computer system's memory in association with the key frame. The vectorized keys, which are then called "user defined windows", are then used during a plurality of frames for defining regions to receive image processing such as color correction, data compression, noise reduction, etc.

For use in a scene having a number of frames, the user defines a window for a first frame of the scene and a window for the last frame of the scene. The user may use the last frame as a key image and derive another key for defining the final window, can use and modify the window for the first frame for defining the final window, or can use modify any other previously defined window. The system then interpolates or "morphs" the window of the first frame of the scene into the window of the final frame of the scene by linear interpolation across each frame of the scene. The windows are generated on a real time, frame by frame basis so that the color correction or other image processing can be viewed by the colorist on a video monitor. The windows thus change during the sequences of frames in the scene to compensate for changes in the size, geometry, and position of the area of interest in the scene.

More particularly described, one aspect of the invention relates to a computer-implemented process for applying image processing to a scene of images comprising a plurality of frames, the process being carried out in a computer system coupled to an image source, the computer system including a processor, a display, and a memory. The process includes steps for deriving at least one user defined window comprising a continuous polygon corresponding to a region of interest in a key frame image. The user defined window as thus derived is stored in the memory. The user may use this window or retrieve another window from memory, and display the selected user defined window on the display. This window becomes a first user defined window. In response to user commands, the selected first user defined window is edited or modified to define a first user defined window corresponding to a first frame of the scene. The user then may define a new user defined window or retrieve a selected second user defined window from the memory, and display the window. In response to user commands, the selected second user defined window is modified or edited to define a second user defined window corresponding to a final frame of the scene. Then, the first user defined window is automatically transformed into the second user defined window during playback of the scene. Image processing is applied within the region defined by the user defined window(s) for each frame of the scene during such playback.

In order to obtain a key for deriving the user defined windows, in response to a user command, a key frame image from a selected image of the scene is captured and stored in the memory. In response to user commands, the region of interest in the key frame image is isolated. Then, in response to a user command, the isolated region of interest in the key image is vectorized to derive the at least one user defined window.

The step of isolating the region of interest in the key frame image preferably comprises adjusting video parameters of the key frame image to isolate the region of interest according to video characteristics. Adjustment of the video parameters of the key frame image is effected in response to the use of gain, clip, and limit user controls.

The key frame image in the disclosed embodiment is stored as an array of 10-bit luminance values. The 10-bit luminance values are preferably converted to a 1-bit high contrast image prior to vectorizing.

The step of isolating the region of interest in the key frame image also preferably comprises adjusting regions of the key frame image according to geometric characteristics. Adjustment of regions of the key frame image according to geometric characteristics is effected in response to the use of a brush tool by the user.

After the region of interest is isolated and vectorized to obtain a user defined window, the characteristics of the user defined window can be edited to allow the user to adapt the window to the outline of the region of interest. Modification of a user defined window comprises adjusting the number of points representing a window, and adjusting the location of one or more selected points of a window.

Advantageously for use in a real time processing environment such as a scene-by-scene color corrector, the operation of automatically transforming the first user defined window into the second user defined window during playback of the scene is carried out at a real time rate. Thus, the user can adjust aspects of the image processing for exemplary frames of a scene and observe the effects of the image processing during playback of the scene on a real time basis.

These and other features and advantages of the present invention may be more clearly understood and appreciated from a review of the following detailed description of the disclosed embodiment and by reference to the appended drawings and claims.

BRIEF DESCRIPTION OF THE DRAWINGS

FIG. 3, consisting of FIGS. 3A through 3F, is an illustrative example of the general method carried out in the present invention of capturing a key, modifying the key, vectorizing to define a window, and devectorizing the window to derive a video matte.

FIG. 11 illustrates aspects of applying a paint brush to an image.

DETAILED DESCRIPTION OF THE DISCLOSED EMBODIMENT

Figure 1:
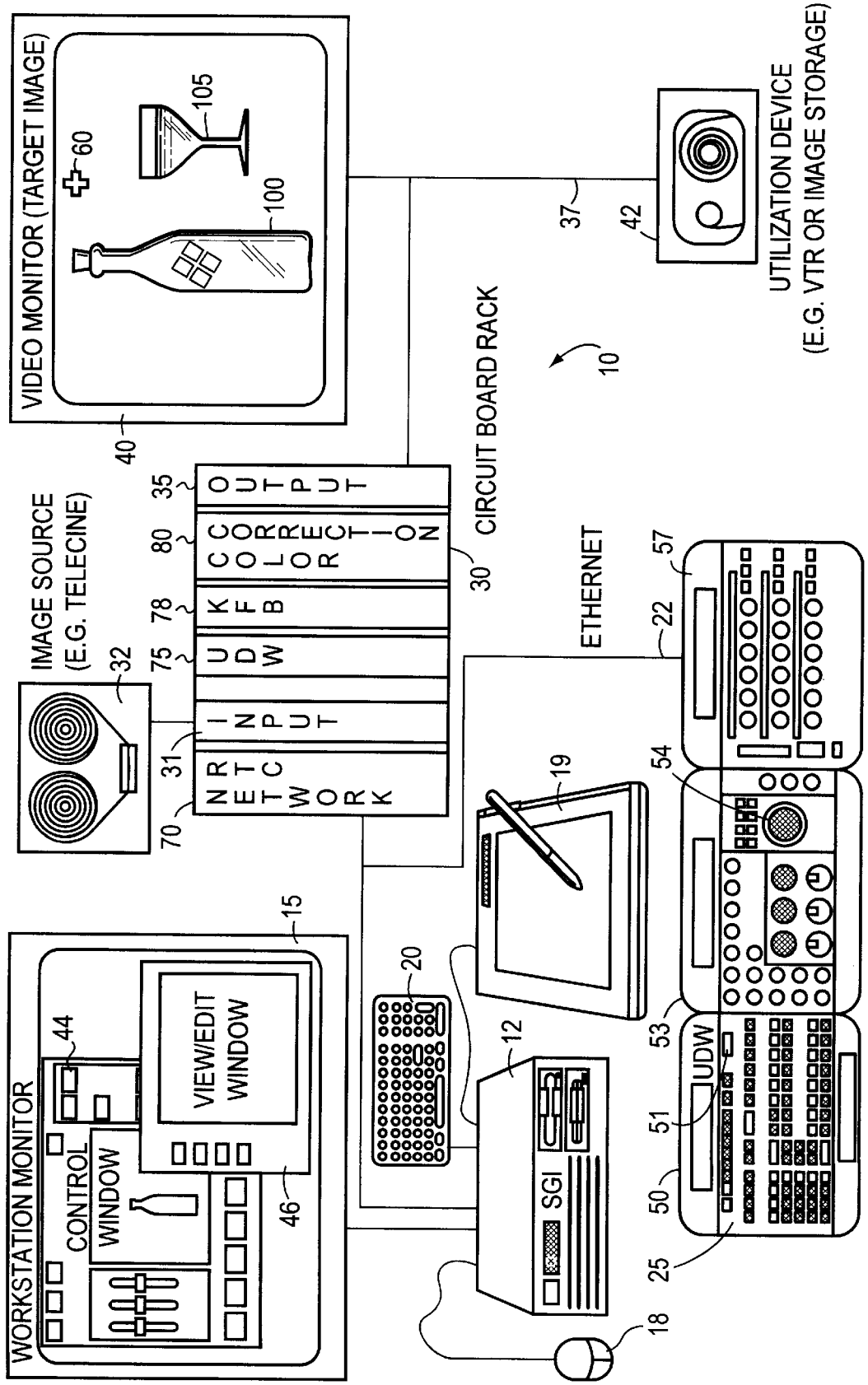
FIG. 1 is a block schematic diagram of a system for creating user definable windows for applying image processing, constructed in accordance with the preferred embodiment of the present invention, shown in connection with a scene by scene color correction system.

Referring now to the drawings, in which like numerals indicate like elements or steps throughout the several figures, FIG. 1 illustrates an image processing system 10 constructed in accordance with the preferred embodiment of the present invention, suitable for carrying out the claimed methods for defining windows for applying image processing.

Preferred Embodiment of Color Correction System

Although the present invention will be described in the context of a scene by scene digital color corrector, it will be understood that the inventions described herein are not limited to video color correction and are equally useful in other types of systems where there is a need for application of image processing such as image compression, image filtering, noise suppression, animation, and any other type of processing. In particular, the invention is useful in any image application where there is a need to define a region of an image for receiving one type of data processing and another region for receiving a different type of data processing. However, in the context of the disclosed embodiment, the inventions are particularly useful in a scene by scene color corrector where a plurality of frames comprising a scene must be viewed and adjusted to create or modify a video program such as a movie, commercial, television program, etc.

As used herein, the term "key" is used to describe a predetermined region of an image that is used to define or derive a user defined window which is stored in a vector format, as well as the video matte produced by devectorizing a user defined window which is employed to selectively apply image processing to image regions in accordance with the matte.

An image processing system 10 constructed in accordance with the preferred embodiment comprises several basic components—a computer-based workstation 12 including monitor 15 and keyboard 20, a colorist's control panel 25, a digital color correction system 30, a source of images 32, a video display 40, and a destination for corrected images 42. The workstation 12 preferably includes pointing devices such as a mouse 18 and/or graphics tablet 19. The workstation 12 is coupled for data communications via a network connection 22, preferably a high speed network such as Ethernet, to the color correction system control panel 25 and color correction system 30.

The source of images 32 may be a telecine, video tape player, or a digital video storage medium. The source is connected to an Input circuit board 31 in the color correction system 30. It will be understood that the image signals internal to the color correction system 30 are digital, and are stored and manipulated in a digital video format such as the International Radio Consultant Committee (CCIR) promulgated Recommendation No. 601-1 which defines a standard set of digitized color signals. CCIR Recommendation 601-1 (1986) is hereby incorporated by reference. It is known in the art to take CCIR 601-1 digitized signal streams, convert same to corresponding RGB signals (in analog or digital domains), and then to perform the primary and secondary color corrections and modifications on the resultant signals. The corrected or modified signal can then be passed through a signal matrix and reconverted to a digital bit stream through use of an analog to digital converter. The standard signals defined in Recommendation 601-1 essentially consist of a luminance signal Y and two color difference signals (R–Y) and (B–Y). It is well known that, since the luminance signal contains information on levels of red, green and blue (RGB), the three standard signals can be used to reproduce the RGB levels for any given set of samples.

An Output circuit board 35 is also provided as a part of the color correction system 30, and typically converts the digital signals within the color correction system back into analog form for display. Thus, the Output circuit 35 is coupled via a video signal cables 37 to a video monitor 40 and to a utilization device 42 such as a video tape player or other image storage device. Alternatively, the corrected digital signals can be stored in digital form in a digital data storage device coupled to the system.

The preferred workstation 12 is an INDY™ model workstation manufactured by Silicon Graphics, Inc. (SGI). The preferred workstation includes an R4600 RISC processor operating in excess of 133 MHz, internal 24-bit XL color graphics (with RGB single or double buffer color indexes), a digital video input port capable of storing 640×480×30 fps to memory, 2 serial and 1 parallel data port, an Ethernet network port, a fast SCSI-2 data port, at least 32 megabytes of RAM, and a 1.0 or larger Gb hard disk. Optionally, a different SGI model workstation could be employed, e.g. one including a video adapter card that allows support and use of multiple monitors. Further details of the preferred workstation are available in the literature supplied by the manufacturer.

The preferred workstation 12 includes on-board display driver circuit, namely, the 24-bit XL color graphics circuitry with RGB double buffer color indexes, which provides video signals to at least one workstation monitor 15. A separate, second video monitor 40 is utilized in the preferred embodiment to display a target image, that is, a full screen representation of the video image being processed in the system. If a workstation model is employed that supports multiple monitors, the second monitor 40 may be connected to the workstation 12.

The preferred graphics tablet 19, which is particularly useful for certain manipulations of key images and vectors as will be described, is a Wacom ArtPad™ or ArtZ™ graphics tablet manufactured by Wacom Technology Corporation, Vancouver, Wash. 98661.

The preferred color correction system 30 is a Da Vinci RENAISSANCE 8:8:8™ digital color corrector manufactured by Da Vinci Systems, Inc., Ft. Lauderdale, Fla. This color correction system includes various circuit board components that are employed to carry out digital video signal processing, and is coupled to the control panel 25. The preferred RENAISSANCE 8:8:8™ control panel 25 comprises three separate panels each having a combination of dedicated keys, soft keys, and soft knobs that provides many simultaneous functions utilized in the color correction process. A dedicated keyboard 50 contains both dedicated and soft keys for system feature control, display/list management, source and destination motion control, editing, special effects features, and the like. This keyboard also contains a slide-out alphanumeric keyboard (not shown) to enter names, comments, and other important session information. Included on this control panel is a "User Definable Windows" (UDW) button or key 51 that is utilized to activate the functions described herein.

It will be understood that the preferred RENAISSANCE 8:8:8™ system includes software that is operative for controlling the image source and destination, and reading and storing frame numbers in association with user-defined scene identifiers or names. Thus, the system is able to provide displays of scene lists that facilitate the user in associating scene identifiers or names with exemplary images from the scene.

The control panel 25 further includes a joyball panel 53, which includes knobs, a trackball 54 for manipulating a cursor, keys for source setup, primary color balance, color grabbing, trackball control, and other effects control. When the windows feature of the present invention is activated, movement of the trackball 54 causes generation of a cursor 60 that is displayed on the video monitor 40. The cursor 60 is utilized to manipulate and select portions of video images displayed on the monitor, as will be described.

Finally, the control panel 25 includes a soft panel 57, which contains knobs and softkeys for dedicated 6-color secondary enhancement, special effects control, dedicated memory keys, and other functions not forming a part of the present invention. It will be understood that the provision of primary and secondary color correction, and sets of primary and secondary color correction, one for regions inside a user defined window and one for regions outside a user defined window, can be set and stored in memory by manipulation of controls on the soft panel 57.

The color correction system 30 includes several circuit boards that provide the functions required to carry out color correction or other types of image processing in the digital domain, and to control input from the image source 32 and utilization or storage in the utilization device 42. These circuits include a real time controller (RTC) circuit 70 with network interface that provides a data communication network interface to the data communication network 22 coupling the color correction system 30 to the workstation 12 and color correction system control panel 25.

The real time controller (RTC) 70 includes a dedicated microprocessor for handling real time events. Real time events occur at the rate of one every 30 millisecond (ms), so as to maintain an event rate corresponding to at least a 33 frames per second (fps) display rate. Data comprising an events list is provided to the RTC 70 via the data communications network 22; this events list is provided to control various functions of components in the system, for example providing a set of color corrections for each frame of a specified scene being processed. In particular, the events list as employed in the present invention includes a data structure that identifies a particular frame number and scene number, information that specifies one or more user defined windows for the particular frame, information identifying color corrections to be applied to areas inside the one or more windows of the particular frame, and information identifying color corrections to be applied outside the window of the particular frame, and other information.

The events list in the preferred embodiment is a data structure having frame numbers as a time reference. The data structure comprises a sequence of data blocks, each block being related to a beginning frame number and an ending frame number. Each block is called a "scene" which corresponds to a continuous segment of film or video shots. Each block also contains a set of color correction parameters and window parameters. The color correction parameters include known parameters such as red gain, red gamma, red black, etc., for each RGB color channel. The window parameters include window shape, window size, window location, and other information.

A user definable windows (UDW) generator board 75 constructed as described herein includes a dedicated high speed microprocessor that converts vectorized user defined windows into a video matte or key on a real time basis at the real time event rate. The RTC circuit 70 provides the vector representations of the windows to the UDW board 75 at the real time event rate.

A key frame buffer (KFB) circuit board 78 stores a video image from the image source 32, or from any other digital storage system, in a high speed memory. This image is then utilized in accordance with methods described herein to derive a vector representation of any user defined windows. Keys for vectorizing may be obtained directly from the image source 32 or be retrieved from prestored images stored in the memory of the workstation 12.

Color correction circuit 80 carries out digital color correction and other video parameter adjustment functions associated with the color correction system 30. The block in FIG. 1 identified as the color correction circuit 80 includes all of the remaining functions of the preferred RENAISSANCE 8:8:8™ digital color correction system 30, and will not be discussed further. Details of the operations and functions of the preferred color correction system 30 are available in the literature supplied by the manufacturer.

As will be understood by those skilled in the art, the preferred color correction system 30 is operative to receive video images from an image source such as telecine 32, digitize the video images, capture a digitized image in the KFB board 78, display the captured image on the video monitor 40, receive color corrections entered by the colorist or operator via the control panel 25, impose such color corrections upon video images as they are transferred through the system, and provided corrected output signals via the output board 35 which are employed or stored in a utilization device 42 and/or simultaneously displayed on the video monitor 40.

In carrying out the operations for applying image processing to user defined windows, a system operator or user interacts with the system through the control panel 25, and via the user interface elements of the workstation 12, namely, keyboard 20, mouse 18, graphics tablet 19, and workstation monitor 15. In particular, the workstation 12 executes computer programs for carrying out the computer-implemented methods described herein, and generates displays on the monitor 15 containing windows with user interface elements such as informational displays, control buttons, slider bars, data entry fields, image display areas, etc.

The reader should be careful here to distinguish user-interface "windows" displayed on the monitor 15 generated from execution of computer software for carrying out the invention, from the "user defined windows" for applying image processing. During system use, the workstation monitor 15 will typically be displaying one or more user-interface oriented windows for carrying out the methods as described herein. One such user-interface window is a control window 44, which comprises a display of various buttons and slider controls for manipulation of the key image. Activation of certain commands causes the display of other, secondary windows. One of the secondary windows is a View/Edit Window 46, shown overlapping the control window 44 in FIG. 1. The View/Edit Window 46 is used to display a captured image in greater detail, and to provide certain additional user controls specifically associated with editing of the image.

As will be described further, the system operates in two primary modes—a keystore mode that allows capture, editing and manipulation of a 10-bit and 1-bit key image, and a vector editing mode which allows manipulation of the user-defined vectorized window derived from the key image in the keystore mode. The system operator manipulates controls in the Control Window 44 (of which there are several types), and interacts with the images, vector windows, etc. through various View/Edit windows 46 of different types.

It should be noted that the video image displayed in the video monitor 40 can be displayed within a defined View/Edit window 46 if desired. Since the images provided from the image source are digitized for processing in the preferred RENAISSANCE 8:8:8™ processing system, the system can readily generate digitized video images and provide them in an appropriate format, such as Apple Computer's Quicktime™ video format, MPEG I or II, or other digital video format via the network 22 to the workstation 12. Accordingly, it will be appreciated that any displays described herein where a video image is shown on the video monitor 40 can alternatively be displayed on the workstation monitor 15. Furthermore, any of the functions described in conjunction with a video monitor including generation of a cursor of a display of overlays of user defined window over a video image, display of a key, etc. can also be supplied in a window in the workstation display 15.

Thus, it is to be expected that as more and more image processing of film and video is conducted in the digital domain, as opposed to the traditional analog domain, methods of the present invention will be utilized in strictly digital systems for image storage, retrieval, manipulation, display, and output.

In the disclosed embodiment, however, the results of image processing are viewed on the video monitor 40, while the user interface and controls aspects of the image processing and the invention are carried out through the workstation 12 and its associated monitor 15.

Overview of Method for Creating User Defined Windows

Figure 2:
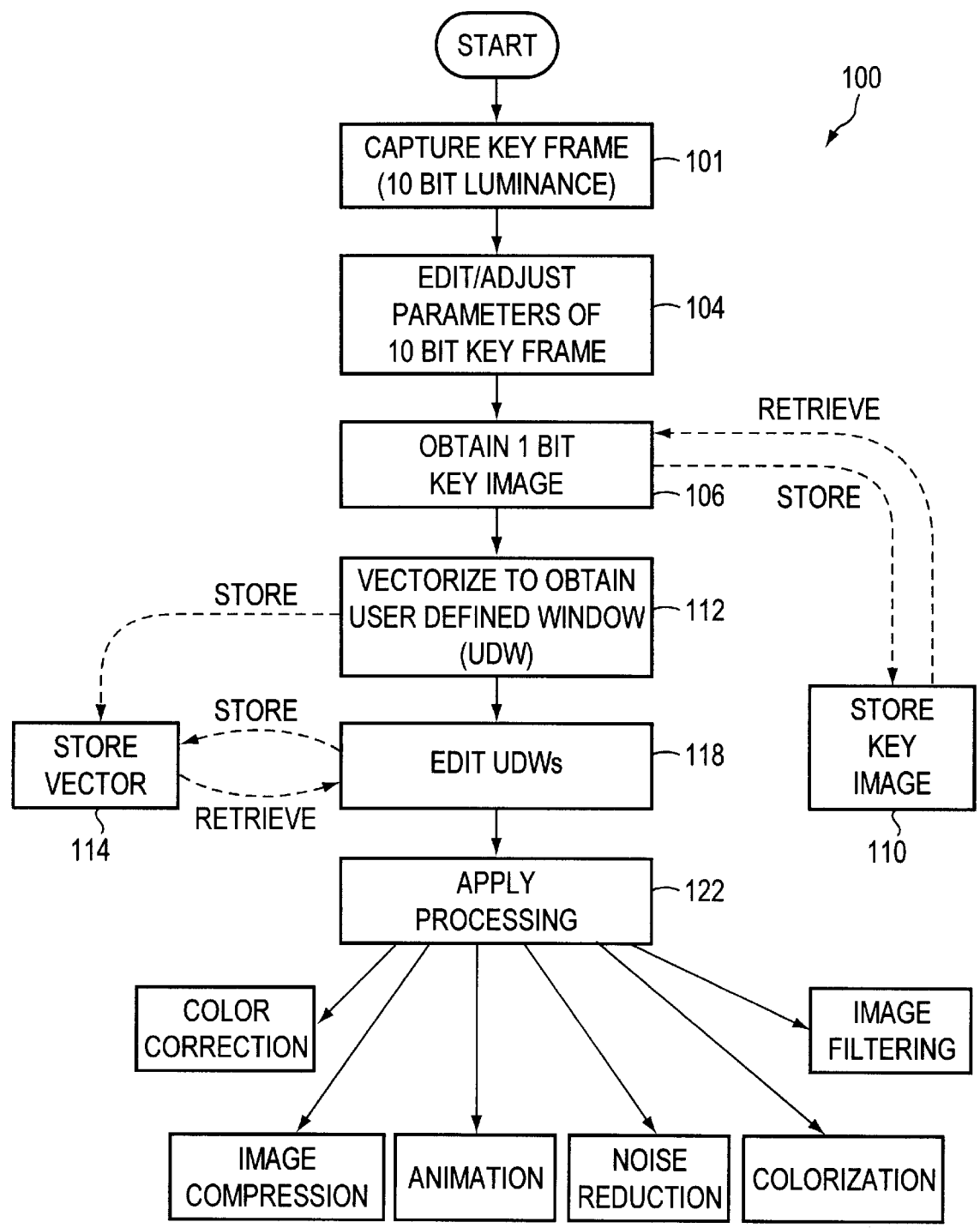
FIG. 2 is a flow chart illustrating the general process of capturing a key frame, editing the key frame to derive a key, deriving a user defined window from the key, and applying image processing in accordance with the user defined window.

Turn next to FIG. 2 for an overview of the general process 100 of capturing a key frame, editing the key frame to derive a key, deriving a user defined window from the key, and applying image processing in accordance with the user defined window.

It should be understood that in the following several discussions of methods involved in the present invention, numerous details are provided such as computer display system elements, aspects of computer program user interfaces, display screens and formats, sample data, etc. in order to provide an understanding of the invention. However, those skilled in the art will understand that the present invention may be practiced without the specific details. Well-known circuits, programming methodologies, and structures are utilized in the present invention but are not described in detail in order not to obscure the present invention.

Certain of the method descriptions which follow are presented in terms of exemplary display images, algorithms, and symbolic representations of operations of data within the computer's memory. As will be known to those skilled in the programming arts, and particularly those skilled in object-oriented programming methodologies, these algorithmic descriptions and graphic exemplary displays are the means used by those skilled in the art of computer programming and computer construction to convey teachings and discoveries to others skilled in the art.

For purposes of this discussion, an "algorithm" is generally a sequence of computer-executed steps leading to a desired result. These steps require physical manipulations of physical quantities. Usually, though not necessarily, these quantities take the form of electrical, magnetic, or optical signals that are capable of being stored, transferred, combined, compared, or otherwise manipulated. It is conventional for those skilled in the art to refer to these signals as bits, values, elements, symbols, characters, images, terms, numbers, or the like. It should be kept in mind, however, that these and similar terms should be associated with appropriate physical quantities inside the computer and that these are merely convenient labels applied to these physical quantities that exist within the computer.

It should also be understood that manipulations within the computer are often referred to in terms such as adding, comparing, moving, etc. which are often associated with mental operations performed by a human operator. It must be understood that no involvement of a human operator is necessary or even desirable in many aspects of the present invention, since the operations described herein (except those specifically identified as origination with the operator or user) are machine operations performed in conjunction with a human operator or user that interacts with the computer. The machines used for performing the operation of the present invention, as will be understood, include general purpose digital computers or other similar computing devices.

Furthermore, it should be kept in mind that there is a distinction between the methods, steps, or operations carried out by a computer, and the method of computation itself. The present invention does not involve a method of computation. The present invention rather relates to methods, steps, or operations for a computer and processing electrical or other physical signals to generate desired physical signals and display results and interactions. As illustrated in FIG. 1, the present invention also relates to a system 10 for performing these operations. Furthermore, it should be understood that the programs, algorithms, etc. described herein are not related or limited to any particular computer or apparatus. Rather, various types of general purpose machines may be used with programs constructed in accordance with the teachings herein, and employed as the workstation 12. Similarly, it may prove advantageous to construct specialized apparatus to perform the method steps described herein by way of dedicated computer systems with hard-wired logic or programs stored in nonvolatile memory such as read only memory.

It is assumed in FIG. 2 that the user has manipulated an image source such as 32 in FIG. 1 and has advanced to a location on a film or videotape to view an exemplary image on a video monitor 40 that is desired for use as a key image. Typically, this will be the first image or last image of a scene, although this is not required and any image could be used.

At step 101, the user enters a command to capture a key frame from the image source; this key frame is captured and stored in digital form in the KFB circuit 78. A key frame at this stage in the disclosed embodiment is a 10-bit, luminance (Y) only image derived from the color information. However, the key frame could also be represented by hue, saturation, or a combination of hue, saturation, and/or luminance information. The key frame image, a gray scale image in the disclosed embodiment, is displayed on the video monitor 40 as it is viewed from the image source; after capture it is displayed in a miniaturized version in an image area in a control window 44 on the workstation monitor.

At step 104, video parameters of the 10-bit luminance key frame may be adjusted by the user in order to isolate a region of interest that will ultimately become a user defined window. These parameters include gain, clip, and limit values. As known to those skilled the art, the gain parameter is a factor that controls overall amplification of the signal and is most often associated with setting the peak and lowest amplitude of the luminance value. The clip parameter relates to the highest and lowest luminance values that are present in the image, and effectively sets signal excursion boundaries. The limit parameter can be used to create a range of luminance values of interest, to permit isolation of a region of interest as lying within a predetermined range of luminance values.

Additionally, a brush tool is provided for manipulation of luminance values, including the addition of luminance by painting or erasure.

The edit and adjustment processes at step 104 are carried out by the operator so as to isolate a particular region of interest in the key frame image based on its video or color characteristics, which typically emerges as a predefined geometric area. The operator continues to add or erase luminance values to the image so as to create a region of substantially uniform luminance that will ultimately turn into a key, and vectorized to form the window.

Although the disclosed method involves adjusting luminance values with controls, brush, etc., it will be appreciated that other video or color characteristics could be employed to isolate a region of interest based on characteristics of the image. For example, since vectorizing methods are known in the art that involve edge detection of color boundaries, it is within the scope of the invention to provide controls and tools for editing other characteristics of an image, e.g. color, gamma, black level, white level, etc. in order to isolate the region of interest.

After the operator is satisfied with the editing and adjusting operation to isolate the region of interest based on video characteristics, the 10-bit key frame is then converted into a 1-bit key image at step 106. The process of converting 10-bit luminance information into a 1-bit key image is essentially that of grossly enhancing the contrast. Regions above a predetermined threshold as determined by the limit settings will be all 1's (black), and regions below the threshold will be all 0's (white). The net result is highly contrasted image where the region of interest that is ultimately to form the window is a solid black region which can be readily vectorized by computer operations.

Other methods of conversion into a 1-bit image also can be used, for example converting any value between a high limit and low limit setting into 1's and others into 0's, convolution filtering, etc.

Optionally, the key image at the 1-bit stage can be stored in the workstation's memory, as indicated at the optional step 110. A 1-bit key image is a fairly compact digital representation, basically a 64 kbit array which does not require a substantial memory, and it is also readily compressible.

Also as an option, a prestored key image can be retrieved and operated upon further if desired.

At step 112, the isolated key image, which is also called a "key", is vectorized at the workstation to obtain a user defined window (UDW) defined in terms of points, with vectors extending between the points. The term "vectorized" means that a continuous polygon of n points has been drawn around the 1-bit key, to obtain a set of points which can be connected with (and displayed as) a set of lines. In this disclosed embodiment, UDW's are defined in terms of points within an image space having 586 horizontal lines, with 720 pixel locations per line, where the last point of a set of points defining a window connects to the first point.

After the key image has been vectorized at step 112 to obtain a vector representation of a window, the window can be stored in the workstation's memory as indicated at the optional step 114. Further, a prestored vector window can be retrieved from memory, edited, and re-stored if desired.

At step 118, the user may edit the UDW if necessary or desired. The UDW editing process essentially entails operations of adding, deleting, and/or moving a point, a selected group of points, or an entire window. Windows for editing can be derived directly from the vectorizing step at 112, by free hand drawing with a pointing device (e.g. mouse, graphics or digitizer tablet), or by retrieving a prestored window from storage in the workstation 12, as indicated at 114. Edited windows can also be stored in the workstation's memory.

After the user has created a suitable UDW, it is used to apply image processing, as indicated generally at step 122. In the disclosed system for color correction, using the window to apply processing involves devectorizing the window for a frame of video to thereby obtain a digital key, and employing the key as a mask or matte for applying color corrections. Regions corresponding to one or more windows receive a predetermined set of color corrections, while other regions receive another set of color correction.

For use in a series of frames of a scene, the user associates a first user defined window with a first frame of a scene, typically edits the first frame's window or defines a new window for the final frame of the scene, and then designates the windows as corresponding to the beginning and ending frames of the scene. The preferred system is then automatically operative to employ the first and final user defined window and interpolate therebetween during the succession of frames in the scene in order to provide a progressively changing window throughout the frames of the scene. Thus, step 124 in the disclosed embodiment involves applying color correction on a frame by frame basis to regions of each frame in accordance with one or more user defined windows for each frame.

Other types of image processing that can be applied in accordance with user defined windows include image compression, image filtering, animation creation, noise reduction, and colorization. Other types of image processing applications will occur to those skilled in the art.

FIG. 3 provides a specific example of these steps in operation. In this example, an image containing a bottle 150 and a glass 155 on a tablecloth is employed as the key frame, and a key corresponding only to the bottle is derived. Referring first to FIG. 3A, an original color image is captured and a 10-bit luminance Y (black and white) representation of the image is displayed on the video monitor 40. Thus, the video monitor will display a gray scale image that is the well-known "black and white" television picture representative of the original color image. In starting, the user selects the keystore mode of operation.

In FIG. 3B, the user adjusts gain, limit, and clipping values so as to enhance the contrast of the particular regions in the image of interest, which will ultimately form the key. In the example shown here, luminance values have been clipped and limited to a narrow range so that the only visible objects of interest are the bottle and the glass; other regions of the image have been eliminated due to luminance limitations.

In FIG. 3C, the captured key image is edited with brush tools. In this example, the user is using a brush (shown schematically) to remove the reflected window and highlighting from the bottle. The brush is manipulated with the workstation mouse and/or graphics tablet. Brush editing may be accomplished in several ways, for example, by setting the brush to a particular luminance value and painting, by painting with luminance values from the original image, by painting in all white or all black luminance values, or by erasing.

After the image has been modified to the user's satisfaction in the 10-bit mode, the user selects the 1-bit mode, which effectively completes the conversion of the image into a black and white image, with black regions defining the area of interest that will ultimately define the window. In FIG. 3D, the conversion to the 1-bit key image is complete, leaving two separate key areas in the image corresponding to the bottle and glass, ready for vectorizing. The user then selects to the vector mode of operation and selects parameters associated with the vectorizing process.

In the vector mode of operation, a cursor 60 is generated by the system and appears on the video monitor 40. This cursor can be moved with the trackball 54 on the color correction system control panel 25. In the preferred embodiment, in the vector mode, when the cursor is brought into "contact" with the boundary of the key the system recognizes the white to black transition and automatically begins the process of vectorizing. The vectorizing process creates an outline or polygon, as shown in FIG. 3E at 160.

The vector window 160 is displayed on the workstation monitor, and is preferably overlaid on the key image so the user can visually verify the accuracy of the window relative to the key image. In the example shown, the vector window comprises 16 points connected by piece-wise linear segments. The user may select more or fewer points, as desired, so that the vector window matches the area of interest as closely as possible. The vector window may be edited by adding or deleting points, as desired.

In operation of the system to define windows for a plurality of frames of a scene, the user will define a window for the first frame of the scene and the last frame of the scene, as will be described.

The vectorized user defined window 160 is utilized in the UDW circuit board to create a digital matte that is electronically mixed with the original image to define a region for applying color correction. Stated in other words, the open region 165 in FIG. 3F receives a predetermined set of color corrections, while the remaining, black region 162 receives zero color correction, utilizing the well-known video key mixing techniques known to those skilled in the art.

In addition, the present invention provides for a softness filter region 170, which is shown as a white outline around the processing region 165. As will be described in greater detail later, color corrections are applied in the softness filter region 170 gradually tapering from zero correction at the boundary adjacent the non-processed region 162 (zero percent) to 100 percent processing at the boundary of the processing region 165. The width or gradient of the softness filter region 170 is selectively adjustable by the user.

Figure 4:
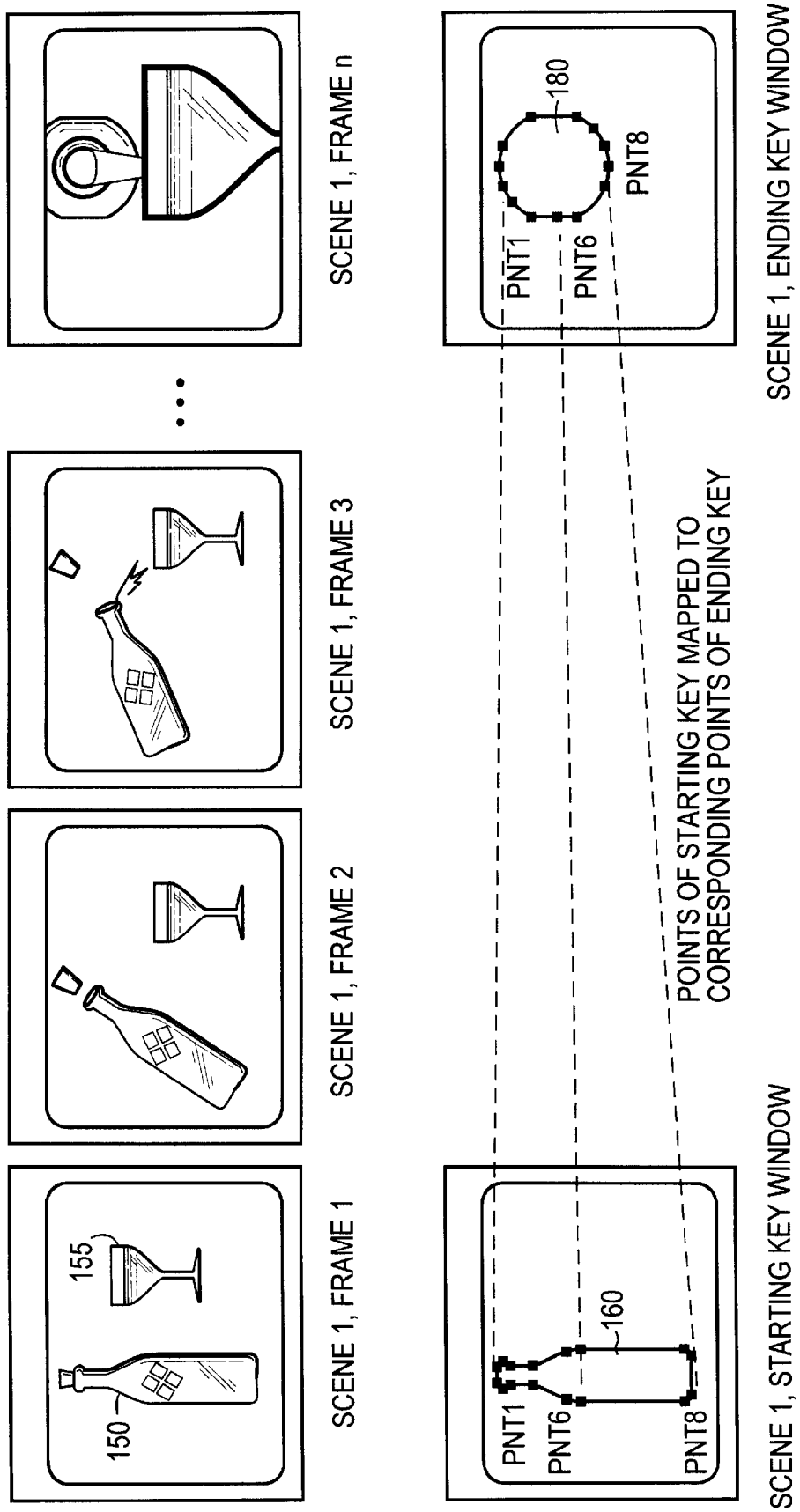
FIG. 4 illustrates the general method of applying user definable windows associated with a first frame of a scene and a final frame of the scene, and interpolation of the windows from the first frame to the final frame.

With the foregoing in mind about the method for creating a user defined window derived from a key frame, turn next to FIG. 4 for an illustration of the application of the method of applying a predefined user defined window associated with the first frame of a scene and the final frame of the scene and interpolation of the user defined windows from the first frame to the final frame. Using the example of the bottle and glass, assume that frame 1 of a scene having n frames shows the bottle 150 and glass 155 in an initial position on the screen, as displayed on the video monitor 40. As the scene progresses through its frames until the final frame n the bottle is gradually tilted forward, the cork removed, moved in position toward the upper center of the screen from the left of the screen, and changed in orientation from a side view of the bottle to a top view as the bottle is turned toward the viewer, with the contents being poured into the glass. Thus, the bottle changes its position, size, and geometry (shape) from frame 1 to frame n.

With the present invention, the user defined window 160 effectively transforms its shape from elongate bottle to circle throughout the n frames. The user may define a window 180 for the final frame n in several different manners. The user may freehand draw a window, may derive a new key from the video image of frame n, may use a prestored key such as a circle, or may use a prestored window derived from the first frame and edit the characteristics to define the circular shape of the window 180.

In order to effect an orderly transition between geometry over a number of frames, the user preferably will maintain a correspondence between the points of the starting window 160 and the ending window 180. For example, the point Pnt8 at the upper left of the bottle-shaped window 160 maps to corresponding point Pnt1 in the circular window 180, point Pnt8 at the lower left maps to Pnt8 of circular window, and point Pnt6 at the midsection of the bottle-shaped window maps to point Pnt6 at the midsection the circular window. By maintaining the correspondence of points of windows between starting frame and ending frame of a scene, the user defined window is automatically and linearly interpolated for each of the intervening frames 2, 3, . . . n etc. to allow a linearly changing user defined window to be applied throughout the frames of the scene.

A preferred approach when a user defined window changes shape, size, and position is for the user to work backwards from a window for a final frame and editing the window of the final frame to derive a window for the first frame. In this approach, the user views the last frame of a scene and determines the number of points required to represent the user defined window for the region of interest. This number of points is then noted as a minimum number of points for use in the starting window. The user then views the window for frame 1 and, if desired, applies the vectorizing process to create a window. If the number of points in the starting window is not the same as the number of points in the ending window, the user may edit either the starting window or the ending window to match the number of points in a starting and ending windows so that the process of linear interpolation between points can operate properly.

It will be understood that the beginning number of points and the ending number of points should be same for linear interpolation. Preferably, an error checking routine or algorithm should be executed prior to interpolation to ensure that the number of points at the beginning and end is the same.

A complicated morphing can be completed by a sequence of linear interpolations. Within each sequence block, a linear transition is applied. By connecting all sequences together, an overall smooth morphing may be achieved. Human selection of the connection points and the length of individual blocks may be helpful. Furthermore, an algorithm can be used to automatically sub-divide the block. A preferred algorithm determines the mean-square error to check the difference between the vectorized matte and the original image, and creates a break point (e.g. adds a point to the vector, if there are points available) when the error is above a threshold.

It should be understood at this juncture that the number of frames defining any given "scene" is completely up s to the discretion of the operator. If a linear transformation between a starting window and an ending window does not provide an acceptable interpolation, the user may define a subscene comprising a smaller number of frames that provides a more satisfactory linear transition. The capability of assigning any number of frames to a scene is provided in the preferred RENAISSANCE 8:8:8™ color correction system.

Of course, the ultimate worse case operation is to create and assign a user defined window to each frame individually, but in most cases this will not be necessary. The present invention allows storage of a plurality of user defined windows, each having a number of points, limited only by the total number of points defining such windows for each frame of a program. As described in greater detail below, the total number of points in the user defined windows is limited to a number that allows the UDW board 75 to devectorize all windows and create the digital matte on a real time basis, which is 200 in the disclosed embodiment.

UDW Generator Circuit

Figure 5:
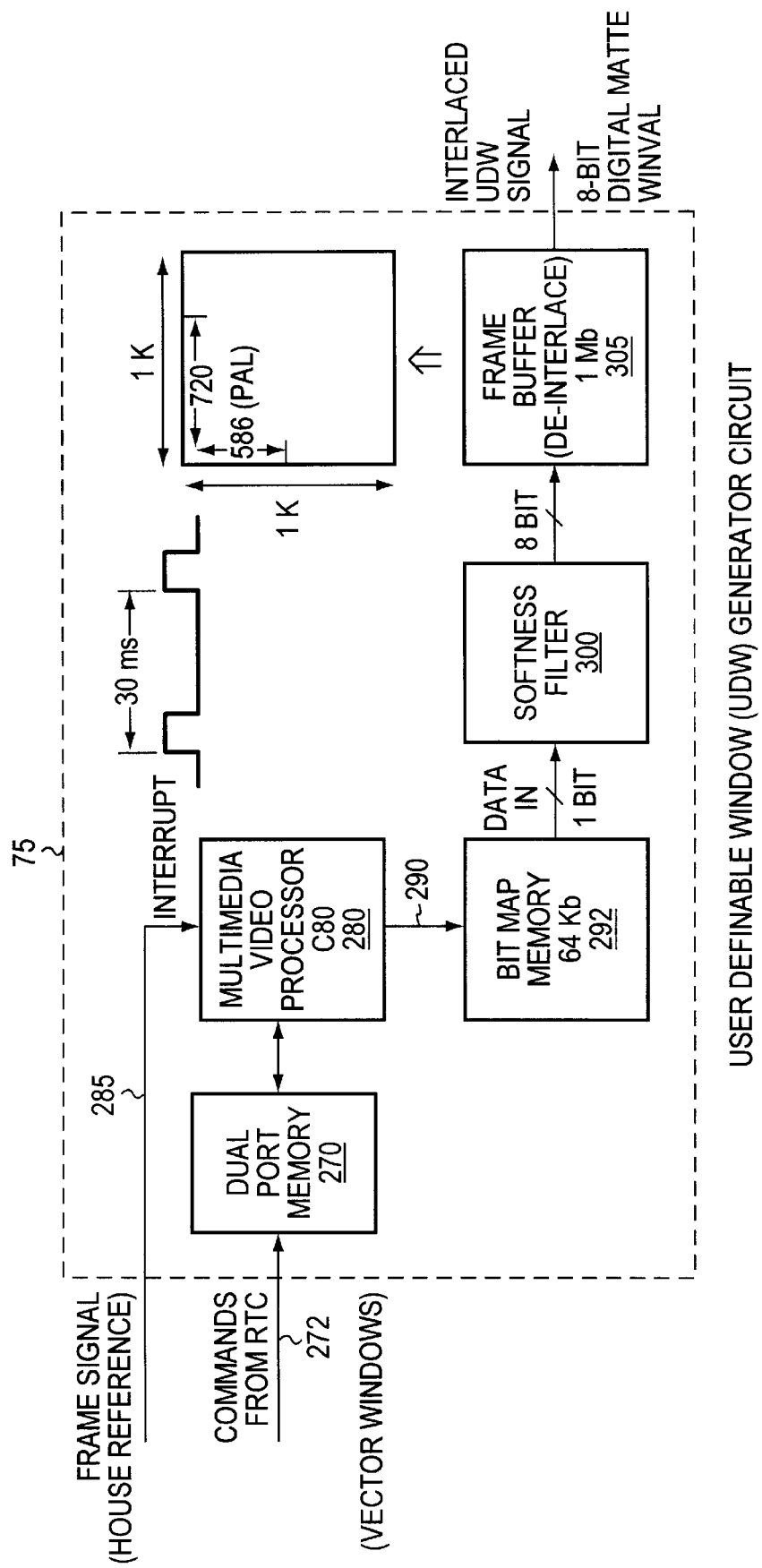
FIG. 5 is a schematic diagram of the User Defined Window (UDW) generator circuit board employed in the preferred system shown in FIG. 1

FIG. 5 is a schematic diagram of the user definable window (UDW) generator circuit 75 employed in the preferred system shown in FIG. 1. As described, the UDW board is operative to receive a command stream from the RTC circuit 70 comprising vector window definitions, and convert these vectorized windows into a digital (bit map) mattes or keys that can be employed by other digital signal processing circuitry to mix with the digital video signal to selectively apply image processing such as color correction with the predefined regions of interest.

The UDW circuit includes a dual port memory 270 for storage of commands from the real time controller (RTC) circuit 70. These commands are provided at a predetermined rate of one every 30 milliseconds (ms) inasmuch as the UDW circuit generates its matte output at this real time rate. As known to those skilled in the art, a dual port memory is a type of digital memory that allows independent asynchronous access by different devices. Commands from the RTC are provided on lines 272 and are accumulated in a first in first out (FIFO) queue.

A multimedia video processor (MVP) 280 is provided for conducting the conversion of the vectorized key window to bit map mattes. The process of conversion or "devectorizing" is describing in greater detail below. Essentially, the processor converts each user defined window as specified by points defining a continuous polygon into a filled polygon, at a very high speed. The processor 280 is preferably a Texas Instruments type MVP C80 clocked at a speed of 50 MHz. The processor is coupled to the dual port memory 270 and accesses the memory at its own rate to empty the FIFO of RTC commands stored therein.

The processor 280 is interrupted at the real time frame rate by a signal on line 285, which is a 30 Hz Frame Signal for the NTSC video signal format and 25 Hz for the PAL video signal format. The Frame signal, as known to those skilled in the art, is utilized throughout the various devices coupled to color correction equipment, telecines, tape recorders, etc. to maintain synchronization amongst the various video devices.

The processor 280 is coupled by its address and data lines 290 to a bit map memory 292 that stores the digital matte. The preferred bit map memory is 64 kilobits (kb), defined by an array of 800×800, which is sufficient to define a bit map matte of 586 lines, 720 pixels per line.

The bit map memory 292 is coupled to a softness filter 300 that is operative to define the softness filter region 170 (FIG. 3F) by applying image processing on a gradient so as to soften the boundary between the area receiving image processing inside the window and outside areas. In the preferred embodiment, the softness filter minimizes sharp transitions in color correction that are often responsible for visible artifacts in color corrected images.

The softness filter operates upon the 64 kb black and white (1-bit) matte or key and converts the matte into a 1k by 1k 8-bit array, with 8 bits of data at each location in the array indicating of the degree of image processing application. Of the 8 bits in the array, 0×00 (hexadecimal) indicates no color correction and 0×FF hexadecimal indicates full color correction. With 8 bits, 256 possible levels of application of image processing are provided. Maximum application is provided within the bit map matte to the edge, and minimum application is provided a predetermined distance from the edge of the matte as a function of the gradient (slope) to be applied, which also determines the extent outward from the boundary that color correction to some degree is applied, and thus the width of the softness boundary.

The 8-bits of filter information output from the softness filter 300 are fed to and stored in a frame buffer 305, which stores the 8-bit value indicative of the degree of application of image processing. The frame buffer is preferably a double-buffered 1 megabyte (Mb) random access memory, which is sufficient to store 586 lines of 720 pixels of 8-bit values. The frame buffer is loaded by the softness filter at the frame rate on one cycle and unloaded for output on another cycle in the known for double-buffering manner.

The contents of the frame buffer 305 is the digital matte that is applied in keying the image processing. The frame buffer 305 is accessed in the known manner for retrieving an 8-bit digital value designated WINVAL which is mixed on a pixel by pixel, line by line manner with the source video associated with a given frame, as identified in the RTC command. The frame buffer may be accessed in an interlaced or de-interlaced fashion so that video signals in various s formats such as interlaced NTSC or PAL can be created with digital processing techniques known to those skilled in the art.

Inasmuch as methods for applying an 8-bit matte for keying with image processing such as color correction, data compression, etc. will be understood by those skilled in the art, no further discussion of these techniques will be provided.

Figure 6:
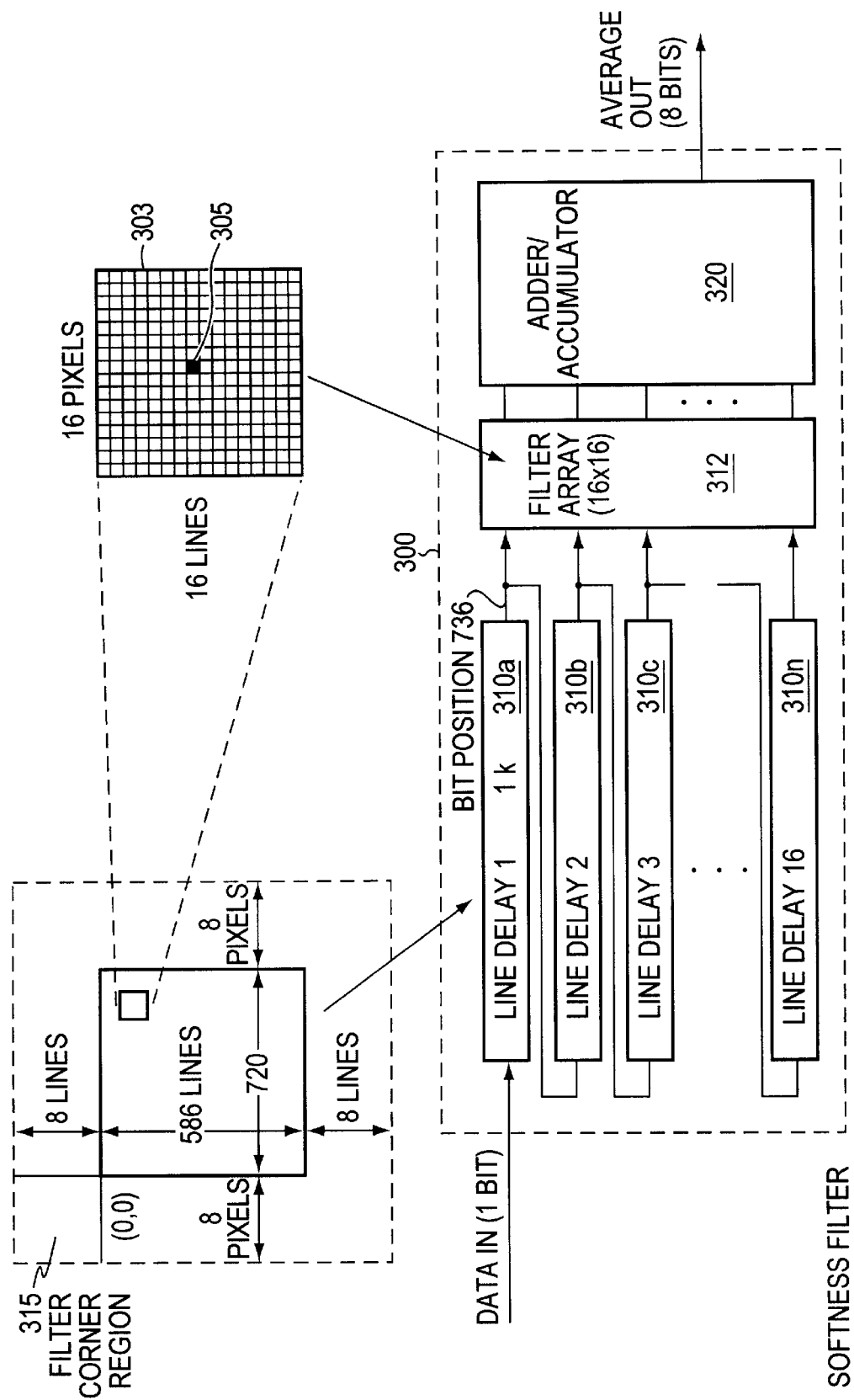
FIG. 6 is a schematic diagram of the softness filter employed in the UDW board shown in FIG. 5.

FIG. 6 illustrates the softness filter 300 employed in the UDW circuit 75. The preferred filter is a 16×16 averaging array as shown at 303, where a particular pixel of interest 305 is centered within the array. The softness filter comprises a plurality of line delays 310a, 310b, . . . 310n, where n=16 in the preferred embodiment, a 16×16 filter array 312, and an adder/accumulator 320.

Each of the line delays 310 is constructed from a 1-kbit FIFO memory tapped at bit position 736, whose output is fed back to the input of the next line delay so that an entire line of the video image received from the bit map memory is moved through the filter one line at a time. The preferred line delays are Harris Semiconductor 16 bit×1k FIFOs tapped at bit position 736. The remainder of the softness filter is preferably constructed with field programmable gate array (FPGA) logic.

Each of the 16 outputs of the line delays are provided to a 16×16 filter array 312 which stores the bits of the array 303. The 16×16 filter array is coupled to an adder/accumulator 312 which sums all of the bits in the 16×16 array to derive an 8-bit number.

The preferred method of filter comprises averaging of the values in the array 303 around the pixel of interest 305. The size of the filter is preferably determined as a function of the amount of time available for conducting filtering of an entire frame, 30 milliseconds in the disclosed embodiment, so a 16×16 filter that covers an entire frame can be evaluated within the specified event time. The filter array is "moved" along the picture, and the average value of the center pixel is computed on every clock cycle. Because the array is 16×16, for a total of 256 locations, the averaging function is very easy and fast to compute. All that is required is to add all the pixel values (zero or one) to a resolution of 8 bits. The total of all possible pixels is 256, which is represented by an 8-bit value.

In the preferred embodiment, edge handling in the softness filter is provided by replicating the first line 8 times and replicating the last line 8 times, replicating the first 8 pixels to the left of the first pixel on a line, and replicating the last 8 pixels to the right of the last pixel on the line. This effectively defines corner regions that are employed in averaging of the corner pixels of the image array. The corner regions are larger by 8 lines top and bottom and 8 pixels left and right than the 720×586 image array. For example, in order to compute the average of the pixel location (0,0) (line 1, pixel 1), a corner region 315 is defined and employed to determine the value of the softness filter for the pixel (0,0) of the digital matte. The corner region 315 includes the value of the pixel (0,0) which forms the center pixel 305 of the array, and 8 additional lines above the center pixel, with 8 pixel values for each of the 8 lines which is the same as the value of the first pixel of each line. The top 8 lines are determined by clocking line 1 into the line delay 1 310a eight times, and by clocking the value of the first pixel of the first line eight times and the value of the last pixel on the line eight times.

Accordingly, it will be appreciated that the total length of the line delay is the total number of pixels on a line, 720, plus 8 values for replicating the first pixel, plus 8 values for replicating the last pixel 8 times, for a total of 736 bit positions, which is the total provided in the line delays 310. Those skilled in the art will understand how to construct logic for shifting the first and last lines of a digital image frame 8 times into the softness filter and clocking the first and last pixels into the line delay 8 times at the beginning and end of each line so as to define the corner regions of the filter.

It should also be understood that the degree of softness is selectably adjustable by the user in increments from 0 to 16. The softness filter can be selectively turned on and off by activating or deactivating the filtering function.

User Interface of Software for Creating User Defined Windows

Figure 7:
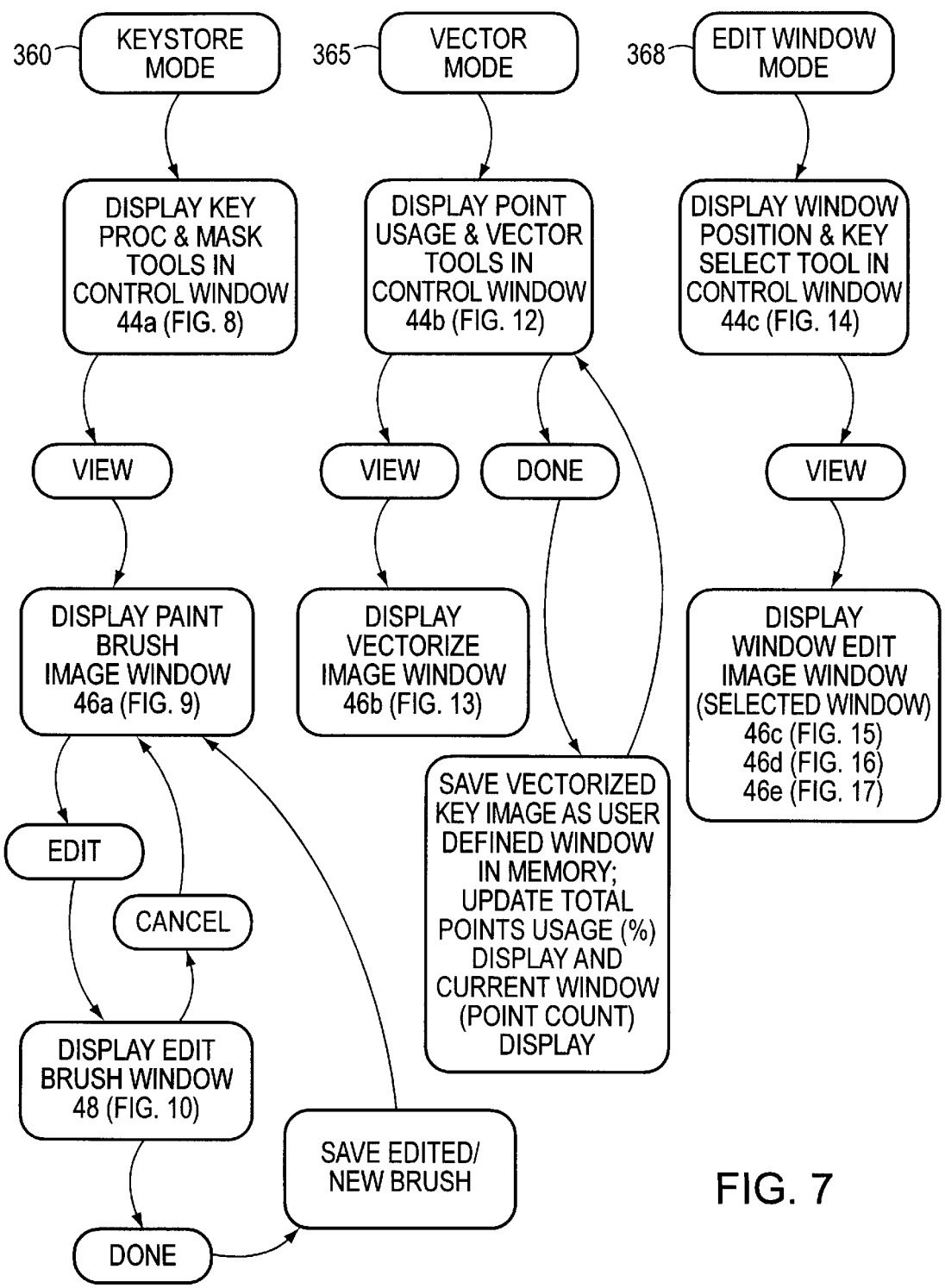
FIG. 7 is a state diagram illustrating various modes and corresponding windows that are displayed in during operation of the preferred system.

FIG. 7 is a state diagram illustrating the various modes of operation of a system constructed in accordance with the preferred embodiment of the present invention. These are the principal modes of the software that runs on the workstation 12 to provide the basic operations of capturing a key frame, modifying the key frame to isolate a region of interest, vectorizing the region of interest to create a user defined window, and editing the window(s) for association with particular image frames in a scene.

The software primarily executes in three basic modes—a keystore mode, a vector mode, and an edit window mode. Each mode results in the generation of particular user interface displays or windows (as contrasted with user defined windows) on the workstation monitor 15—control windows and view/edit windows—with corresponding displays on the video monitor 40, which collectively allow user interaction with the system. Within the three principal modes, certain types of operations are possible which are appropriate for the task at hand.

Figure 8:
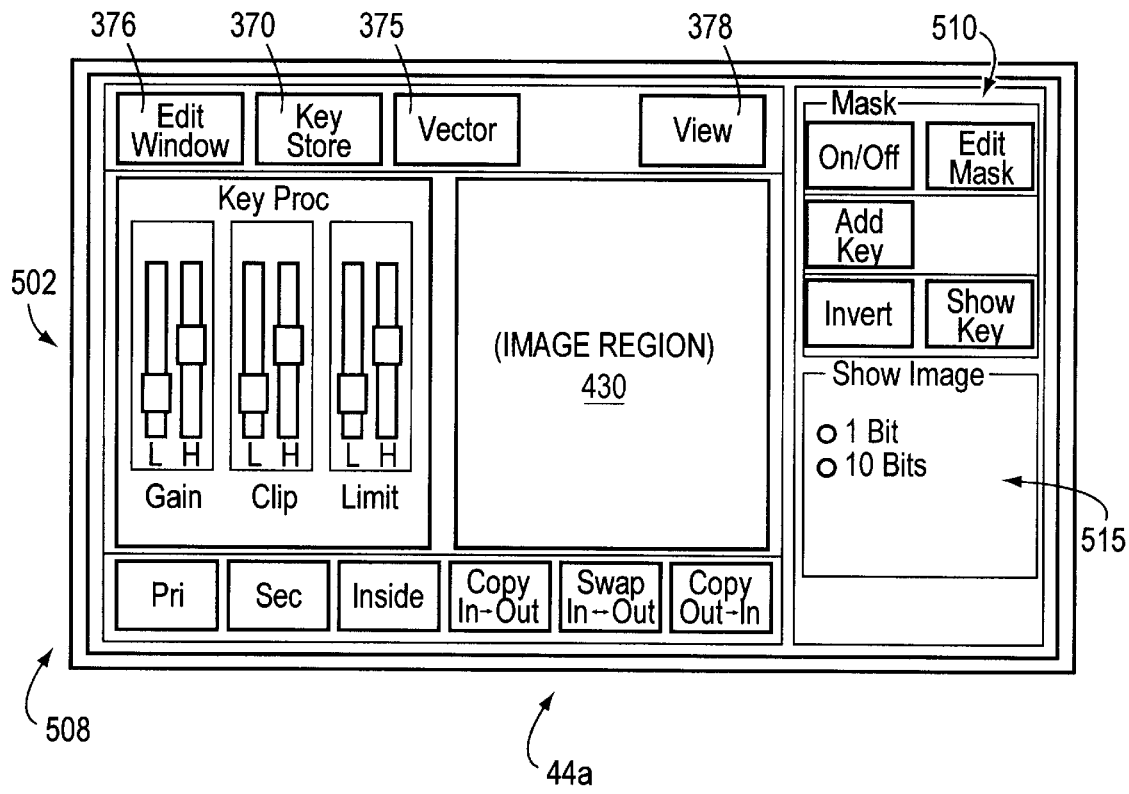
FIG. 8 illustrates a control window displayed in the keystore mode.

The three principal modes of operation are a keystore mode indicated at 360, a vector mode as indicated at 365, and an edit window mode as indicated at 368. Within each of these modes, certain types of control windows 44 and certain types of view/edit windows 46 may selectably be displayed on the workstation monitor. FIG. 8, for example, illustrates a control screen 44a that is displayed in the keystore mode. The control screen 44a is the initial control screen that comes up when the workstation software is initiated, but other types of control windows 44b, 44c are displayed in the vector mode and edit window mode, respectively.

In each control window 44, selection between the keystore mode, the vector mode, or the edit window mode is made by pressing (i.e. clicking with the mouse) the Key Store button 370, the Vector button 375, or the Edit Window button 376. Selection of these buttons by the user activates the corresponding mode.

Still referring to FIG. 7 and FIG. 8, a View button 378 turns on and off a view/edit window whose contents vary depending upon the mode. The control window 44 includes an image region 430 that displays a small version of the image, user defined window, etc. When the user selects the View button 378, a larger version of this image is displayed in a separate view/edit window 46.

Figure 9:
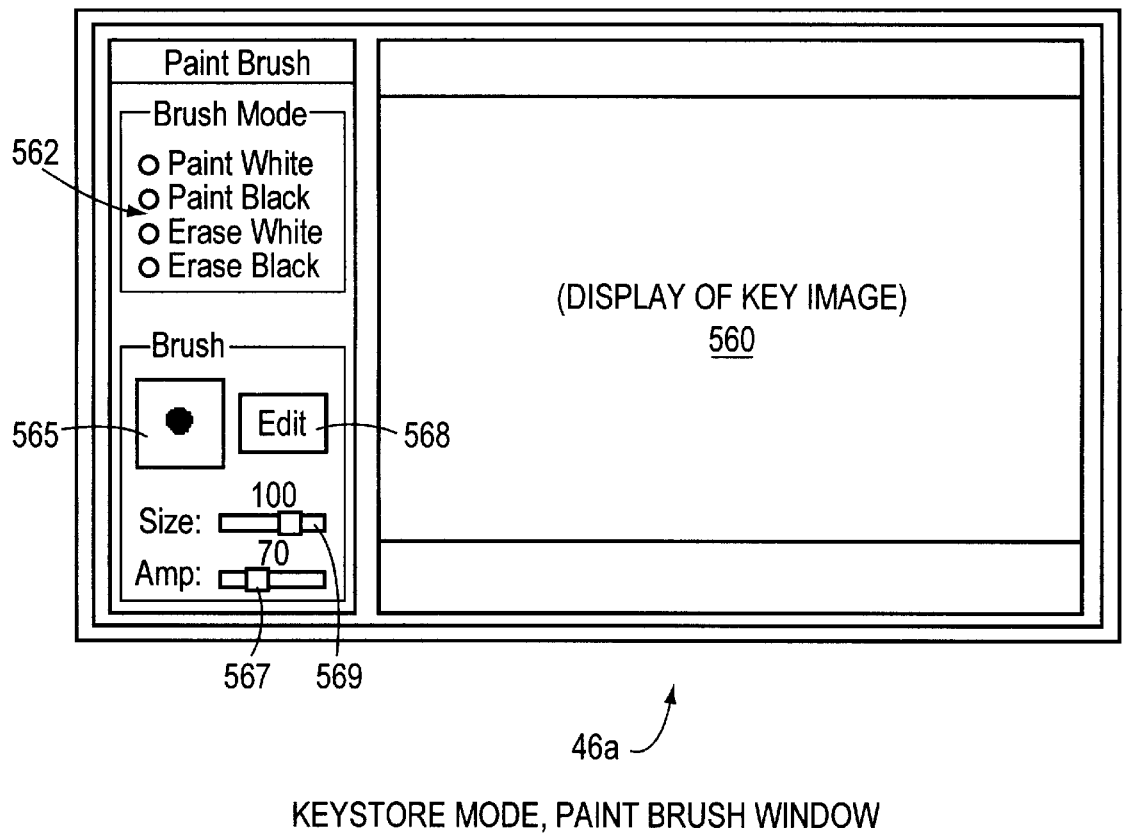
FIG. 9 illustrates the Paint Brush window displayed in the keystore mode.
Figure 10:
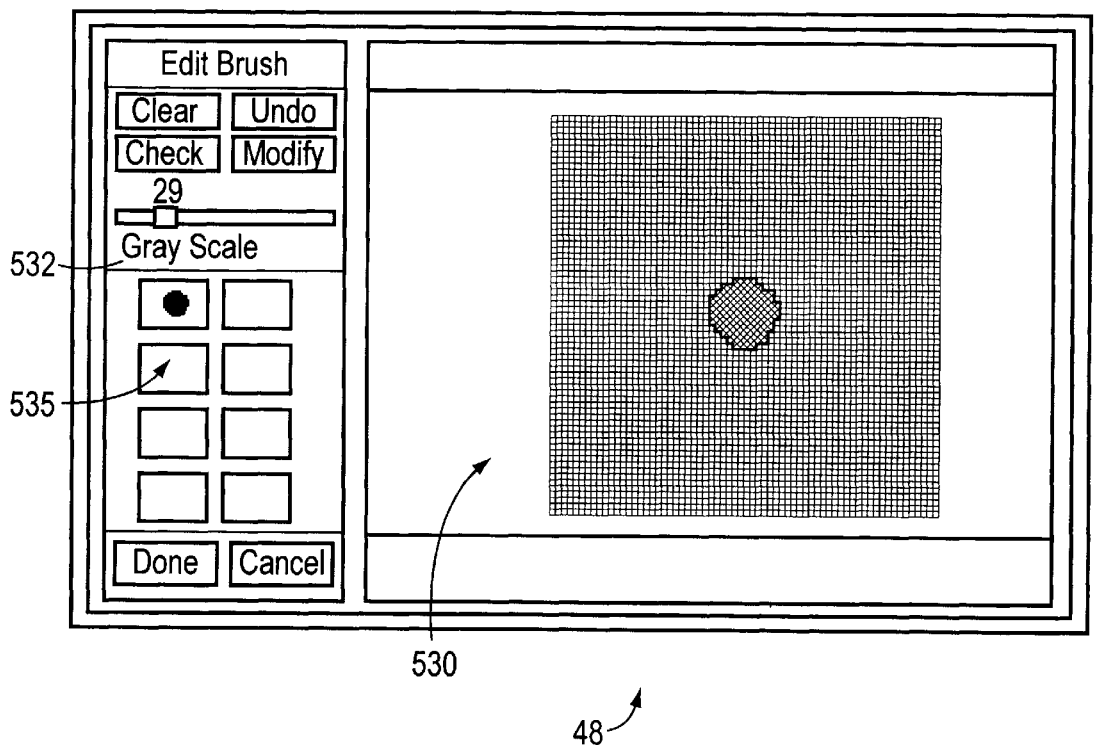
FIG. 10 illustrates an Edit Brush window displayed in the keystore mode.

In the keystore mode 360, if the user presses the View button 378, the system displays a separate Paint Brush Image window 46a as shown in FIG. 9 that allows the user to edit the captured key frame with paint brush tools. This Paint Brush image window 46a is a separate window from the control window 44a and can be moved and resized in the conventional manner. From the Paint Brush image window 46a in FIG. 9, the user can select the Edit button 568, which causes display of a separate Edit Brush window 48 on the workstation monitor as shown in FIG. 10. This separate Edit Brush window 48, which can also be moved and resized if desired, allows user editing of brush characteristics.

From within the Edit Brush window 48 of FIG. 10, if the user presses the Done button, a newly created or edited brush is saved in memory and a representation of the brush will be visible in a brush palette region 535. The Done button returns the user to a display of the Paint Brush image window 46a of FIG. 9. The Cancel button in the Edit Brush window also returns the user to a display of the Paint Brush image window 46a of FIG. 9 without saving changes.

Figure 12:
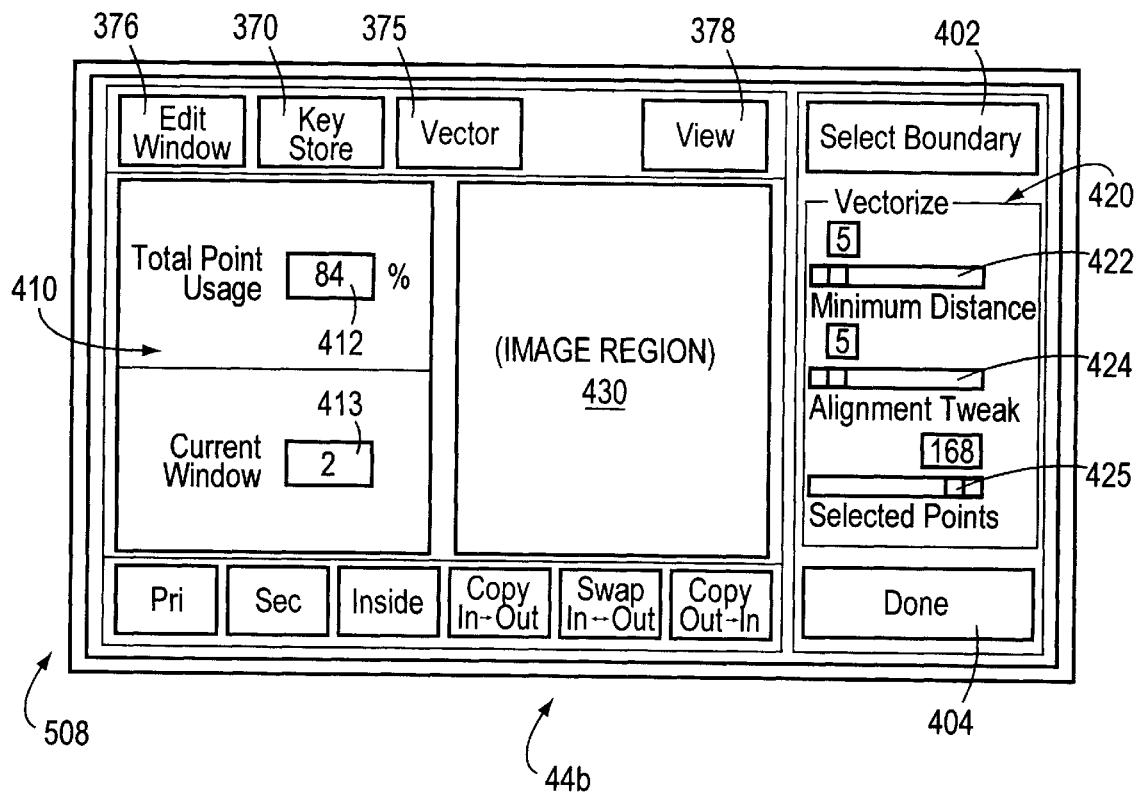
FIG. 12 illustrates a control window displayed in the vector mode.

Referring again now to FIG. 7, after the user is satisfied with the key image adjustments in the keystore mode, the user may change to the vector mode 365 by pressing the Vector button 375 from within the control window 44a of FIG. 8. This causes the system to display a pre-vectorizing control window 44b as shown in FIG. 12 that allows control over the vectorizing process.

Figure 13:
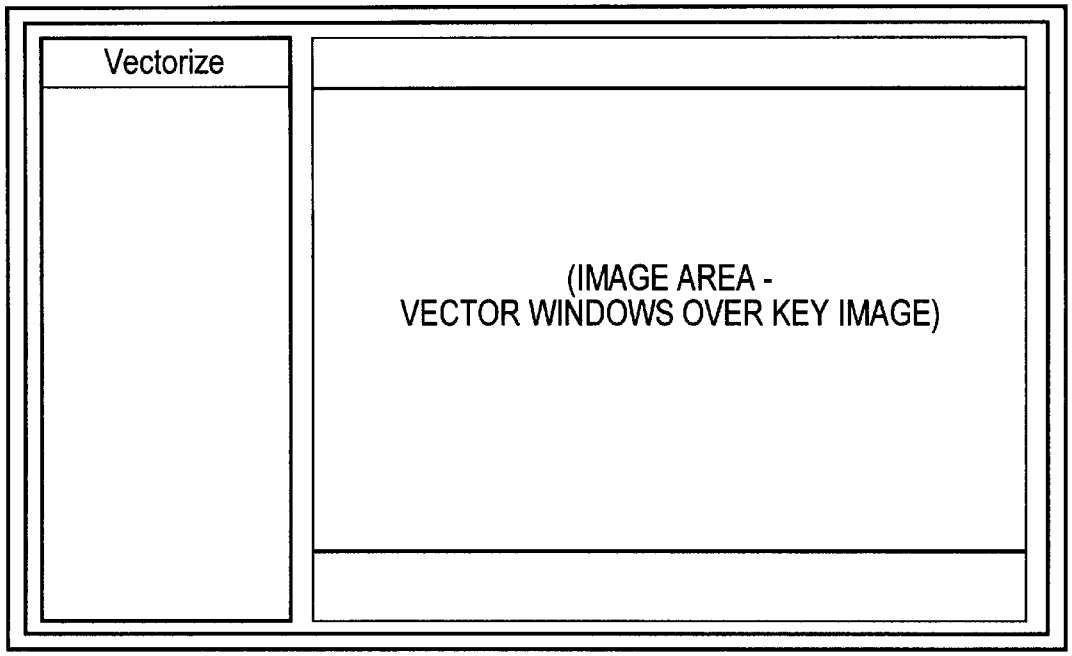
FIG. 13 illustrates a Vectorize window that is displayed in the vector mode.

When in the vector mode with control window 44b, if the user presses the View button 378, the system displays a Vectorize image window 46b as shown in FIG. 13 that allows viewing of the key image and observation of the effects of vectorizing. If the user presses the View button 378 again, the system toggles display of the Vectorize image window off.

The user stays in the vector mode with the control screen 44b until satisfied with the vectorizing process and is ready to edit the vectorized windows. When the user presses the Done button in the control window 44b (FIG. 12), the system saves the vectorized key image as a user defined window in memory and updates a Total Points Usage (%) display 412 and Current Window (point count) display 413 in the control window. Display of the control screen 44b remains until the user selects another mode.

Figure 14:
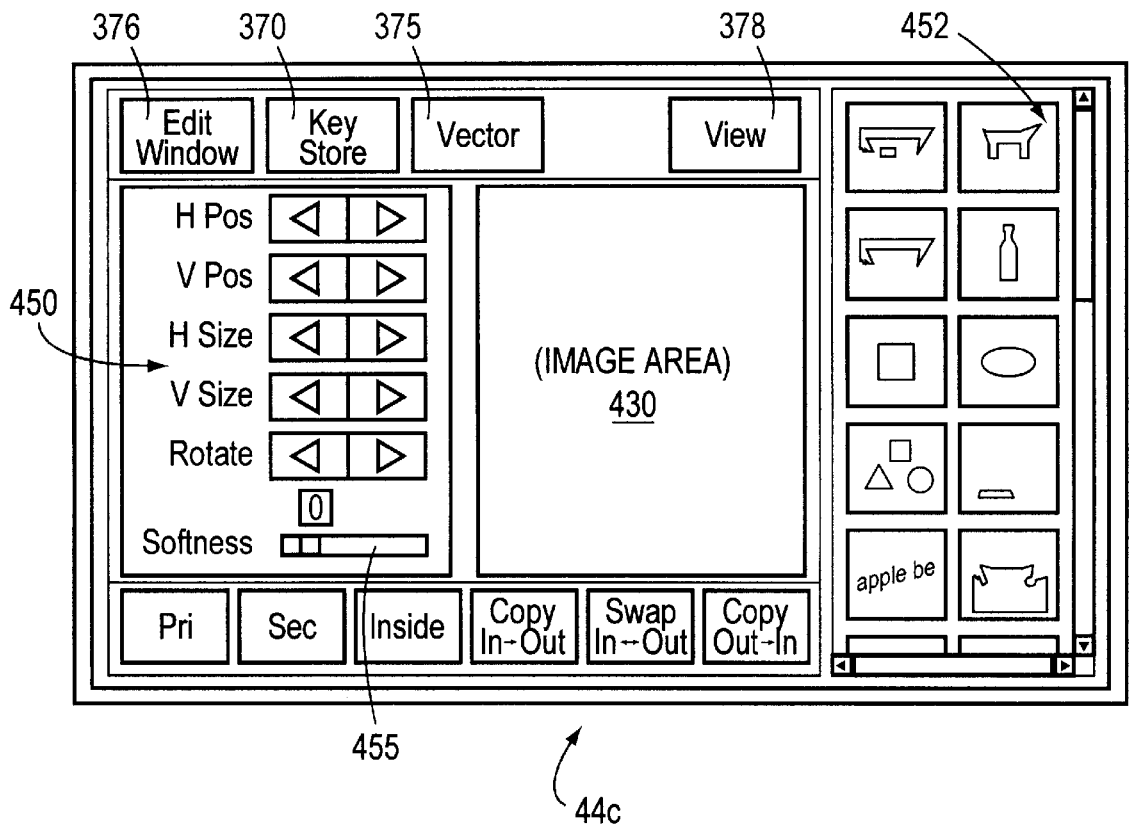
FIG. 14 illustrates a control window displayed in the Edit Window mode.

When the user is ready to edit vectorized windows, he or she presses the Edit Window button 376. This causes the system to display a post-vectorizing control screen 44c as shown in FIG. 14 that allows the user to control and edit points of a user defined window, control the sizing, rotation, shifting of points, recall prestored user defined windows, adjust the softness filter characteristics, and otherwise adjust the aspects of points and windows.

Figure 15:
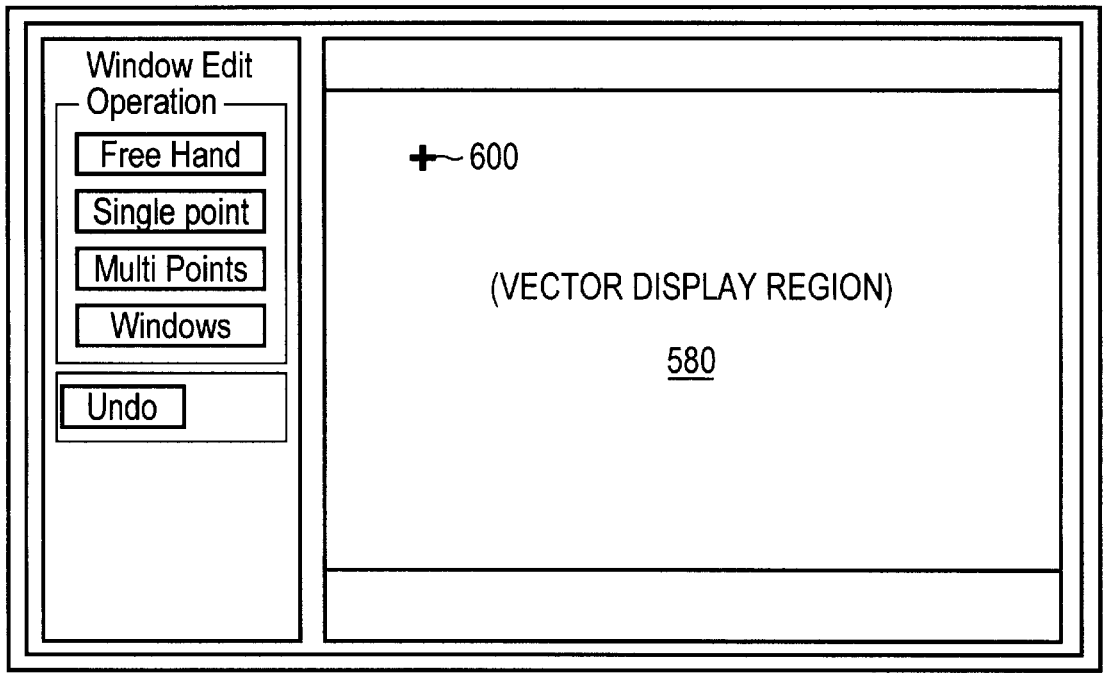
FIG. 15 illustrates a Window Edit window displayed in the Edit Window mode for single point editing.
Figure 16:
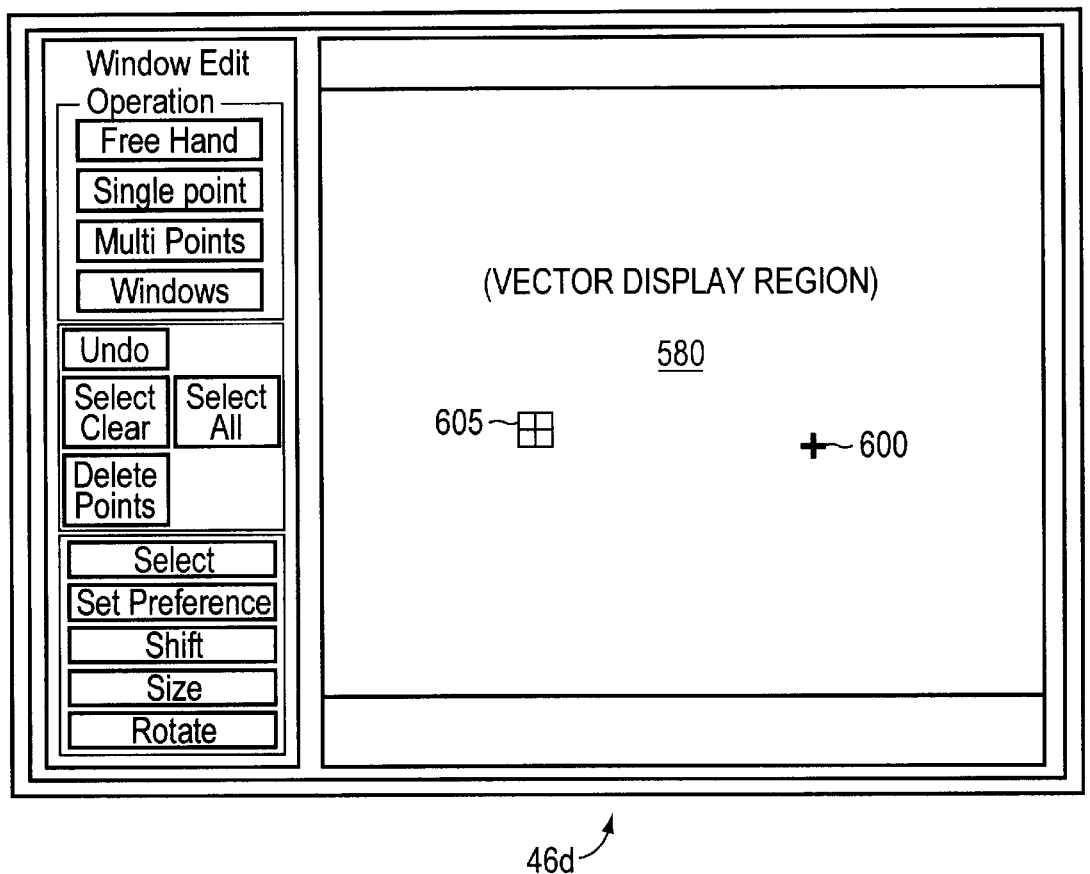
FIG. 16 illustrates a Window Edit window displayed in the Edit Window mode for multiple points editing.
Figure 17:
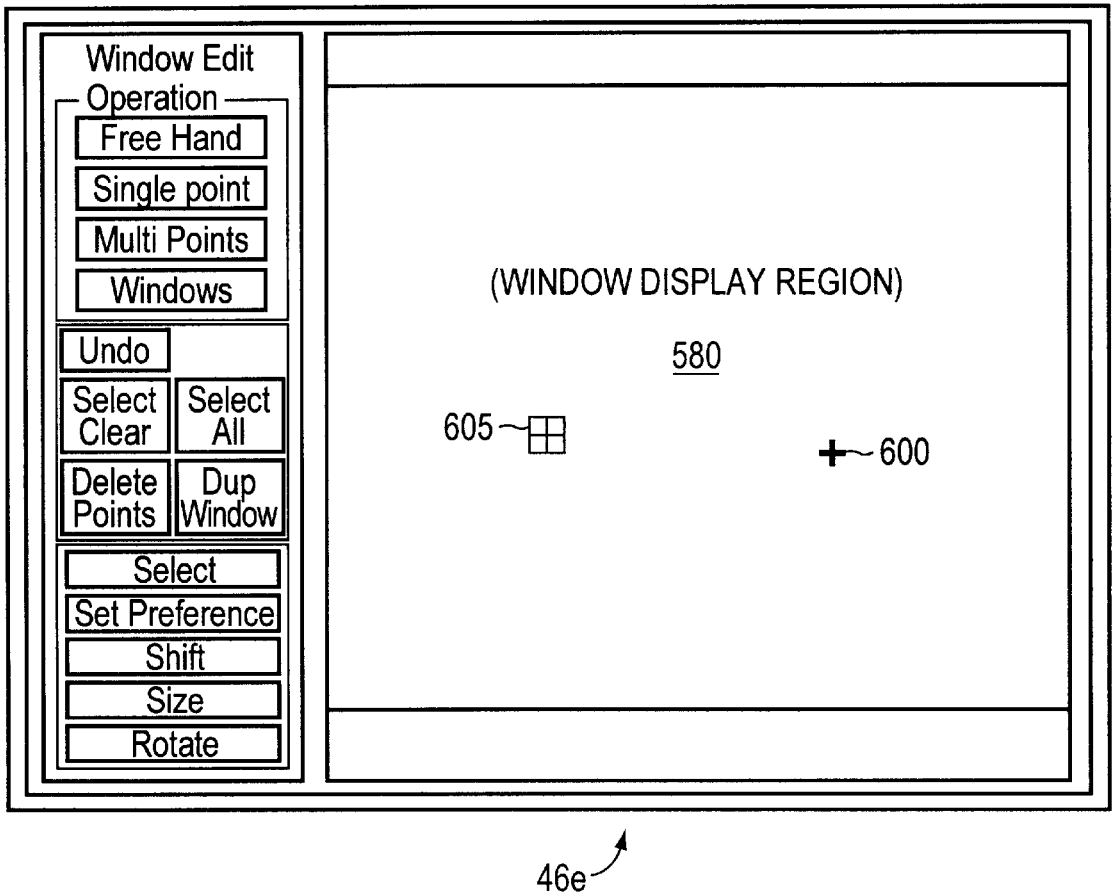
FIG. 17 illustrates a Window Edit window displayed in the Edit Window mode for entire window editing.

If the user presses the View button 378 when in the control screen 44c, the system initially displays the Single Point Window Edit image window 46c as shown in FIG. 15. This Window Edit image window displays a user defined window (vectorized version) that can be edited. From this Window Edit window 46c the user can select a Multi Points Window Edit window 46d as shown in FIG. 16 or a Windows Window Edit window 46e as shown in FIG. 17. Selection of one of the Window Edit windows 46c, 46d, 46e (FIG. 15, FIG. 16, FIG. 17, respectively) is made depending upon whether the user desires to edit a single point of a window, a group of selected points, or an entire window.

Referring again to FIG. 7 and FIG. 14, when in the Edit Window mode with display of the control window 44c the user selects the View button 378, the system toggles the Window Edit window on or off, and automatically saves the results of the editing process in memory.

Referring now to FIG. 8, in the keystore mode the control window 44a provides tools for manipulating a key image to derive a region of interest. The control screen 44a includes the Edit Window button 376 to change to the edit window mode, the Key Store button 370 (that will assume a depressed position on the display when in the key store mode), the Vector button 375 to change to the vector mode, and the View button 378.

The tools for manipulating a key image to derive a region of interest include Key Proc (key processing) tools 502 and Mask tools 510. The Key Proc tools include Gain, Clip and Limit controls, each comprising low and high (L, H) slider bars for setting low and high parameters for an image being viewed on the video monitor. It will be understood that in the keystore mode, the video monitor 40 will typically be employed to display an image that has been selected by other portions of the RENAISSANCE 8:8:8™ color correction system and captured in the key frame buffer, e.g. a captured s key frame, and that user interaction is on an image being displayed on the video monitor. A small version of the captured image is displayed in an image region 430 of the control screen 44a, and a larger version can be displayed by selecting the View button 378, which causes display of the Paint Brush window 46a of FIG. 9.

As described previously, the Gain slider bar allows control of the overall luminance level of the key image. The Clip slider bar allows setting of a high threshold and low end threshold of luminance values in the key image. The high and low Limit slider bars shown in FIG. 8 allow isolation of a limited range of luminance values, for isolating a region of interest based on its luminance. The basic formula is:

If key value>low limit, and
key value<high limit, then
1 bit key value=1, else
1 bit key value=0.

The Mask tools 510 include an On/Off button, an Edit Mask button, an Add Key button, an Invert button, and a Show Key button. Also, a Show Image radio button 515 is provided to allow selection between the 10-bit luminance key image and the 1-bit key image.

The On/Off button allows the mask (i.e. key image) capability to be activated or deactivated.

The Edit Mask button allows the user to change the (rectangular) size of the mask or key image.

The Add Key button causes the key frame buffer to be updated with the current key input being displayed on the video monitor.

The Invert button conducts an inversion process s on the 10-bit or 1 bit image, by subtracting 10-bit values from 1023 in the 10-bit mode or by swapping 1's and 0's in the 1 bit mode.

The Show Key button causes display of the current contents of the frame buffer.

Within the keystore mode, the user carries out the tasks of capturing a 10-bit luminance key frame image, adjusting parameters of the image, editing the image with brush tools, and preparing the key image for vectorizing. When the key image is ready for vectorizing, the user changes to the vector mode.

However, the control screen 44a also includes tools for controlling the application of image processing (color correction in the disclosed embodiment), in a color correction tool bar 508. These tools include a primary control button (Pri), a secondary control button (Sec), a Inside control button, a Copy In->Out control button, a Swap In<->Out control button, and a Copy Out->In control button. The primary and secondary buttons are used to selectively apply primary and secondary color corrections to a user defined window. The Inside button is used to apply processing to the inside of the window; if deactivated the color correction applies to the outside region. The Copy In->Out button transfers the color correction values from inside of the window to the set of color corrections for the outside of the window. The Swap In<->Out button exchanges the color corrections for inside and outside the window. The Copy Out->In button transfers the color correction values for the outside of the window to the inside of the window. These functions are provided in conjunction with the preferred color correction application of the preferred embodiment of the present invention.

The Show Image radio button 515 allows selection between the 10-bit luminance key image and the 1-bit key image. The 1-bit key image is ¹/₁₀ of the original data size of the key image, and therefore represents a 1:10 data reduction over the 10-bit luminance key image. When the 1-bit mode is selected for the key image, the result is a high contrast black and white picture with no gray scale. The slider controls in this mode for low limit and high limit allow the user to pick out a region of a certain luminance value or range, and elimination of portions of the picture above a selected luminance value or below a selected luminance value. Essentially, this process eliminates from the image regions that do not fall within the selected luminance value limit range.

FIG. 9 illustrates the Paint Brush image window 46a that is displayed on the workstation monitor in response to the View button 378 on the control screen 44a when in the keystore mode. As previously mentioned, this window is preferably a separate window and is preferably displayed in addition to the control window 44a. The Paint Brush window includes an image display region 560 for display of the subject image, a series of Brush Mode radio buttons 562 labeled Paint White, Paint Black, Erase White, and Erase Black. The selected brush is displayed in a Brush display area 565. From this window, the user may go directly to the Edit Brush window 48 (FIG. 10) by pressing an Edit button 568 adjacent the Brush display area 565.

Other controls provided in the Paint Brush window 46a are an Amp (amplitude) slider bar 567 and a Size slider bar 569. The Size slider bar controls the overall size of the selected brush, while the Amp slider bar controls the overall amplitude of (i.e. luminance values assumed by) the brush.

The user modifies or edits a key by deleting regions such as highlights, reflections, or other portions of a region of interest where the luminance values are different because of characteristics of the video image. By changing the amplitude of the brush as indicated by the Amp slider bar 567, the user can bump the gray scale or luminance values up or down. The overall Y value can be adjusted with the Amplitude control. When the user paints on the key image with a brush, the selected Y value that is represented by the setting of the slider bar is reflected on the video image.

The Brush Mode radio buttons 562 allow the user to select one of four basic modes of brush operation—Paint White, Paint Black, Erase White, and Erase Black. The basic formulas applied in the system for applying luminance values to an image with the brush in these modes are as follows:

Paint Black mode:
   If keyvalue<brush, keyvalue=brush
Paint White mode:
   If keyvalue>brush, keyvalue brush
Erase White mode:
   If keyvalue<brush, keyvalue=input
Erase Black mode:
   If keyvalue>brush, keyvalue=input where "keyvalue" is the luminance value of a pixel in the key image, "brush" is the luminance value of a corresponding pixel in the brush, and "input" is the luminance value of the original captured key image. The Erase White and Erase Black modes are essentially a form of "undo" that restores the original image so that mistakes can be corrected by bringing back the luminance values from the key image.

FIG. 10 illustrates the Edit Brush window 48 that is displayed in response to the user clicking the Edit button 568 from within the Paint Brush window 46a of FIG. 9, when in the keystore mode. The screen 48 includes a region 530 for display of a pixel array representing a brush tool; a number of control buttons such as Clear, Undo, Check, and Modify; a gray scale slider bar 532; and a region 535 displaying a selectable plurality of prestored brushes that can be selected for use and/or modification.

The brush region 530 is a 64 by 64 pixel array that forms a brush tool. Each pixel of the array can be assigned a predetermined luminance value within a 10 bit resolution by using the slider bar 532.

By clicking on one of the brushes in the region 535, an array of pixels is displayed in the display region 530 for pixel by pixel editing using the mouse. When the user is completed with editing a brush, the Done button is pressed which closes the Edit Brush window and saves the results of the editing process. The Cancel button terminates the window 48 without saving the results of the editing.

FIG. 11 illustrates aspects of application of an exemplary brush to a video image. Assume an image such as that shown at 577, which has luminance characteristics as shown at 575, where the Y axis is luminance values ranging from 0–100 (maximum luminance), and the (x, y) axis indicates pixel and line number, respectively. In this case, the picture will essentially be that of a four gray scale "bullseye" with a black square center shown on the screen. If a brush value for Amplitude is set at 80, application of the brush in the Paint Black mode will cause the application of a luminance value of 80 to all regions over which the brush is moved having luminance values less than 80, as shown at 580, while leaving regions of the picture having luminance values higher than 80 untouched, as at 582.

Similarly, if the brush value is set at Amp=60, and the Paint White mode is selected, movement of the brush over the exemplary image 577 results in leaving regions of the image below the brush value of 60 untouched, as at 586, while applying the brush value of 60 to regions of the image above a value of 60 as shown at the area of 588. The effect is to remove high luminance values of the image.

From the foregoing, those skilled in the art will understand that the characteristics of a brush may be adjusted as desired so as to facilitate image modification and creation of a key.

FIG. 12 illustrates a pre-vectorizing control screen 44b that is displayed in response to user activation of the Vector button 375 to change to the Vector mode. The control screen 44b is utilized to control the vectorization process; a different control screen 44c (FIG. 14) is employed for editing windows, typically immediately after vectorizing. The control screen 44b includes the Edit Window button 376 to change to the edit window mode, the Key Store button 370 to shift back to the keystore mode, the Vector button 375 (that will assume a depressed position on the display when in the Vector mode), and the View button 378. The control screen 44b also includes the color correction tool bar 508 for controlling image processing application, and the image display region 430 for display of a miniaturized version of the image being operated upon.

The control window 44b further includes a Select Boundary button 402 and a Done button 404, a point usage information display area 410 comprising a Total Point Usage percentage display 412 and a count of the number of points utilized in a selected window in a Current Window information display area 413, and three slider bars for adjusting parameters of the vectors in a Vectorize information display area 420. These slider bars include a Minimum Distance slider bar 422, a Alignment Tweak slider bar 424, and a Selected Points slider bar 425. The Minimum Distance slider 422 is utilized to control the minimum space (measured in lines and pixels) between two points in a vector. The Alignment Tweak slider bar 424 allows adjustment of the value of a parameter employed in the vectorizing process, which preferably employs a least-squares method of fitting a line to a distribution of points in the image array. The Selected Points 425 slider bar allows setting of a predetermined number of points that can be employed for a vectorizing process.

In the pre-vectorizing mode with control screen 44b, the user can select the View button 378 to cause display of the target image in larger size in a Vectorize window 46b (FIG. 13). The user can also activate the Edit Window button 376, which shifts the mode to the edit window mode and display of the control screen 44c (FIG. 14). The Vectorize window 46b provides a display of the key image with an overlay of the vectorized polygon over the key image.

When satisfied with the vectorizing process, the user can select the Done button 404, which saves the vector that has been created in the workstation memory as a user defined window.

Referring now to FIG. 14, the post-vectorizing control window 44c for the edit window mode includes a window position control area 450 and a prestored vector selection control area or palette 452. The control window also includes the Edit Window button 376 (which assumes a depressed position on the display when in the edit window mode), the Key Store button 370, the Vector button 375, and the View button 378, which operate as previously described.

The window position control area 450 includes up and down buttons for controlling the horizontal position (HPos), the vertical position (VPos), the horizontal size (HSize), the vertical size (VSize), and rotation (Rotate) of a selected point, set of points, or window. These controls may be pressed by the user to move, resize, or rotate the vectorized window. A small version of the vectorized window is displayed in an image area 430 so the effects of the operation can be viewed by the operator.

A Softness slider bar 455 is provided to allow user adjustment of the degree of softness of the softness filter.

The prestored vector selection control area 452 displays a plurality of prestored key images or windows that have been created during previous operations. As described earlier, user defined windows or key images may be stored in the memory of the workstation 12 and recalled for later use as desired. The user selects one of the prestored windows by pointing and clicking with a pointing device.

When in the edit window mode from within the post-vectorization control window 44c, the user may select the View button 378 to cause display of a Window Edit image window 46c (FIG. 15) on the workstation monitor. This Window Edit window 46c displays the user defined window that is being operated on, and provides tools for editing points, selected points, or windows.

Referring now to FIG. 15, in response to the View button 378 from the control window 44c, a Window Edit window 46c, Single Point mode, is initially displayed, with the Single Point button shown depressed on the displayed to indicate the present mode. The Window Edit window can take the form of 46c, 46d, or 46e depending upon whether the operator selects freehand, single point, multipoint, or windows editing mode. Further details of these particular features of the Window Edit windows 46c, 46d, 46e are provided in conjunction with FIGS. 15, 16, and 17.

The Window Edit display window 46c initially appears as shown in FIG. 15, with the Single Point button shown depressed, and four possible edit modes as indicated by clickable buttons for Free Hand, Single Point, Multi Points, and Windows. The display for the Free Hand and Single Point modes are essentially the same. The image or vector region 580, as will be described in greater detail in connection with later figures, will include a display of a user defined vectorized window from a previous operation for selection from the palette 452 of prestored vector windows. Any point or points that have been selected for operations will be shown highlighted, for example with a special "selected points" icon such as that shown at 600.

In the Free Hand mode, the user may free hand draw a continuous polygon by pointing in the vector display area 580 with the mouse, graphics tablet, etc. and clicking to place a point.

In the Single Point mode shown in FIG. 15, the user can add, delete, or move points one at a time by pointing at a particular point, clicking on the point to select it, and dragging with the mouse to move. An Undo button is provided to undo a previous operation. With a graphics tablet as the selected device for windows editing, for example, pressing the tablet pen tip and then moving the pen will "catch" a nearest point and move it. Pressing a button on the side of the pen will add a point in a nearest line to the tip of the pen. If the user turns around the tablet pen, the top of the pen switch is an "eraser". If the user moves the eraser on the tablet, the preferred system will delete the point within a selected range.

In the Multi Point mode, a screen as shown at 46d is generated as shown in FIG. 16. In addition to the Undo button, a number of additional controls are now displayed. The Select Clear button clears the selection of any previously selected points in a displayed vector display region 580. A Select All button allows selection of all displayed points. A Delete Points button deletes any selected points. Again, any selected points will be shown highlighted, for example with a selected points icon 600.

A series of buttons at the bottom left of the screen 46e provides control over operations of shifting, sizing, and rotation. These buttons include a Select button, a Set Reference button, a Shift button, a Size button, and a Rotate button.

The Select button places the mouse in a mode for dragging over points of a vector for selection.

A Set Reference button transforms the cursor from a selected points cursor to a reference cursor as shown at 605 in FIG. 16. The reference point cursor 605 may be positioned anywhere on the screen and is set in place by clicking the mouse. As will be described in greater detail below, the reference point is utilized to provide a point of reference for operations such as shifting, sizing, and rotation.

The Shift button allows the user to shift selected points relative to the reference point 605, as determined by movement of the mouse.

The Size button allows the user to resize the selected points by dragging with the mouse, which causes selected points to diverge from the reference point 605. Sizing is also referred to as scaling. In this operation, each point's distance to the reference point is proportionally changed by a scaling factor (i.e. multiplied by same factor).

The Rotate button allows the user to rotate selected points relative to the reference point 605 by dragging with the mouse.

FIG. 17 illustrates the Windows Edit display screen 46e that is displayed in response to clicking the Windows button in any of the Window Edit displays 46c, 46d. These controls assume operations upon an entire window; selection of individual points or a group of points is not permitted. Thus, operations of Select, Clear, Select All, Delete Points, and Select are all effective with respect to all points of a window, and the window is treated as an object as a whole and not as a group of points. Thus, any operations affect the entire window and not selected points. In addition to the previously-described tools that are available in the Multi Points mode, a Dup Window button is provided that causes duplication of a selected window.

From the foregoing, those skilled in the art will appreciate that a number of different tools are provided that allow the user to create and edit user defined windows, either windows created from an immediately preceding vectorizing operation carried out on a key image, or windows previously created during prior operations and stored in the memory of the workstation. After any desired window editing operations, the user defined window (or windows, as plural windows are permitted in the preferred embodiment) is associated with a selected frame of a scene, and the controls in the control screen 44 activated to cause image processing to occur in accordance with the commands issued via the color correction tool bar 508.

Specific Example of Key Derivation and Window Creation

Figure 18:
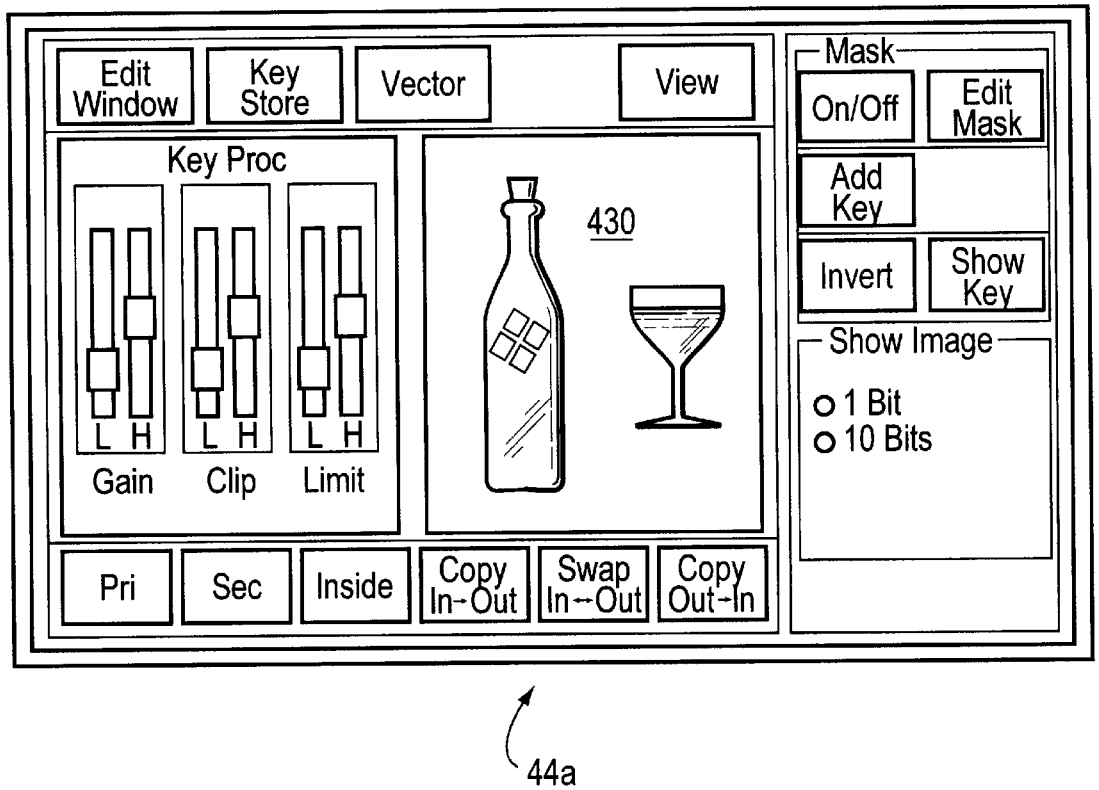
FIG. 18 illustrates an exemplary 10-bit (luminance) image displayed in a control window in the keystore mode, prior to any key image edit operations.

With the foregoing basic windows and modes of operation in mind, turn now to FIG. 18 for a more detailed discussion of the specific example previously described, namely that of a bottle and a glass as key images, and various displays that a user would see as the particular steps illustrated in FIG. 3 are carried out within the context of the user control screens described above. Assume initially that the system is in the keystore mode with display of the control window 44a. As previously described, the image area 430 includes a reduced gray scale (luminance only) version of the image upon which the operations are to take place. Using the controls available in the control screen 44a, the user edits the luminance characteristics of the key frame, perhaps uses brush tools, and eventually converts from a 10-bit image to a 1-bit image.

Figure 19:
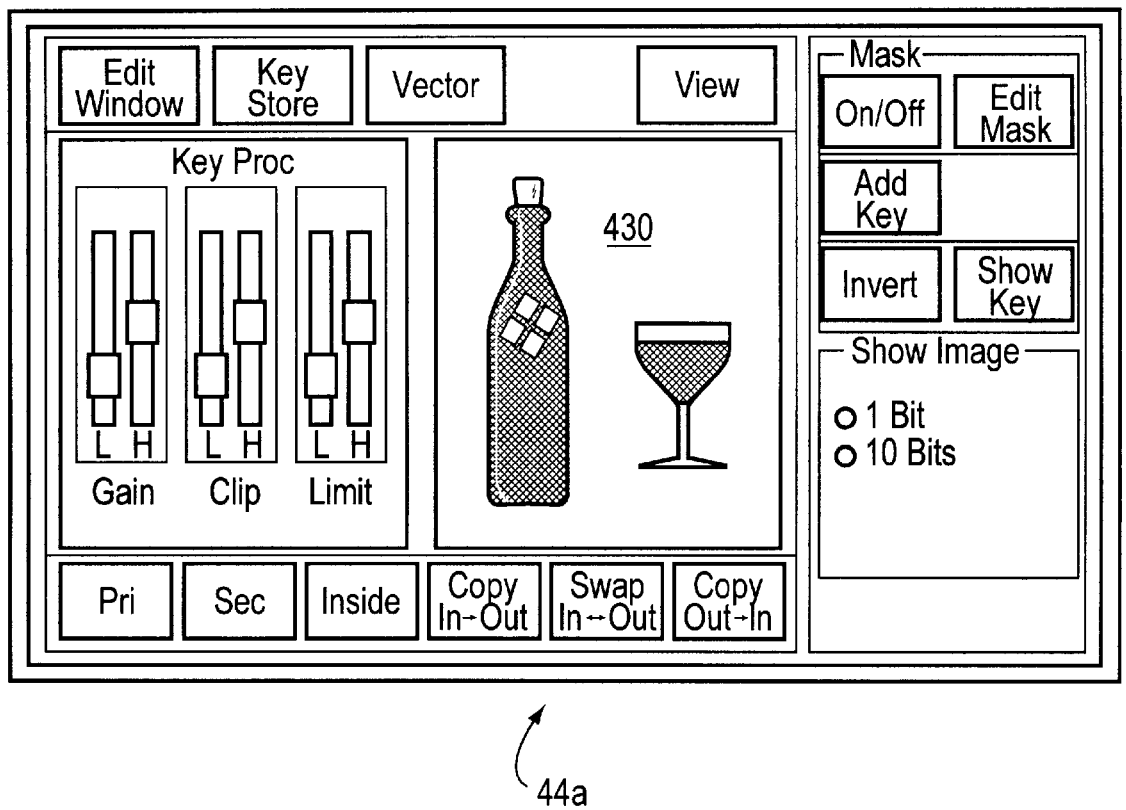
FIG. 19 illustrates the exemplary image of FIG. 18 after adjustment of video parameters to obtain a high contrast image.

FIG. 19 illustrates the keystore mode after parameter adjustments such as gain, clip, and limit, and corresponds to FIG. 3B.

Figure 20:
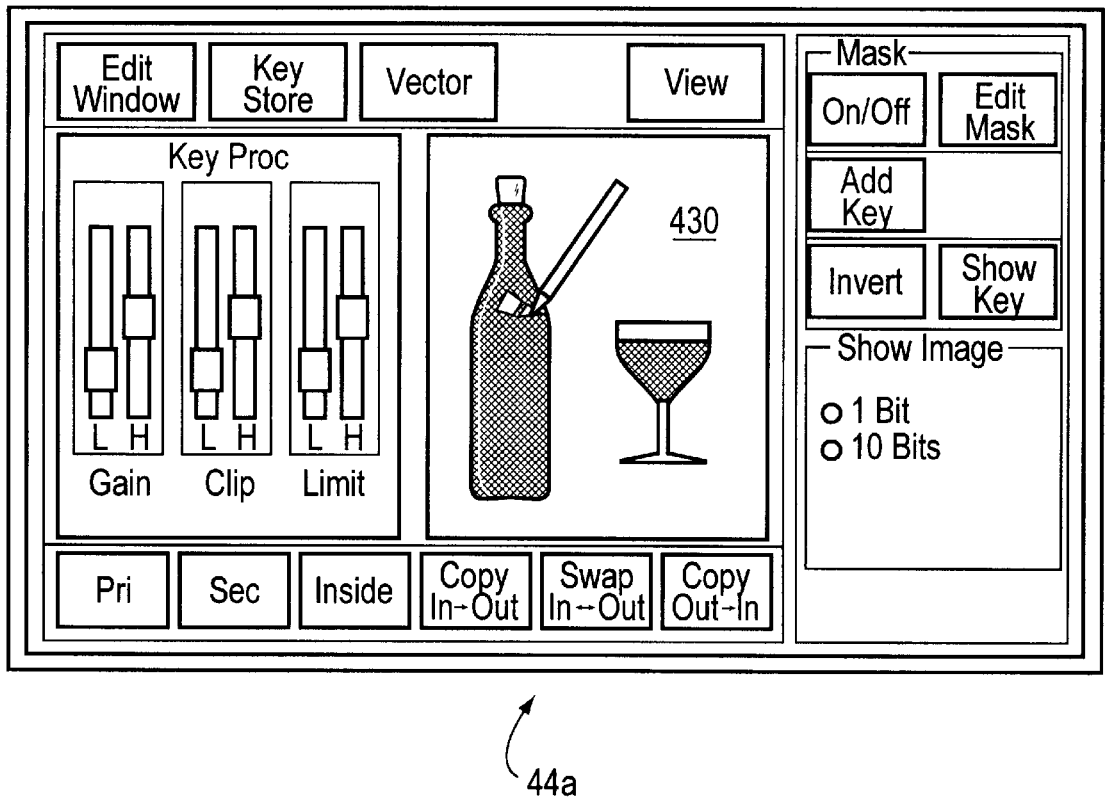
FIG. 20 illustrates the exemplary image of FIG. 19 illustrating application of brush tools to isolate an area of interest (a key) for vectorizing.

FIG. 20 illustrates the keystore mode, showing the application of the brush tool to edit the key image, in this case by removing the cork and highlighting on the bottle so as to define the key. This image corresponds to that shown in FIG. 3C.

Figure 21:
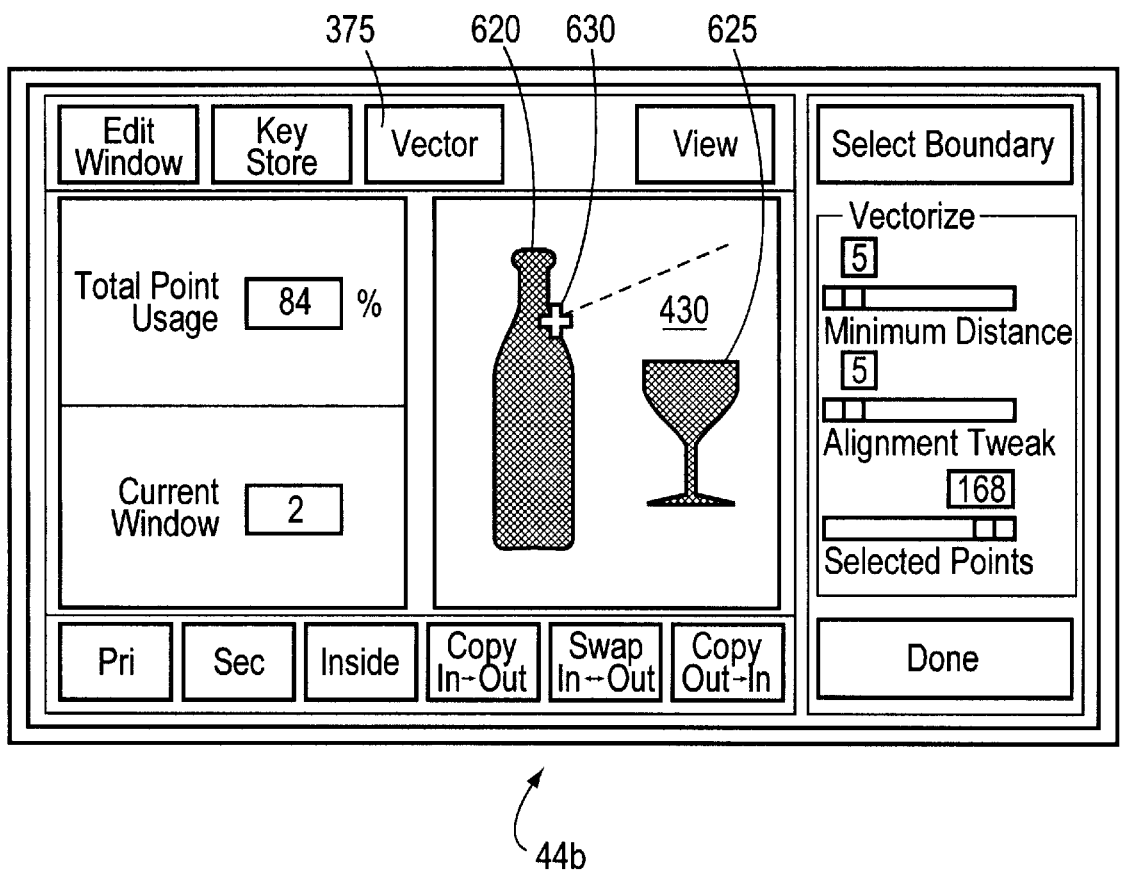
FIG. 21 illustrates the exemplary image of FIG. 20 after conversion to a 1-bit key image, ready for vectorizing.

When satisfied with the parameter adjustments and key image editing to isolate a region of interest, the user changes to the 1-bit mode and then changes to the vector mode by activating the Vector button 375. As will be recalled, this causes display of the control screen 44b. FIG. 21 illustrates the vector mode after conversion of the image from a 10-bit luminance image to a 1-bit image so as to define two key regions that can be vectorized to create user defined windows, namely, that of the bottle at 620 and that of the glass at 625. At this point, the user can bring the cursor 630 into contact with a boundary of one of the key images 620, 625 so as to begin the vectorization process. The vectorization process is automatic in the preferred embodiment of the present invention when the user changes to the vector mode by depressing the Vector button 375. The preferred system is automatically responsive to vectorize a key when the cursor is brought in proximity with the boundary of a key image.

Figure 22:
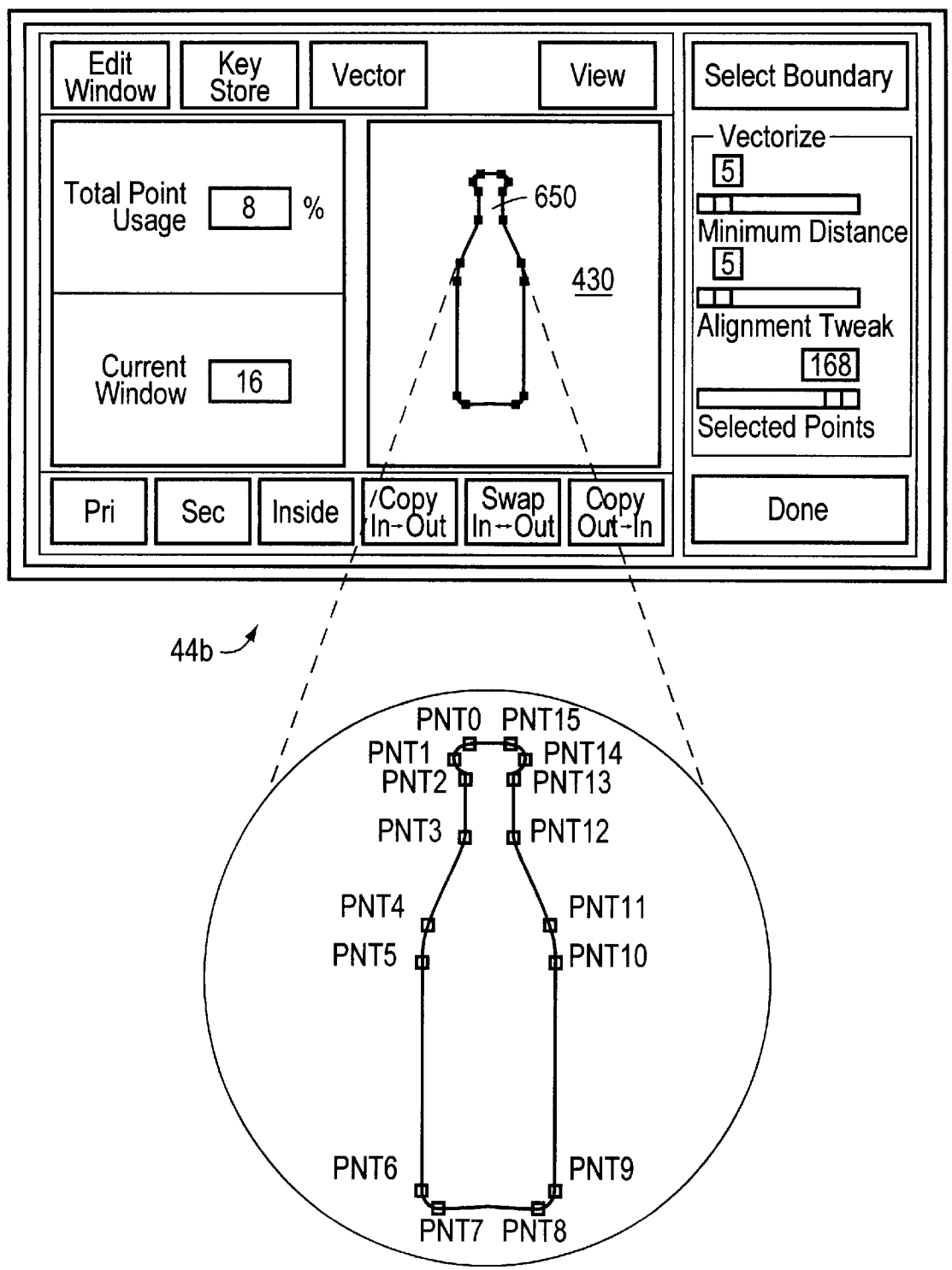
FIG. 22 illustrates the vector window derived from the key of FIG. 21 displayed in the control window in the vector mode.

As shown in FIG. 22, the vectorized user defined window 650 corresponding to the bottle comprises 16 points is automatically generated and displayed in the image region 430 of the control window 44b. Note that the information display area Current Window displays the numeric value of 16, indicating that there are 16 points utilized, while the Total Point Usage information display area shows 8%, indicating the percentage of the total available number of points of (200) that have been employed in defining this particular window. As seen in FIG. 22, the vector window defining the bottle comprises piecewise linear segments extending between the points Pnt0, Pnt1, . . . Pnt15.

Figure 23:
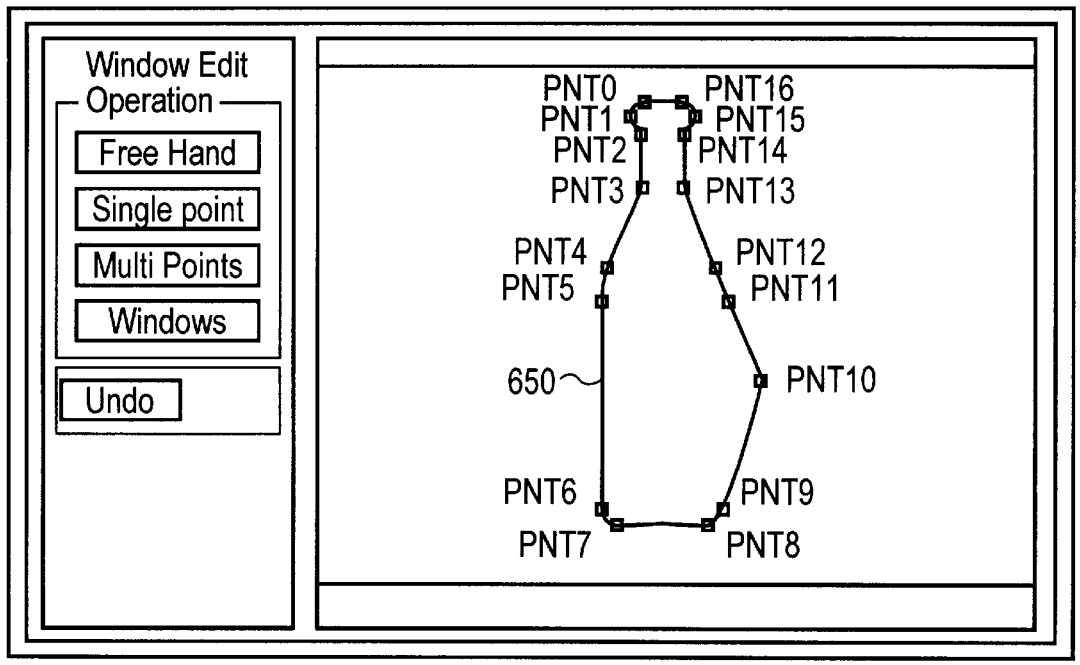
FIG. 23 illustrates the vector window derived from the key of FIG. 21 displayed in a Window Edit window, Single Point operation.

FIG. 23 illustrates an operation involved with a single point in the Single Point mode of the Window Edit window 46d. Since only single point operations are allowed, a new point Pnt10 has been added along the right side of the bottle shaped user defined window 650, shown moved outwardly by dragging with the mouse so as to distort the shape of the window. This essentially is the same operation that can be done in the Free Hand mode, where user creates a continuous polygon.

It will be recalled that operations of adding a point, deleting a point, and moving a selected single point are the only operations possible in the Single Point Edit mode shown in FIG. 23.

Figure 24:
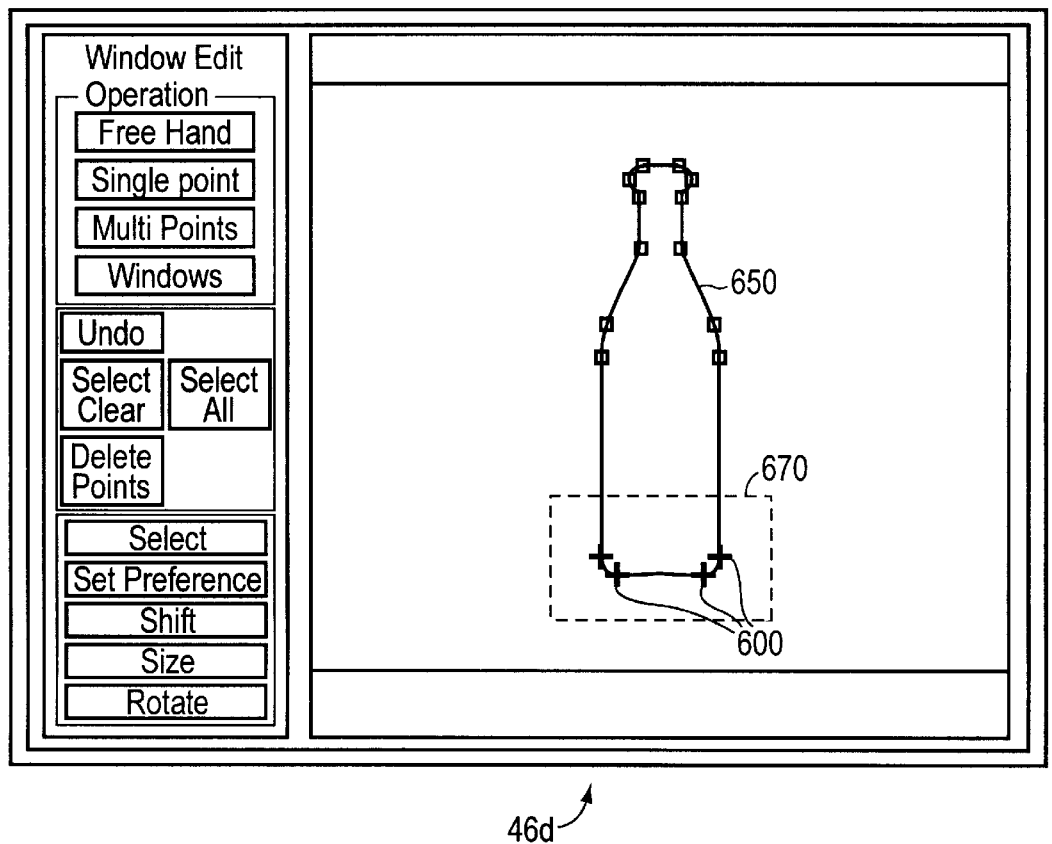
FIG. 24 illustrates the vector window derived from the key of FIG. 21 displayed in the Window Edit window, Multi Points operation, showing the selection of multiple points.

FIG. 24 illustrates the bottle-shaped user defined window 650 if placed in the Multi Points edit mode, and a number of points are selected. The selected point icon 600 is displayed at each selected point to indicate the selection of the points. The points 600 are selected by dragging a rectangular selection box 670 which is created by clicking at a first corner and dragging to an opposite corner in the known manner.

Figure 25:
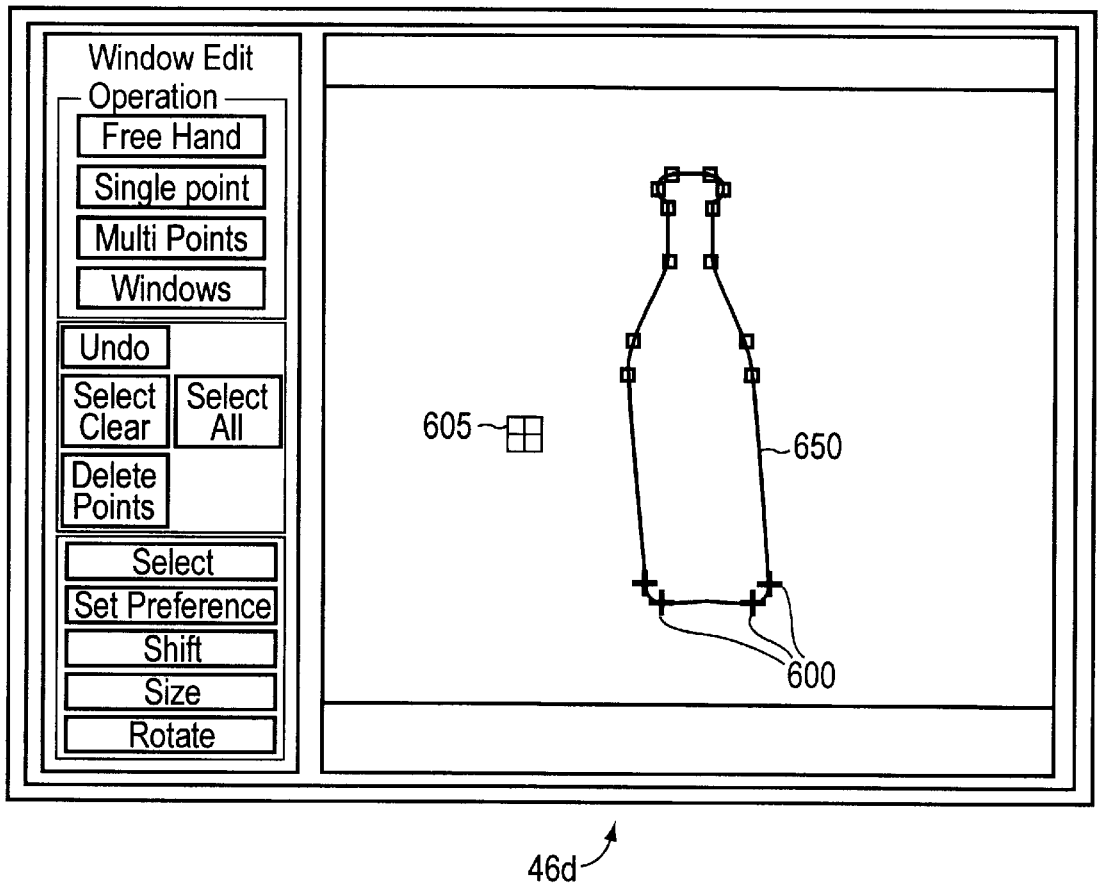
FIG. 25 illustrates the vector window derived from the key of FIG. 21 displayed in the Window Edit window, Multi Points operation, showing a shift of selected multiple points.

FIG. 25 illustrates the operation of shifting carried out upon a group of selected points indicated at 600, relative to a set reference point 605. It is assumed that the reference point 605 has been placed by a previous operation of Set Reference and clicking with the mouse to affix the location of the reference point 605. The shifting operation involves dragging with the mouse which moves all selected points in the direction of the mouse motion relative to the reference point 605. The effect shown in FIG. 25 is that of a skewing of the bottom of the bottle shaped user defined window 650.

Figure 26:
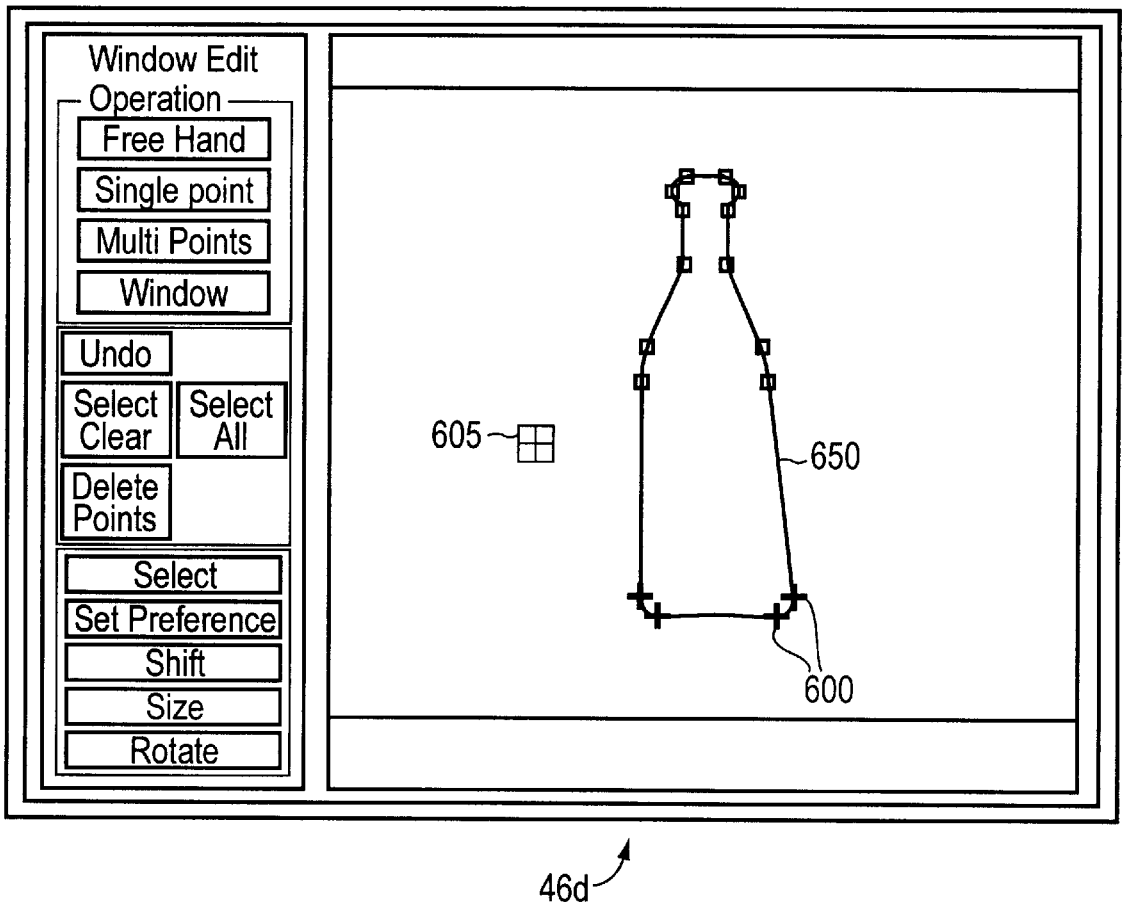
FIG. 26 illustrates the vector window derived from the key of FIG. 21 displayed in the Window Edit window, Multi Points operation, showing a sizing operation of selected multiple points.

FIG. 26 illustrates the operation of sizing of a group of selected points indicated at 600 relative to the reference point 605. As in previous operations, the sizing operation is carried out with respect to all selected points, relative to the reference point 605, and causes the selected points to be moved away from the reference point by an amount represented by a scale factor. The scale factor and direction of movement is determined by the movement of the mouse or other pointing device. The user preferably clicks the mouse, holds a button, and moves the pointer. The preferred software calculates X and Y distance changes relative to the reference point and uses the percentage of change as the scaling or sizing factor. Such techniques will be known to those skilled in the art.

Figure 27:
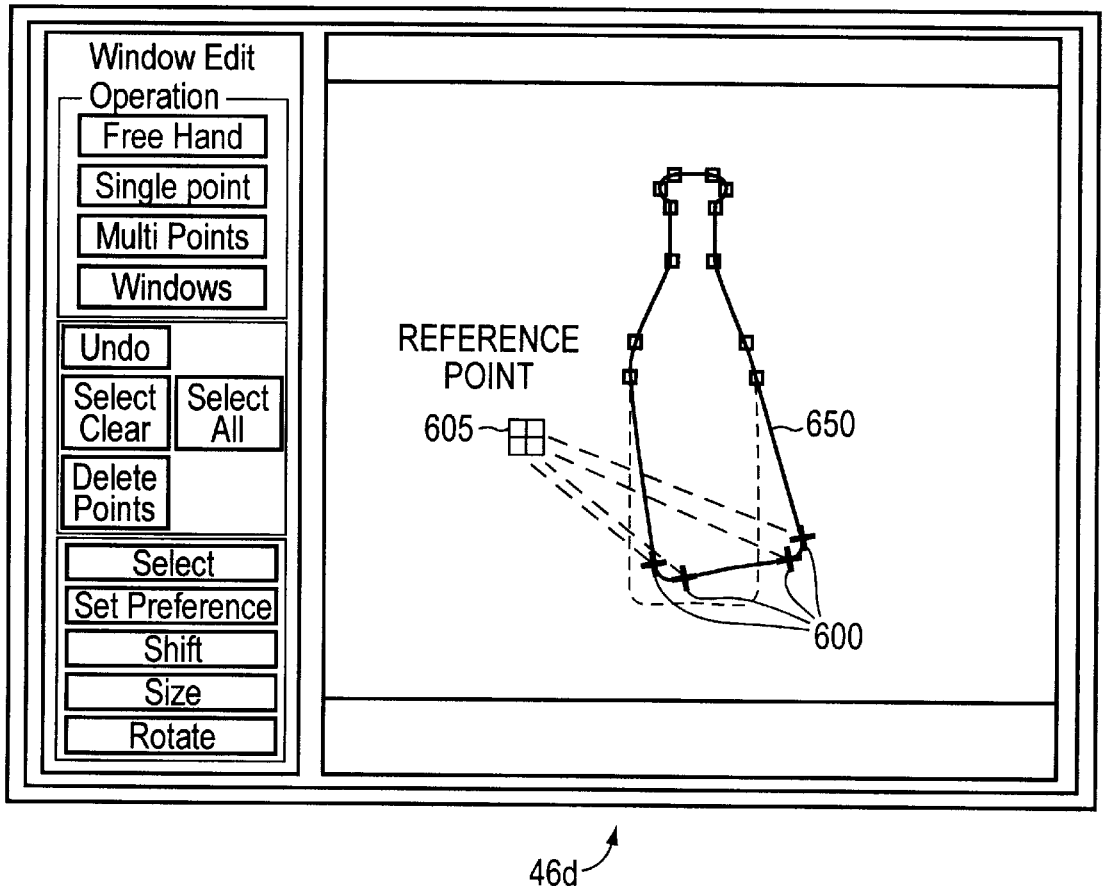
FIG. 27 illustrates the vector window derived from the key of FIG. 21 displayed in the Window Edit window, Multi Points operation, showing a rotation operation of selected multiple points.

FIG. 27 illustrates the Multi Points operation of rotation of a selected group of points indicated at 600, relative to the reference point 605. The rotation operation causes rotation of selected points relative to the reference point 605, while maintaining the points at a uniform radius from the reference point.

Figure 28:
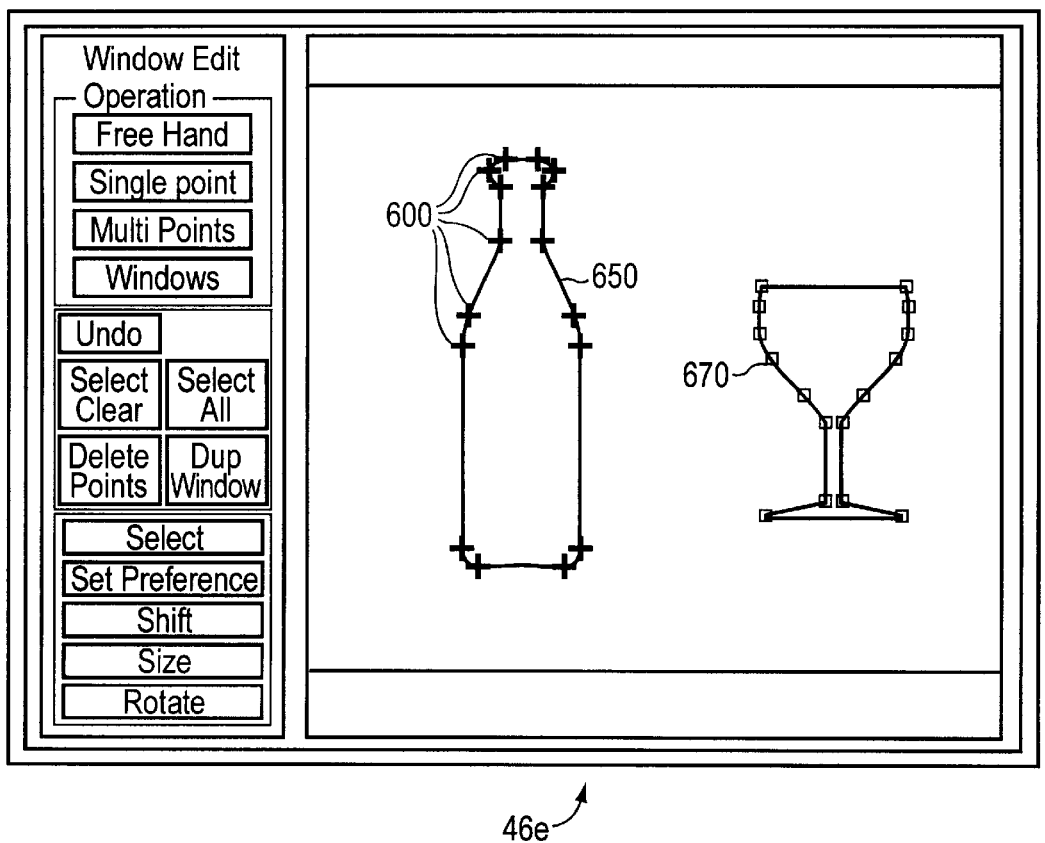
FIG. 28 illustrates the vector window derived from the key of FIG. 21 displayed in the Window Edit window, Windows operation, showing the selection of a user defined window.

Similar operations of shift, size, and rotate are also provided in the preferred embodiment when all points of a user defined window are selected, as indicated in FIG. 28. In FIG. 28, when the Windows button is clicked in the Window Edit window 46e, all points of a user defined window such as the bottle shaped window 650 are selected, as indicated by display of the selected points icon 600 at each point defining the window. Any operations affect the entire user defined window and are not carried out with respect to any smaller subset of points. The Selection operation therefore merely allows selection between one of a plurality of windows. As shown in FIG. 28, the other possible window defined in the operations described, the glass shaped user defined window 670, is not selected.

Figure 29:
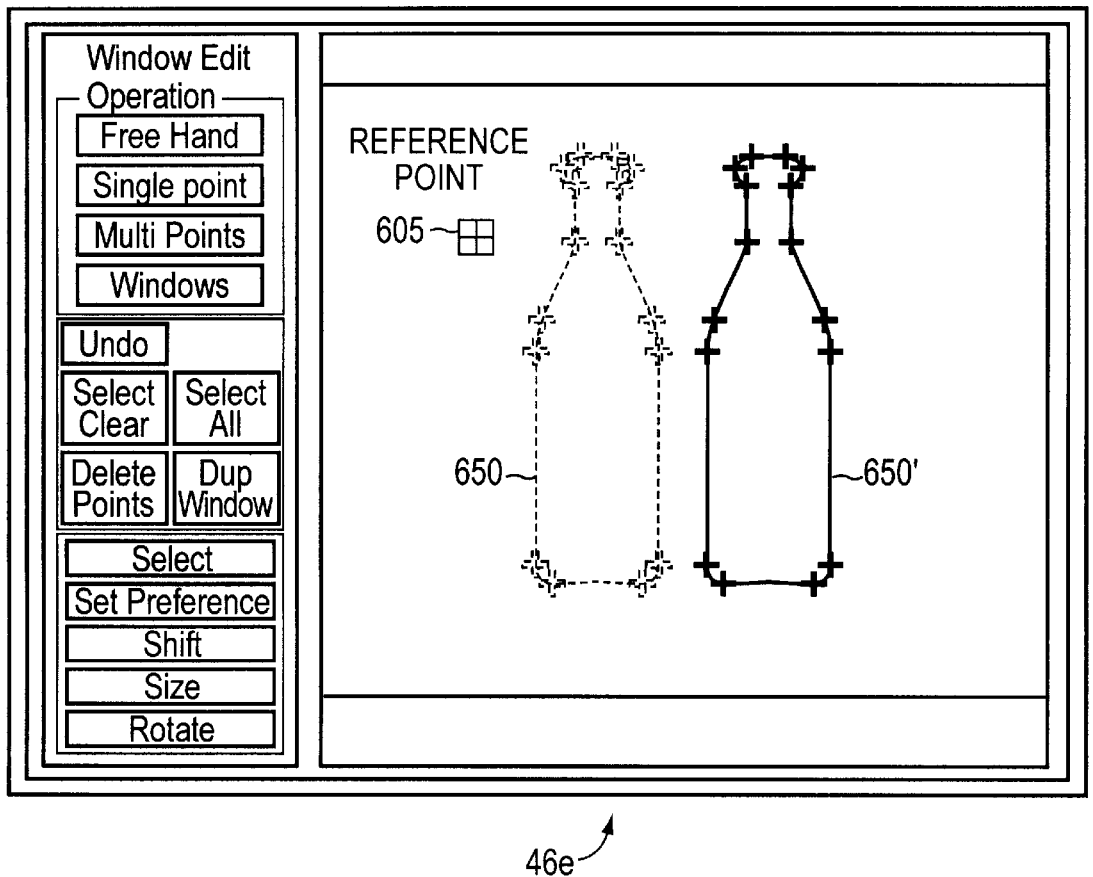
FIG. 29 illustrates the vector window derived from the key of FIG. 21 displayed in the Window Edit window, Windows operation, showing a shift of a user defined window.

In FIG. 29, the Shift operation causes a shifting of the entire selected window 650 to a second position 650'. The shift operation is carried out relative to the preset reference point 605.

Figure 30:
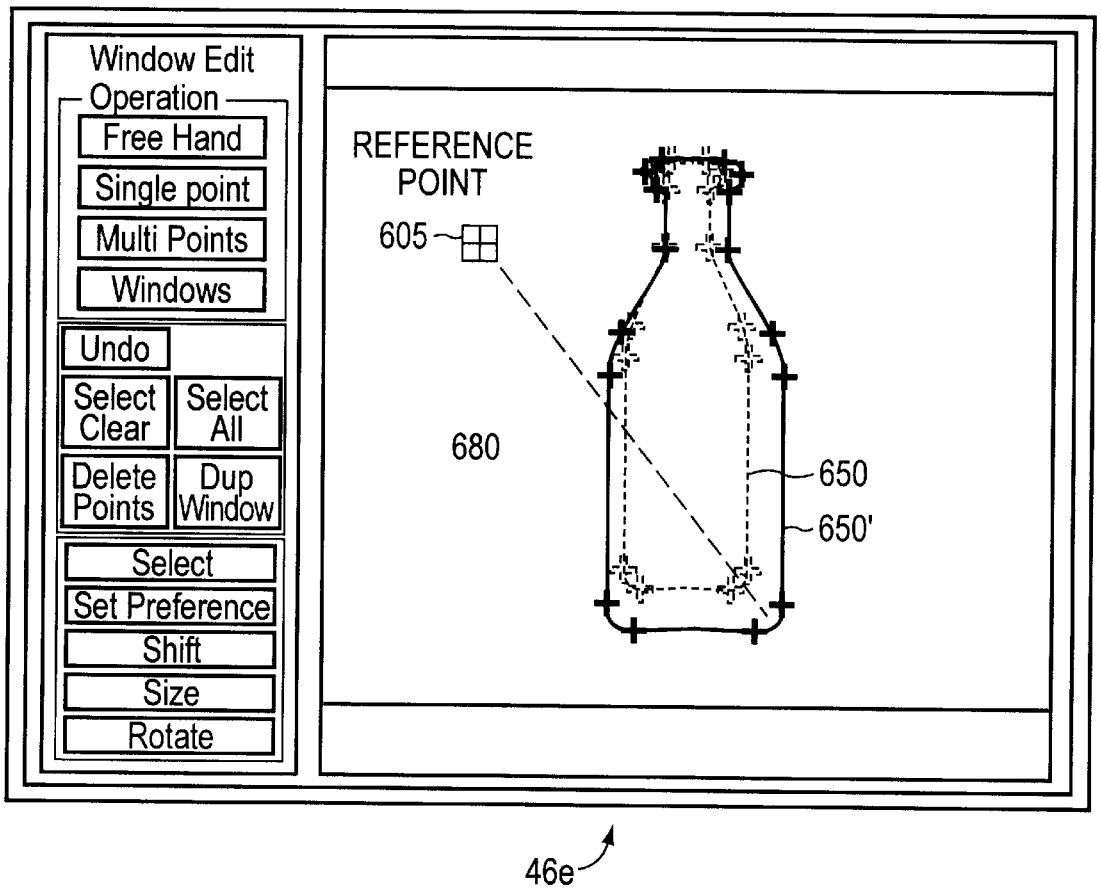
FIG. 30 illustrates the vector window derived from the key of FIG. 21 displayed in the Window Edit window, Windows operation, showing a sizing operation of a user defined window.

FIG. 30 illustrates the Windows Edit mode where the sizing of the selected window is carried out. Again, the s entire window 650 is resized relative to the reference point 605 in the direction of motion of the mouse along the line 680, which results in the resizing of the user defined window to that shown at 650'.

Figure 31:
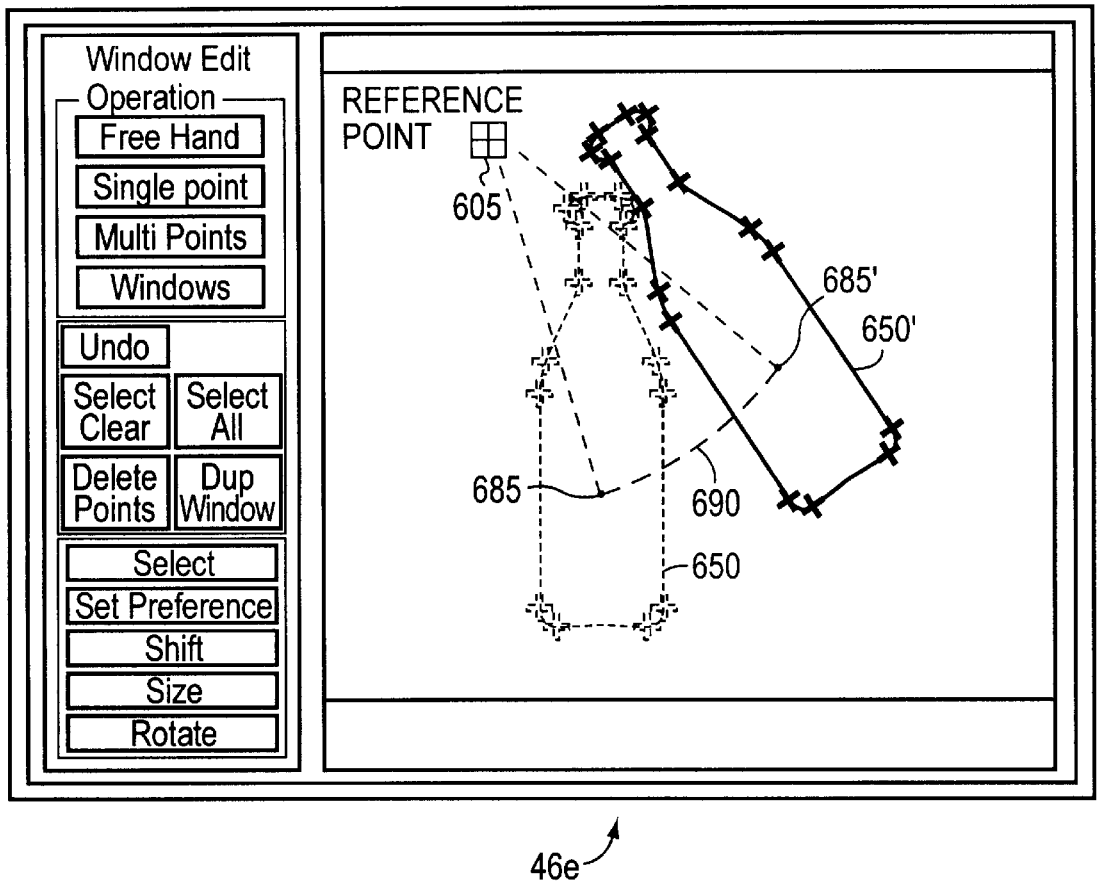
FIG. 31 illustrates the vector window derived from the key of FIG. 21 displayed in the Window Edit window, Windows operation, showing a rotation operation of a user defined window.

FIG. 31 illustrates the Window Edit mode where a selected window 650 is rotated relative to a set reference point 605. As described previously, the rotation operation affects the entire object, as referenced to the center of mass of the object as indicated at the point 685, while maintaining the radius of rotation fixed relative to the reference point 605 to describe an arc 690. The result is the rotation of the object as a whole about an arc defined by a motion of the mouse relative to the reference point 605.

Figure 32:
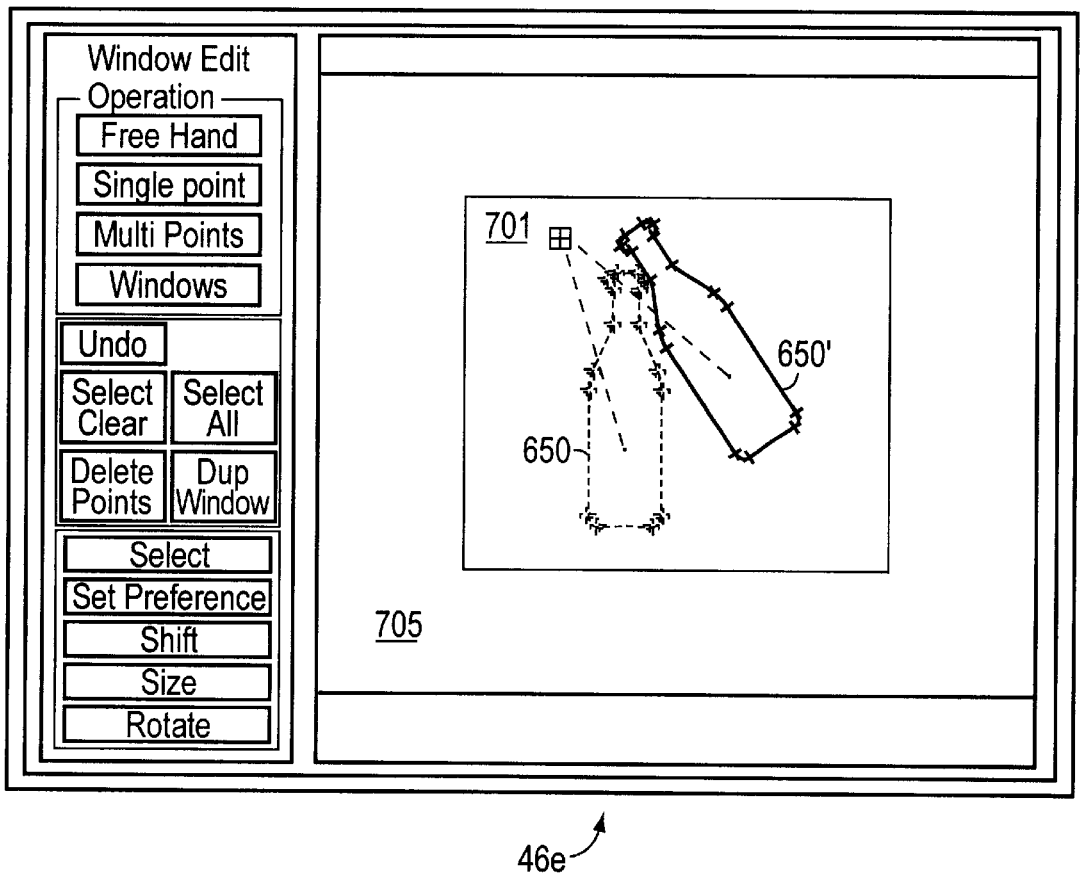
FIG. 32 illustrates the vector window derived from the key of FIG. 21 displayed in the Window Edit window, Windows operation, showing a zoom operation for viewing a user defined window.

FIG. 32 illustrates the Window Edit display 46e, essentially the same display as shown in FIG. 31, when a "zoom" mode has been selected. In a preferred embodiment, the zoom mode is activated by the user pressing a predetermined key on the control panel or workstation keyboard. Entry into the zoom mode causes the displayed image area to be reduced in size, with a rectangle drawn around the image are indicated at 701, thereby showing a "virtual space" comprising the area 705 outside the display area 701. In the disclosed embodiment, the memory space representing the entire area 705 utilizes 16 bits—with 10 bits are employed for defining the displayed region 701, 2 bits are used for defining the virtual space, and 4 bits are provided for accumulated arithmetic errors. These 4-bits are clipped in a clipping operation.

Figure 34:
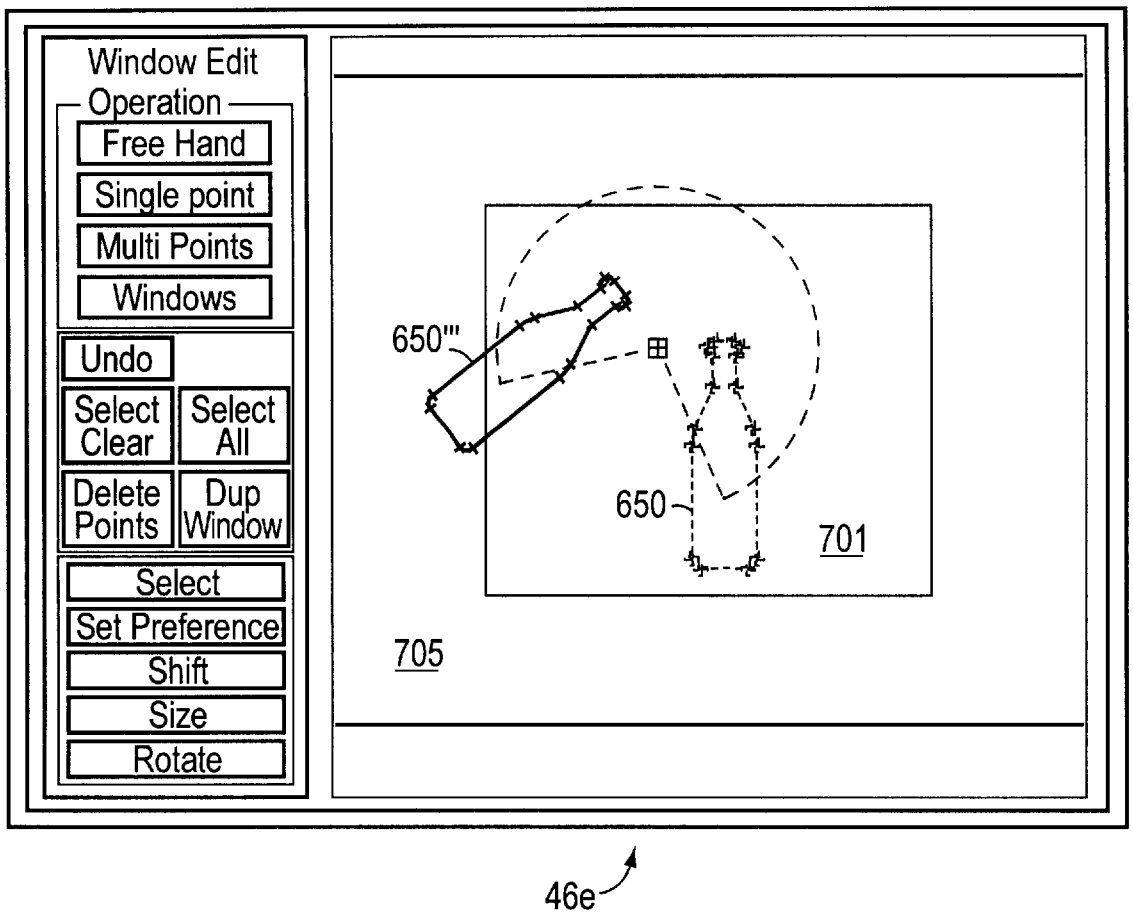
FIG. 34 illustrates the vector window derived from the key of FIG. 21 displayed in the Window Edit window, Windows operation, zoomed, showing a rotation of the user defined window of FIG. 33 back on screen.
Figure 35:
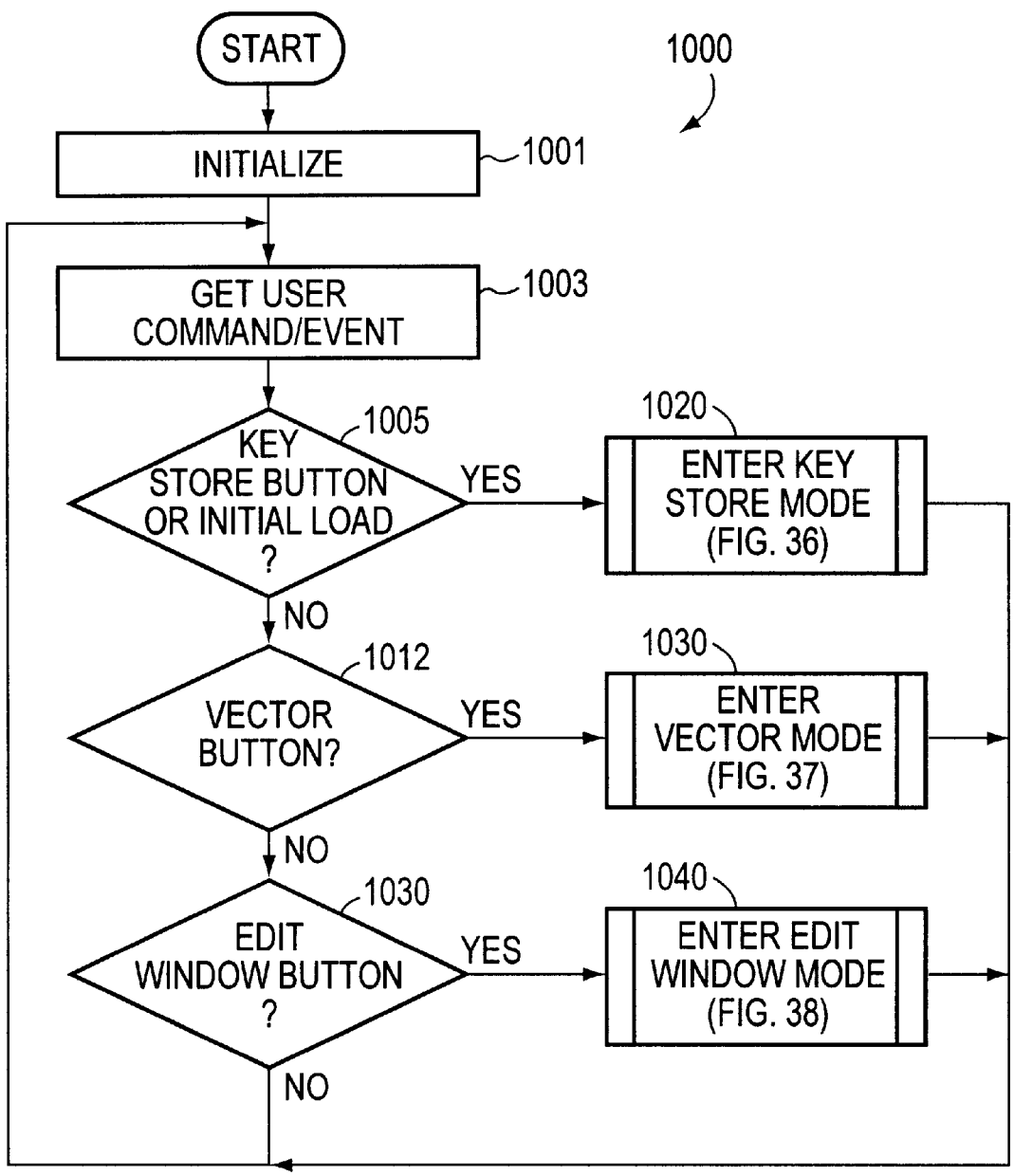
FIG. 35 is a flow diagram of the preferred workstation software that carries out computer-implemented process employed in the present invention.
Figure 36:
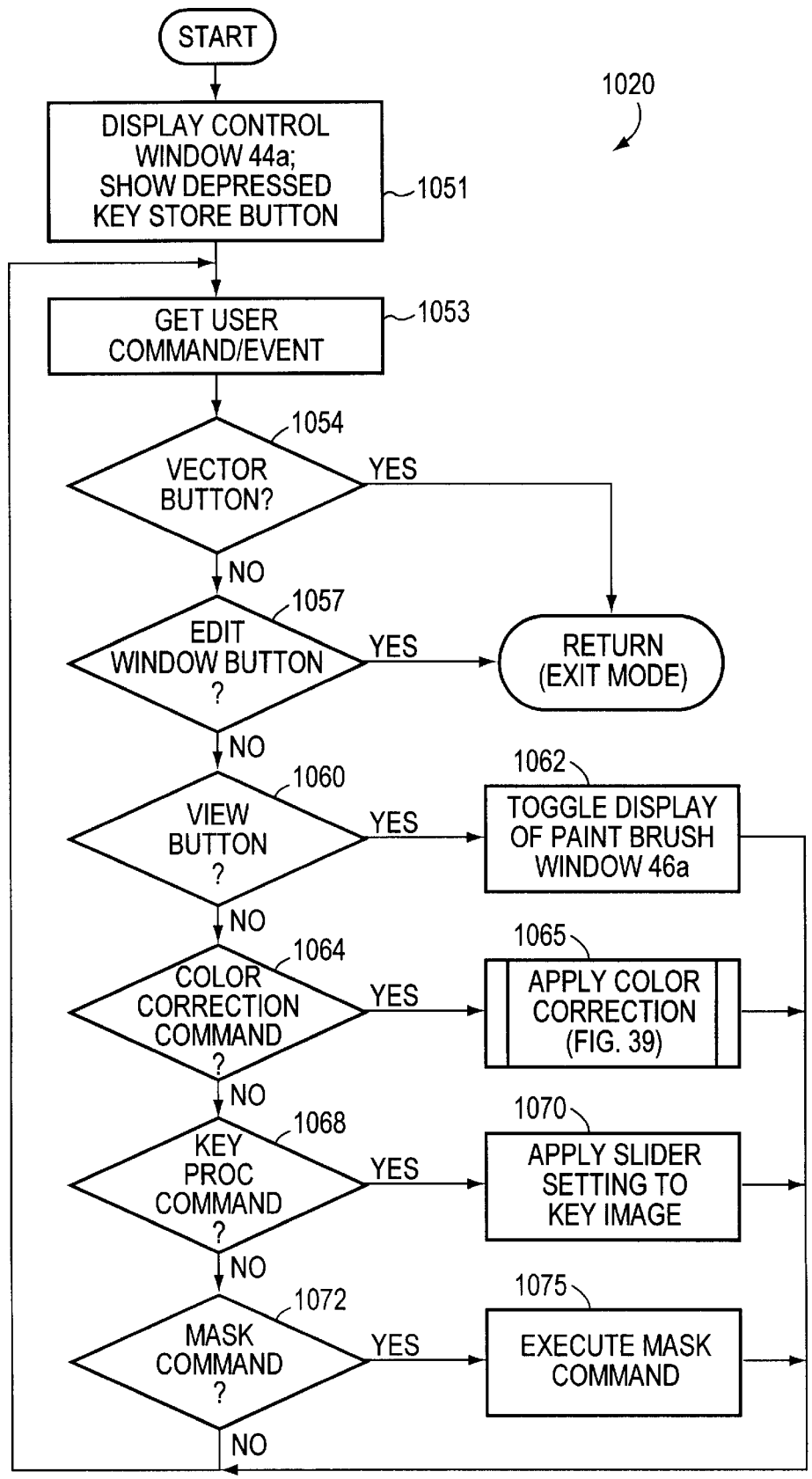
FIG. 36 is a flow diagram of the key store mode computer-implemented process.

FIGS. 34, 35, and 36 illustrate a particular feature of the present invention wherein a selected user defined window may be moved by shifting, rotation, or the like into a virtual space as represented by the region 705, but the location and other attributes of the user defined window are saved and stored so that linear interpolation calculations between a succession of frames in the scene can still be carried out.

Stated in other words, a selected user defined window can be manipulated by the user so that it begins on screen, is moved off screen during a series of operations, and then returns back on screen. An example of this is a rising sun time lapse sequence of images, where the sun rises in the image, extends above the view port (i.e. goes off screen), and then comes back on the screen. By maintaining a space large enough for a motion of a user defined window outside the viewed area, the present invention provides capability for use of user defined window over a succession of images in creative manners.

FIG. 32 illustrates the zoom mode display of an a window 650, with an initial rotation to position shown at 650'.

Figure 33:
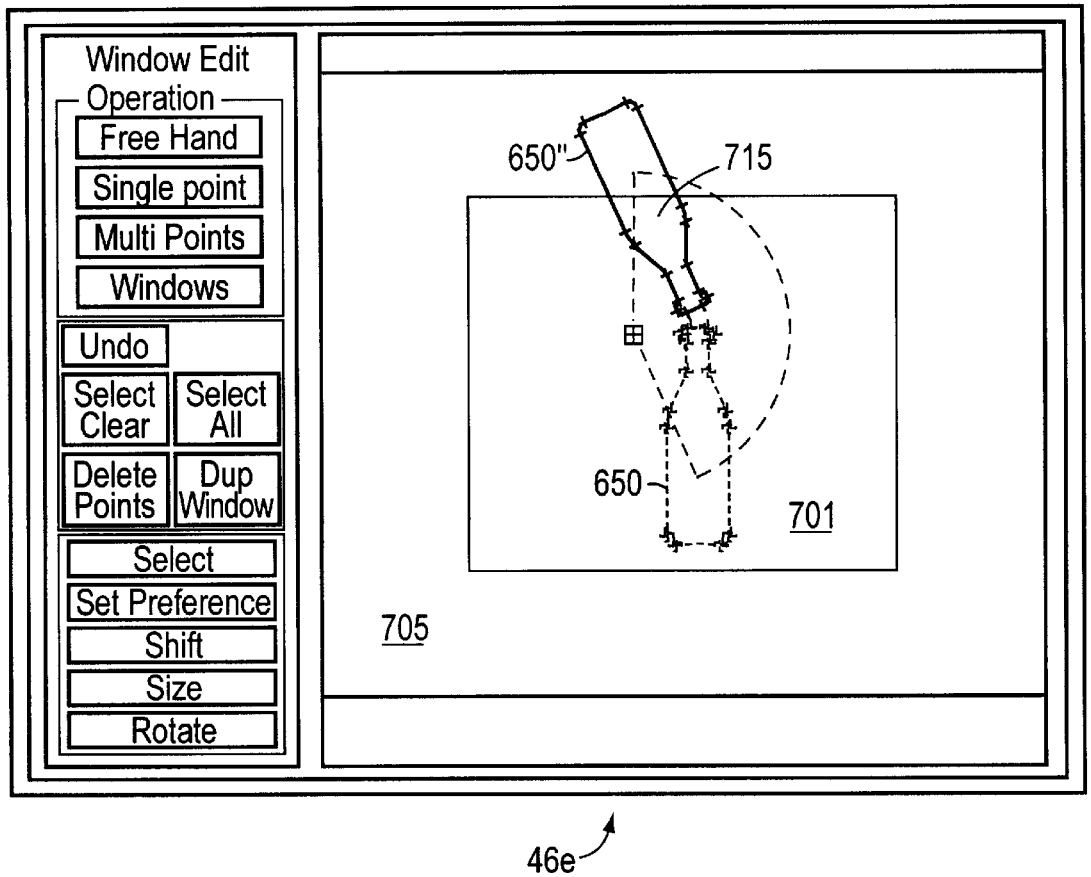
FIG. 33 illustrates the vector window derived from the key of FIG. 21 displayed in the Window Edit window, Windows operation, zoomed, showing a rotation of the user defined window of FIG. 32 into virtual (off screen) space.

FIG. 33, on the other hand, illustrates a continued rotation of the bottle shaped user defined window to the position shown at 650" from the initial position 650. As can be seen, only a portion of the bottle 715 is visible in the display area 701, as the remainder of the user defined window extends into "virtual space" in the region 705. Yet, because of the address space resolution, the user is able to rotate the user defined window completely off screen.

FIG. 34 illustrates continued rotation of the bottle from the initial position at 650 to a final position at 650"' where the user defined window representing the bottle continues to move back on the screen. Accordingly, it will be appreciated that the operations of shifting, sizing, and rotation in the present invention allows a user to easily create different user defined windows for use in interpolation operations in different scenes, by deriving new user defined windows from prior user defined windows. The user can associate such user defined windows with starting and/or ending frames of scenes to facilitate the interpolation of a window from a first window associated with a first frame of a scene to a final window associated with a final frame of the scene.

Preferred Software Methods

FIG. 35 is a flow chart illustrating the steps of a computer-implemented process 1000 carried out in the work station 12 to carry out methods of the present invention described herein. These steps include steps for capturing a keyframe, editing the keyframe to isolate a region of interest for defining a key, deriving a user defined window from the key, and applying image processing in accordance with the user defined window for a sequence of frames in a scene. The sequence of steps in this figure relates to a method for deriving a key and corresponding window for a first frame of a scene, deriving a key and corresponding window for a last frame of a scene, and linearly interpolating between the two user defined windows and applying image processing across the frames in the scene. In particular, the reader is referred to FIG. 4 as an example of the method as carried out.

Starting at step 1001, the first step taken is to initialize the system and load the software for the workstation 12 by allocating a region in memory for handling the software processes and storing relevant data. At step 1003., the program enters an infinite loop of getting a user command or receiving an event that drives subsequent actions. Those skilled in the art will understand that the preferred software is event-driven and actions occur as a result of a user typing a command, pointing with the cursor and clicking on an object, etc.

At decision step 1005, the inquiry is made whether the software has been initially loaded or whether the Key Store button has been depressed. If so, process 1020 is executed and the system enters the key store mode. Steps associated with the key store mode of operation are described in connection with FIG. 36.

If the Key Store button has not been pressed or the current pass is not the initial load, at decision step 1012 the inquiry is made whether the Vector button has been pressed by the user. If so, process 1030 is executed to enter the vector mode. Steps associated with the vector mode of operation are described in connection with FIG. 37. If not, at decision 1030 the inquiry is made whether the Edit Window button has been pressed by the user. If so, process 1040 is executed and the system enters the edit window mode. Steps associated with the edit window mode of operation are described in connection with FIG. 38.

FIG. 36 illustrates the steps of the process 1020 associated with the key store mode of operation. The first step taken at 1051 is to display the control window 44a on the workstation monitor. In this mode, the Key Store button 370 (FIG. 8) is shown in a depressed styled on the display in the manner known to those skilled in the art to indicate operation in the key store mode. At step 1053, within the key store mode, the system enters a loop to detect user commands or events within this mode. At decision 1054, the inquiry is made whether the Vector button has been pressed. If so, the key store mode exits. At decision 1057, the inquiry is made whether the Edit Window button has been pressed. If so, the key store mode exits. At decision 1060, the inquiry is made whether the View button has been pressed. If so, control passes to step 1062, and the system toggles display of the Paint Brush window 46*a* on or off, as appropriate. As will be recalled, from within the Paint Brush window the user may edit the captured key image, edit a brush, etc.

At decision 1064, the inquiry is made whether a color correction command has been issued as a result of the user pressing one of the buttons in the color correction toolbar 508. If so, process 1065 is carried out to apply color correction to any user defined window that may have been previously created, stored, and associated with the particular frame being viewed. Steps associated with the color correction application process 1065 are described in connection with FIG. 39.

At decision 1068, the inquiry is made whether a Key Proc command has been issued. If so, the slider settings of the gain, clip, and limit slider bars (L and H) are applied at step 1070 to the key image presently being displayed.

At decision 1072, the inquiry is made whether a Mask command has been issued by activation of one of the buttons in the mask control region 510 on the control screen 44*a*. As described above, these commands are operative for adding a key, inverting, showing the key on the display, showing 1-bit or 10-bit images, etc. If so, step 1075; is executed to carry out the command. For example, if the user presses the Add Key button on control screen 44*a*, the presently displayed image is grabbed and stored in the K FB circuit 78 (FIG. 1) so that it may be employed to derive a user defined window.

Figure 37:
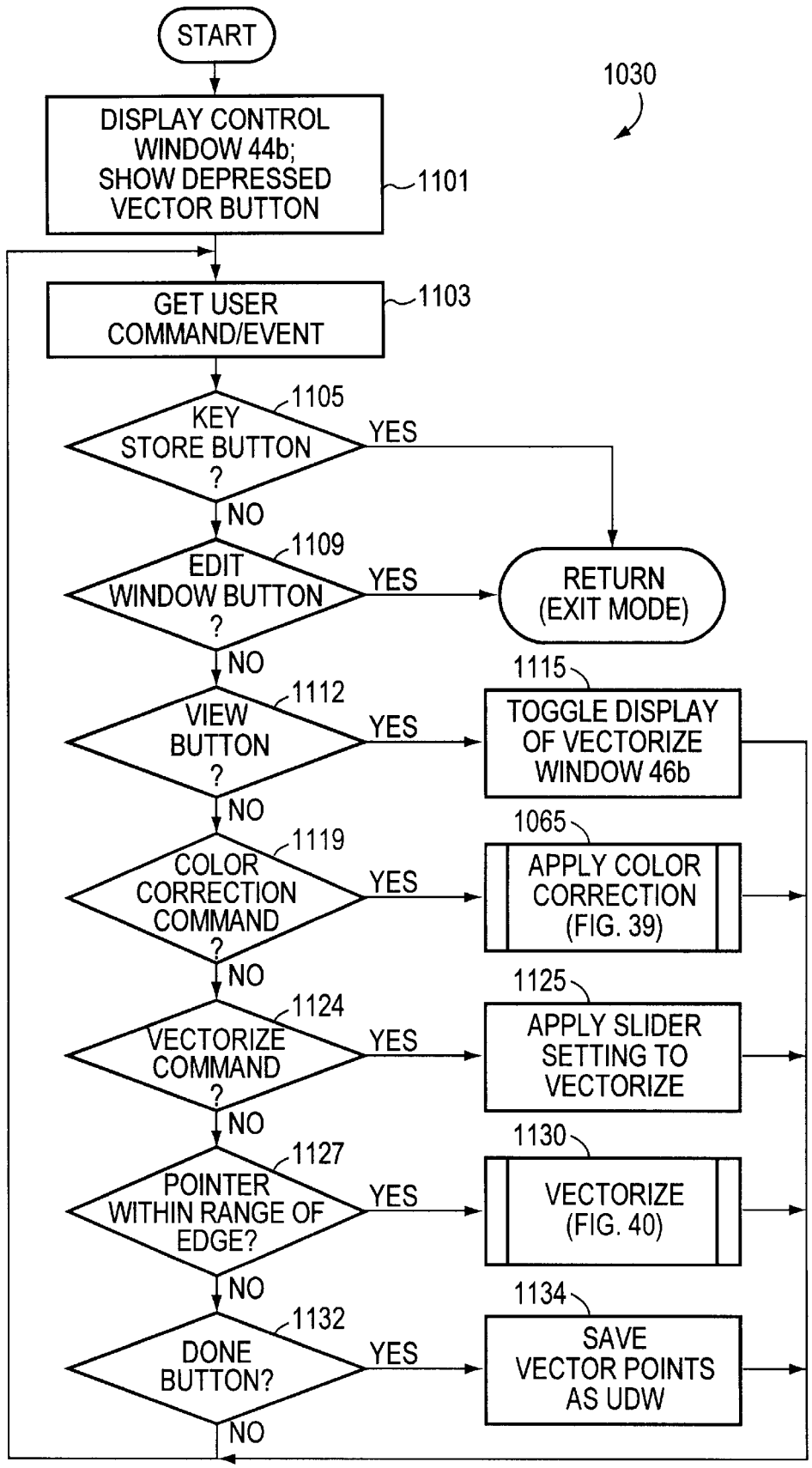
FIG. 37 is a flow diagram of the vector mode computer-implemented process.

FIG. 37 illustrates the steps of the computer-implemented process 1030 associated with the vector mode of operation. Starting at step 1101, the first step taken is to display the control window 44*b*. In this case, the Vector button 375 is shown in a depressed style on the display to visually indicate operation in this mode. The system then enters a loop at step 1103 to detect user commands or events until the mode is exited.

At decision 1105, the inquiry is made whether the Key Store button has been pressed. If so, the vector mode exits. At decision 1109, the inquiry is made whether the Edit Window button has been depressed. If so, the vector mode exits.

At decision 1112, the inquiry is made whether the View button has been pressed. If so, at step 1115 the system toggles display of the Vectorize window 46*b* on or off, as appropriate.

At decision 1119, the inquiry is made whether a color correction command has been issued via the color correction toolbar 508 on the control window 44*b*. If so, the process 1065 to apply color correction is carried out. Steps associated with the color correction process 1065 are described in connection with FIG. 39.

At decision 1124, the inquiry is made whether a vectorize command has been issued via one of the slider bars 422, 424, 425 (FIG. 12). If so, at step 1125 settings of the appropriate minimum distance, alignment tweak, and/or selected points sliders are applied to the vectorize process.

At decision 1127, the inquiry is made whether the pointer or cursor is within range of an edge of an isolated region in a 1-bit image by a predetermined amount. If so, a vectorize process 1130 is carried out to vectorize the key image and create a user defined window. Steps associated with the vectorize process 1130 are described in connection with FIG. 40.

At decision 1132, the inquiry is made as to whether the Done button 404 (FIG. 12) has been pressed. If so, the vector points of the current set of points are saved in memory as the present user defined window associated with the vectorizing process at step 1134.

Figure 38:
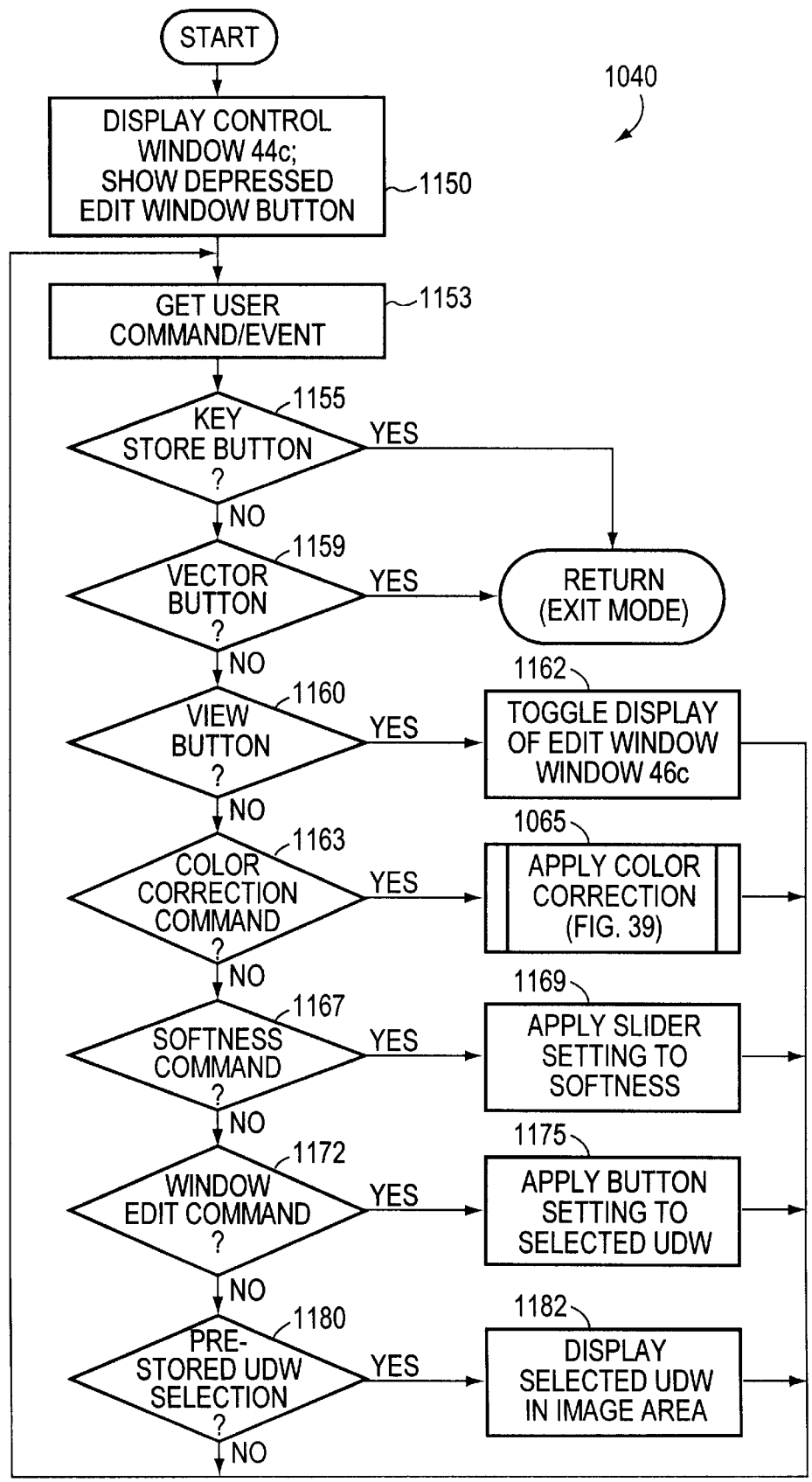
FIG. 38 is a flow diagram of the edit window computer-implemented process.

FIG. 38 illustrates the steps of the computer-implemented process 1040 associated with the edit window mode of operation. The first step taken at 1150 is to display the control window 44*c* (FIG. 14). The Edit Window button 376 is displayed in a depressed style to indicate operation in this mode. The system then enters a loop beginning at step 1153 to get a user command or event associated with operation in the edit window mode.

At decision 1155, the inquiry is made whether the Key Store button 370 has been pressed. If so, the edit window mode exits. At decision 1159, the inquiry is made whether the Vector button 375 has been pressed. If so, the 5 edit window mode exits. At decision 1160, the inquiry is made whether the View button 378 has been pressed. If so, at step 1162 the system toggles display of the Window Edit window 46*c* on or off, as appropriate.

At decision 1163, the inquiry is made whether a color correction command has been issued via the color correction toolbar 508 in the control window 44*c*. If so, the process 1065 is carried out to apply color correction. Steps associated with the color correction application process are described in connection with FIG. 39.

At decision 1167, the inquiry is made as to whether a softness command has been entered by the user. If so, at step 1169 the system applies the slider setting from the softness slider bar 454 to the softness filter.

At decision 1172, the inquiry is made whether a window edit command has been issued via one of the window position control buttons in the area 450 in the control window 44*c*. If so, at step 1175 the control settings or commands are applied to the selected point, group of points, entire user defined window, as appropriate.

At decision 1180, the inquiry is made whether a prestored user defined window has been selected from the prestored vector selection control area 452 in the control window 44*c*. If so, at step 1182 the selected user defined window is displayed in the image area 430.

Figure 39:
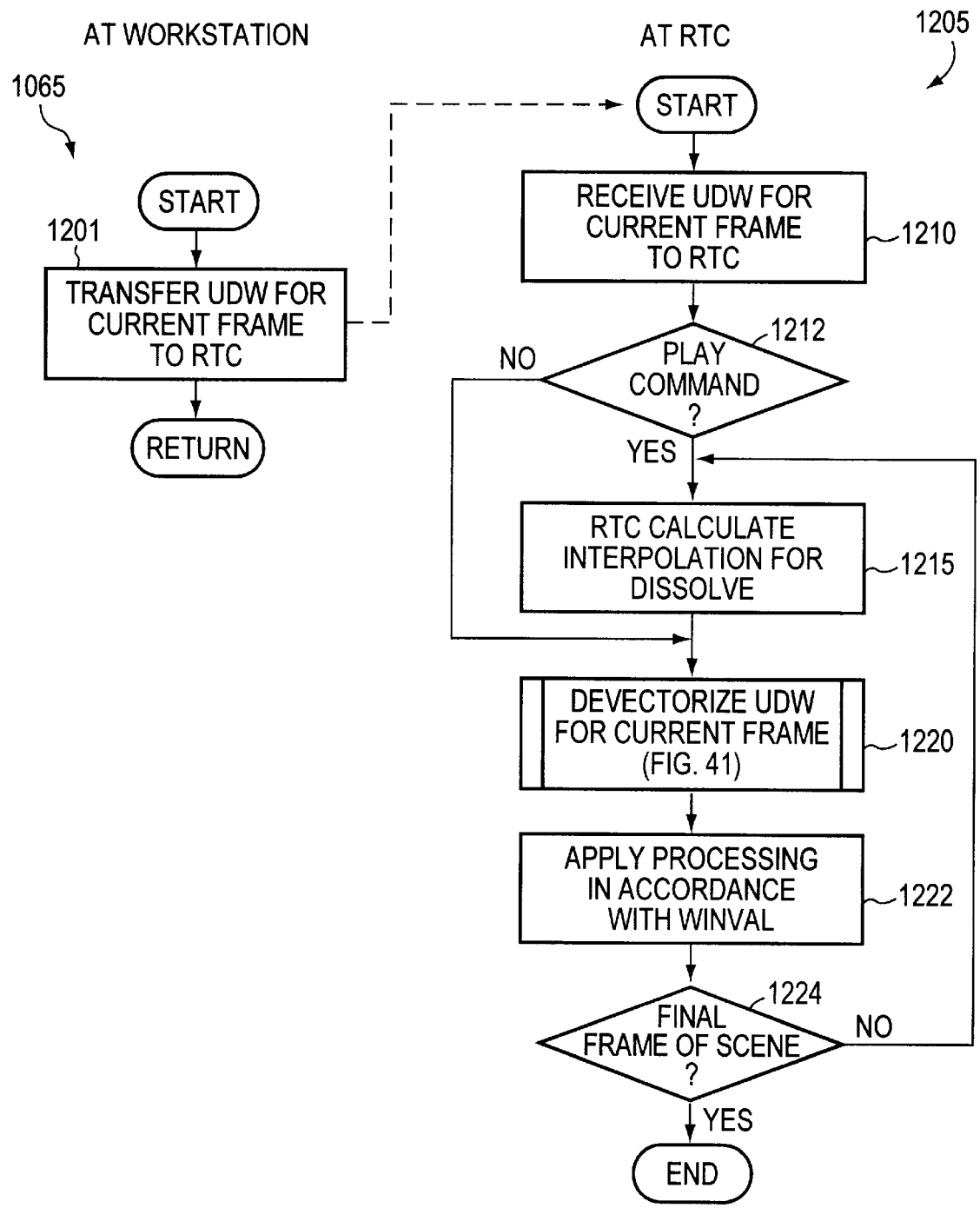
FIG. 39 is a flow diagram of the process of applying image processing, namely color correction to a user defined window.

FIG. 39 illustrates the steps taken of the process 1065 for applying color correction. The principal operation taken at the workstation is at step 1201, which is to transfer the present user defined window for the current frame to the RTC circuit 70 (FIG. 1). At the RTC circuit, a separate process 1205 is executed to receive the user defined window and apply the color correction settings (primary, secondary, etc.) entered by the user to the selected area (inside, outside, etc.). During these operations, user defined windows for the frames of the scene are sent as real time events to the RTC circuit. The RTC, when notified of a window for a beginning frame of a scene and a window for an ending frame of a scene, calculates the "dissolve" function by linearly interpolating between the beginning window and the ending window. The RTC calculations produce a series of single frame events each consisting of a one or more user defined windows associated with a single frame that is passed to the UDW board circuit 75.

Starting the process 1205 at step 1210, the RTC circuit receives the user defined window for the current frame. At decision 1212, the inquiry is made whether a play command has been provided for an entire scene, or whether the present color correction command merely applies to a single frame. If a play command has been received, control passes to step 1215 and the RTC calculates an appropriate user defined window for the present frame, based on a prior or initial frame so as to carry out the dissolve operation. Control then passes to process 1220. Process 1220 carries out devectorizing of the user defined window for the current frame to obtain the bit map matte for application of image processing. Steps associated with the devectorizing process 1220 are described in connection with FIG. 41. After devectorizing, at step 1222 image processing is applied to the image in accordance with the value of WINVAL for the present frame.

After processing is applied, at decision 1224 the inquiry is made whether the present frame is the final frame of a scene (or the only frame being processed). If there are further frames to be processed, e.g. a scene comprising a plurality of frames is being played back, control passes back to step 1215 and a further interpolation is carried out for the dissolve. If at decision 1224 the present frame is the final frame, the process ends.

Figure 40:
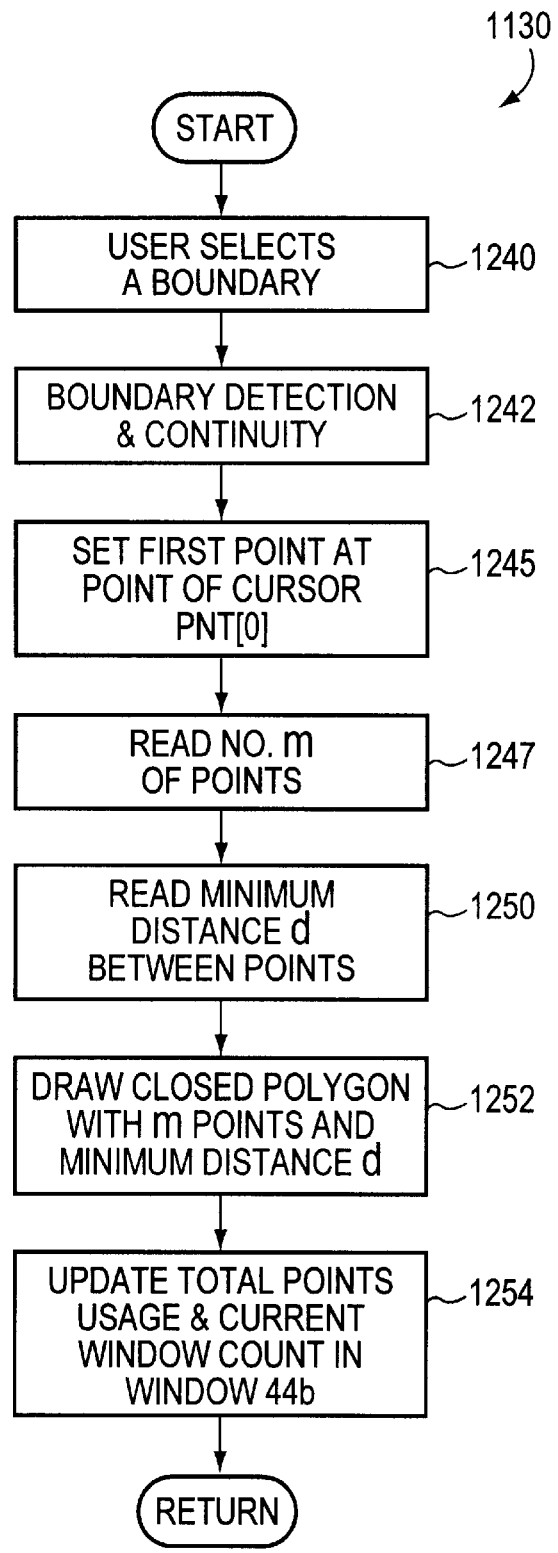
FIG. 40 is a flow diagram illustrating the steps involved in the preferred method for vectorizing.

FIG. 40 illustrates the preferred method of vectorizing 1130 that is carried out in the workstation 12. Briefly stated, this process entails the fitting of a continuous polygon to a region defined by black and white boundaries in the 1-bit key image, within the workstation 12. The vectorization process is carried out in accordance with the settings provided by the user by the pre-vectorizing control screen 44*b* including the number of selected points, the minimum distance between points, and the alignment tweak factor.

The first step taken at step 1240 is detection at the workstation of the coincidence of the cursor or pointer with a boundary of a black/white object (a 1-bit key image). The coordinates of this boundary are stored within the workstation memory as an initial or starting point, designated Pnt0.

At step 1242, a routine is executed for boundary detection and continuity. Those skilled in the art will understand that in order for a continuous polygon to be drawn, a minimum of three points is required, but no more points than indicated by the user is permitted. In many cases, the user will have to increase the number of points to a desired number that permits sufficient matching of the user defined window to the key image. If for some reason it is not possible to create a polygon, for example if the key region extends entirely across the screen, an error condition will be indicated. It is a threshold requirement that the boundary be continuous so as to permit a closed polygon to be drawn around the key image. Thus, at step 1245 the first point is stored in the memory at the point of coincidence of the cursor with the boundary of the key image.

The next step taken is indicated at step 1247, where the system reads the number of points available remaining for the creation of the polygon, m, as well as the minimum distance d between points as indicated at step 1250.

With these parameters, the process moves to step 1252, where a continuous polygon is drawn having m points having a minimum distance d between the points in accordance with the user parameters. As will be understood by those skilled in the art, algorithms are known in the software arts for drawing outline polygon primitives. In the preferred embodiment, a poly-line primitive that closes on itself is created by making the first and last vertices identical. In the preferred method the figure is automatically closed by drawing a line from the last vertex to the first. For the special cases of triangle (3 points) and rectangle (4 points) no special steps are required, as there are predetermined angular constraints between lines of triangles and rectangles. For more complex, irregular continuous polygons, no particular angular constraints can be assumed other than the final vector must closes upon the initial point.

It will be understood that other approaches for finding a "best fit" between a polygon and an object are known in the art, such as mean-square error, and that the present invention is not limited to a particular polygon fitting technique.

After completion of the polygon, at step 12541 the system updates the Total Points Usage display 412 and the Current Window count display 413 (FIG. 12) in the control window 44*b*. The process 1100 is now complete; the points representing the polygon are stored in memory as a user defined window and the process exits.

Figure 41:
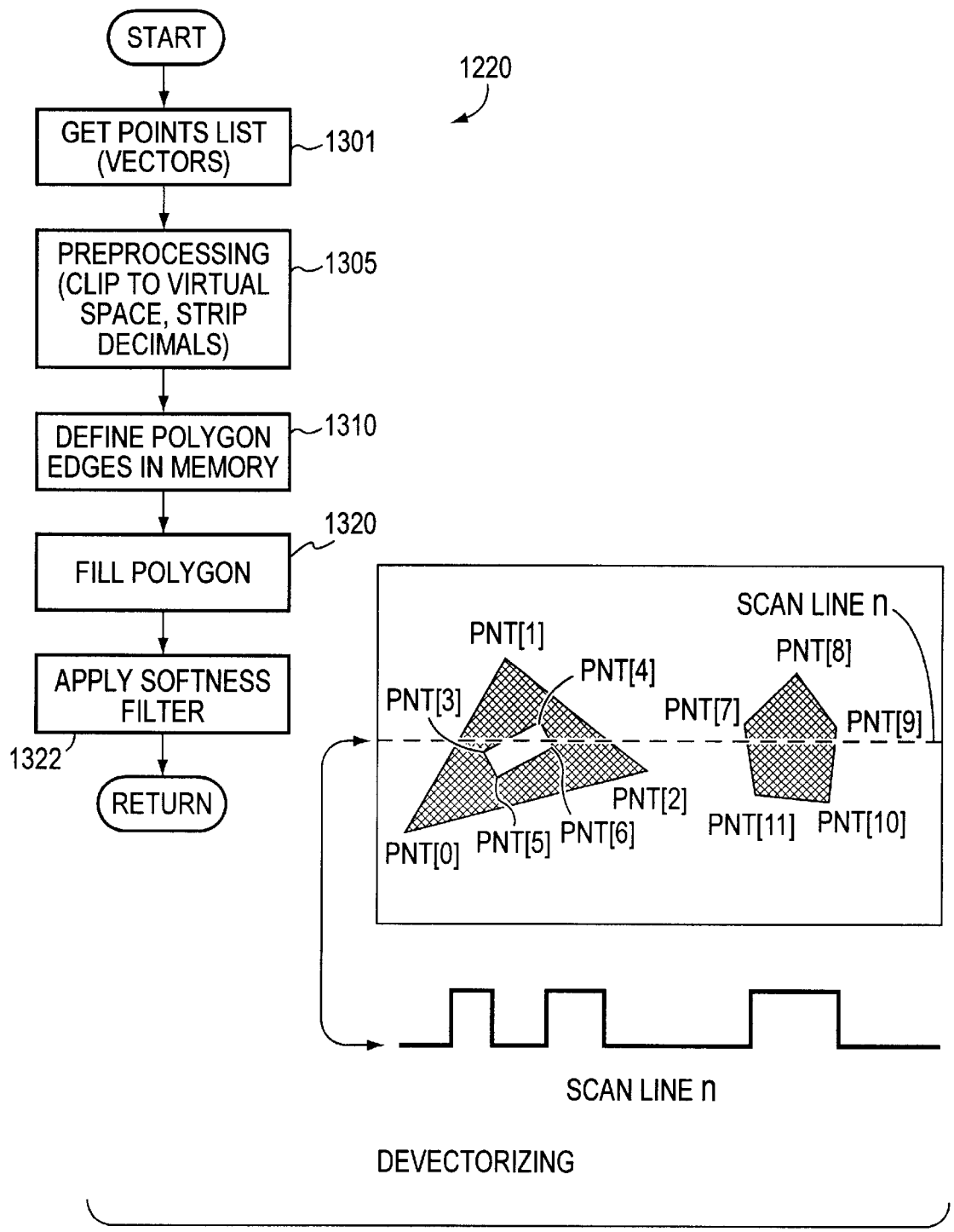
FIG. 41 is a flow diagram illustrating the steps involved in the preferred method for devectorizing, carried out in real time in the UDW board.

FIG. 41 illustrates steps of the preferred method of devectorizing 1220, given one or more continuous polygons representing user defined windows. As previously described, devectorizing involves filling the polygons of the user defined windows to create a bit map matte for applying image processing, with softness filter, on a real time basis. The process 1220 is carried out in the UDW circuit 75 (FIG. 1) in the preferred embodiment.

It will be recalled that the process of converting the user defined vectorized windows to a bit-map matte is s carried within the UDW circuit 75 on a real time basis. Thus, the steps indicated in FIG. 41 comprise portions of the computer software code for the processor 280. Further, the process of converting the vectorized user defined window into a bit-map matte is carried out for an entire frame of 720 pixels per line and 586 lines, as initially stored in the bit-map memory 292.

The first step taken at 1301 is to provide a list of points comprising the user defined window to the UDW board 75. This is stored in the dual port memory 270 as described above. It is further assumed that prior processes to insure the continuity of the polygons have been carried out at the workstation before the creation of the points list.

At step 1305, any required pre-processing is carried out so as to clip the polygon to the visible space. As previously described, a user defined window can extend outside the visible space into the "virtual" space as shown in FIG. 32. Only the visible regions are required, so a clipping operation removes portions of the user defined windows that extend outside the visible region.

At step 1310, points are placed within the bitmap memory 292 indicating the vertices of the polygon, with lines extending therebetween filled with ones to define a line of the polygon.

Then, at step 1320, the polygon is filled on a scan line-by-line basis until the entire polygon is filled. Those skilled in the art will understand that there are a number of known computer-implemented algorithms for polygon filling. The predominant additional concern in the present invention is the provision of open spaces or "holes" which are possible in the present invention, as well as the provision of a plurality of user defined windows. In the invention, any given region is defined by polygon comprising a series of vertices. In the event that one polygon lies completely inside another polygon the interior polygon is deemed to comprise a "white" space and transitions between white and black spaces are made upon encountering borders in the polygon filling routine. This is illustrated in FIG. 41 with a first triangular user defined window represented by points Pnt [1], Pnt [0], and Pnt [2]. A second rectangular user defined window is represented by the points Pnt [3], Pnt [4], Pnt [5], and Pnt [6]. Further there is provided a third user defined window represented by the polygon points Pnt [7] . . . Pnt [11].

It will be understood from an inspection of FIG. 41 that the filling process is carried out by placing 1's (all black) until encountering any border of the same or another polygon, which in case filling of all 0's (white) is carried out until encountering another border. In this fashion, alternating black and white spaces are carried out so that multiple polygon and bit-map mattes are created.

Upon completion of the polygon filling process, the bit-map memory 292 and the UDW board will contain an 1-bit matte comprising 1's at all pixel and line positions within the continuous polygons of the user defined windows, except for interior white spaces At step 1322, the softness filter is applied to the 1-bit matte to create the 8-bit filtered matte which is stored in the memory 305. Those skilled in the art will appreciate that the devectorizing and filtering process should preferably occur within a time frame of 30 milliseconds per frame.

From the foregoing, it will be understood that the UDW circuit devectorizes the one or more windows for each frame to obtain the bit map matte with softness filtering. The matte with softness applied to the edges is transferred in the preferred system to the color correction circuitry 80 so that the window can be applied to effect image processing, in this case color correction, in the selected region.

Image processing is applied in accordance with the value of the 8-bit softness filter adjusted parameter WINVAL, as previously described. The formula for application of image processing is as follows, in the context of application of color correction, where CORR is a parameter indicating a color correction set to be applied inside the user defined window:

Correction inside window=CORR×WINVAL

Color correction outside the window is applied according to the following formula:

Correction outside window=CORR×(255−WINVAL)

It should be understood that the value of 255 represents an 8-bit softness; alternatively, a 10-bit softness could be employed, which would provide 1024 levels of correction. Other softness bit resolutions may be provided if desired.

Accordingly, it will be appreciated that the inside of the window receives maximum image processing (color correction), while the outside of the window gets minimum color correction, with the softness filter being applied progressively in accordance with the boundary.

It will be appreciated that the present invention provides for a variable number of user defined windows, all of which can be employed on a frame-by-frame basis to apply color correction or other types of imaging processing. Because the user defined windows are represented with a predetermined limited number of points, presently 200 points, the dedicated circuitry for computing the 8-bit softness filtered matte can be carried out on a real time basis, once per frame. This allows the user to view the effects of application of the matte over a scene and watch for artifacts in application of color correction or aberrations that might occur because of the movement, geometry changes, or orientation of the region of interest. The user can readily go back and adjust a given scene by defining a sub-scene having a fewer number of frames if the linear interpretation between windows is unsatisfactory.

Furthermore, for a scene having complex trajectories of a user defined window such as an arc or a nonlinear path, the user can break the scene into a plurality of sub-scenes that are connected by piecewise linear segments. In this manner, any curved or nonlinear trajectories can be represented by a number of sub-scenes which are fitted together in piecewise linear basis a segment at a time to create the desired user window trajectory.

Figure 42:
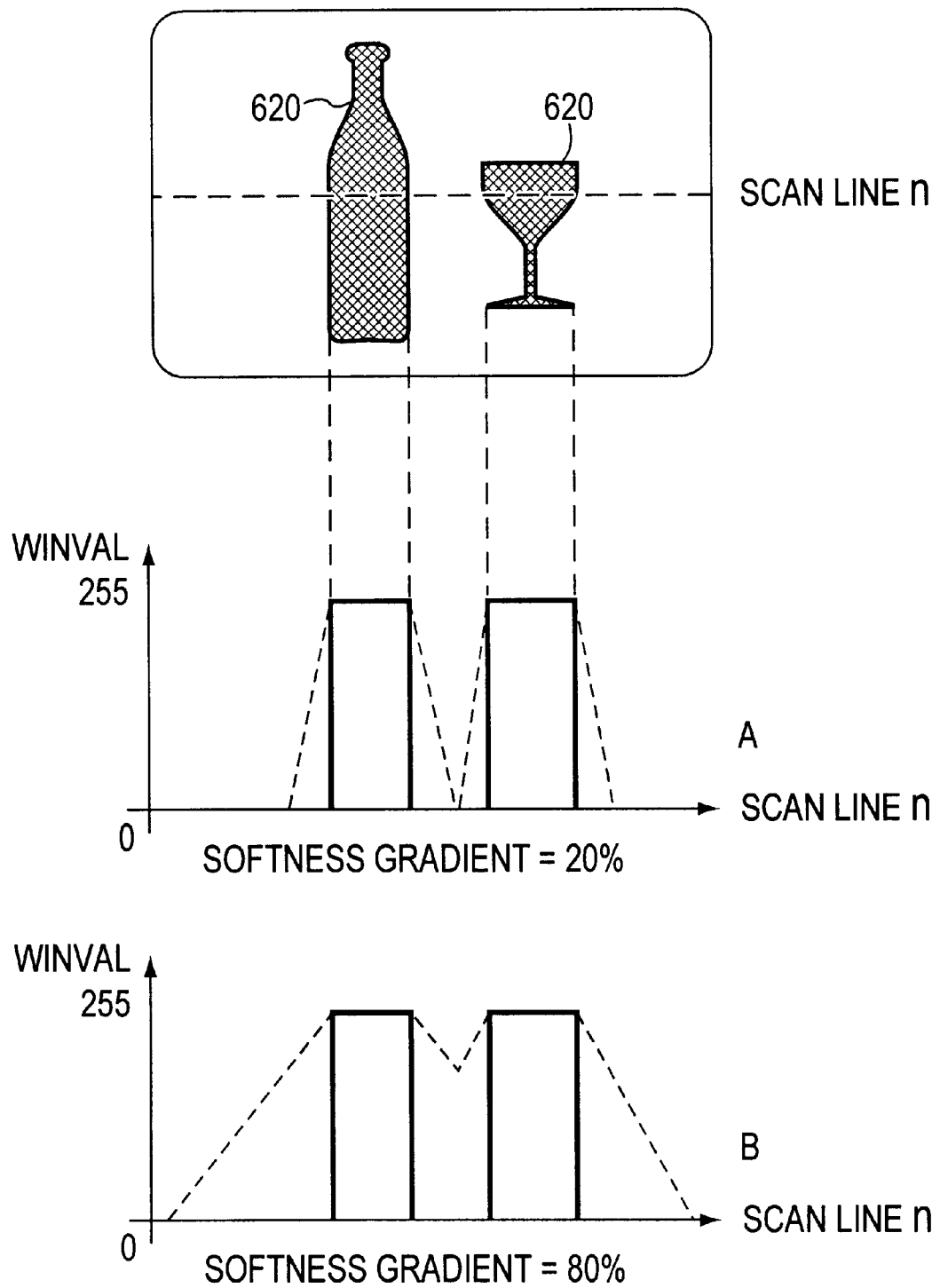
FIG. 42 illustrates the application of a control gradient to the softness filter.

FIG. 42 illustrates the application of the softness filter gradient. Assume the exemplary image of bottle 620 and glass 625. The 8-bit image processing application parameter WINVAL is illustrated for a single scan line n, at two different softness filter gradients 20% and 80%. The softness filter has 256 possible levels is shown in dotted lines. Adjustment of the Softness slider bar 454 in the control window 44c (FIG. 14) effectively controls the slope or gradient of the transition from zero correction to full correction. The gradient is adjusted by controlling the slope of the softness filter as "attached" to the boundary of the image area. The system calculates the intersection of the filter gradient along the line and applies progressive gradations from 0 to 255, depending on the setting of the Softness slider bar.

As can be seen, a relatively small softness value (e.g. 20%) results in a relatively steep gradient, and therefore a relatively sharp transition from a region of no color correction to a region of maximum color correction. On the other hand, a relatively large softness value (e.g. 80%) results in a less steep gradient that extends further from the boundary of the image area, and therefore a relatively gradual transition from a region of no color correction to a region of maximum color correction.

In view of the foregoing description of the preferred embodiments of the present invention, other embodiments will suggest themselves to those skilled in the art. Therefore, the scope of the present invention is to be limited only by the claims set forth below.

What is claimed is:

1. A computer-implemented process for selectively applying image processing to a selected region of a target image provided by an image source, the process being carried out in a computer system coupled to the image source, comprising the steps of:

obtaining a key frame image from an image provided by an image source;

in response to user commands, defining a key from the key frame image, the key corresponding to the selected region of interest for applying image processing to the target image;

automatically vectorizing the region of interest in the key to derive a user defined window; and applying image processing within the region of the target image corresponding to the user defined window of the key.

2. The computer-implemented process of claim 1, wherein the image processing is selected from the group color correction, image compression, noise reduction, colorization, and animation.

3. The computer-implemented process of claim 1, wherein the step of automatically vectorizing comprises drawing a continuous polygon drawn around the selected region of interest in the key, the continuous polygon comprising a predetermined number of points specified by the user.

4. The computer-implemented process of claim 1, further comprising the step of:

in response to user commands, editing characteristics of the user defined window to allow the user to adapt the window to the key.

5. The computer-implemented process of claim 1, further comprising the steps of:

in response to a user command, capturing the luminance characteristics of the key frame image from the image source in a key frame buffer;

in response to user commands, adjusting video parameters of the key frame image in the key frame buffer to isolate a region of interest according to video characteristics; and in response to user commands, adjusting regions of the key frame image to isolate the region of interest according to geometric characteristics.

6. The computer-implemented process of claim 1, further comprising the steps of:

in response to user commands, defining a first user defined window for a first frame of a scene comprising a plurality of images;

in response to user commands, defining a second user defined window for a last frame of the scene;

automatically transforming the first user defined window into the second user defined window during the plurality of images during a playback of the scene;

applying the image processing within the region defined by the user defined windows for each frame of the scene during playback on a real time basis.

7. The computer-implemented process of claim 6, wherein the step of automatically transforming the first user defined window into the second user defined window comprises linearly transforming corresponding points of the first user defined window to corresponding points of the second user defined window successively for each frame of the plurality of frames in the scene.

8. The computer-implemented process of claim 1, further comprising the step of applying a softness filter to boundaries of the user defined window so as to apply image processing on a predetermined gradient.

9. The computer-implemented process of claim 1, wherein the user defined window created in the step of automatically vectorizing is limited to a predetermined number of points that can be devectorized on a real time basis to create a digital matte for applying the image processing.

10. The computer-implemented process of claim 1, further comprising the step of deriving a plurality of user defined windows corresponding to a plurality of regions of interest for applying image processing.

11. The computer-implemented process of claim 1, further comprising the step of applying a different type of image processing to regions of the image outside the user defined window.

12. The computer-implemented process of claim 11, wherein the step of applying image processing within the region of the image defined by the user defined window comprises applying a first set of color corrections in a scene-by-scene color corrector; and wherein the step of applying image processing to regions of the image outside the user defined window comprises applying a second set of color corrections.

13. A system for selectively applying image processing to a selected region of an image on a frame by frame basis in a scene comprising a plurality of frames, comprising:

a memory for storing at least one user defined window corresponding to the selected region in one of the images of the scene, the user defined window comprising a vector representation of the selected region;

a component for spatially transforming the at least one user defined window defined for a first frame of the scene into a user defined window for a final frame of the scene, thereby providing a transforming succession of user defined windows, one associated with each frame of the scene;

a component for deriving from the user defined window a matte corresponding to each user defined window of the transforming succession in real time on a frame by frame basis, each matte including a processing region; and a component for applying image processing within the processing region of each frame corresponding to the user defined window associated with each frame.

14. The system of claim 13, further comprising:

a component for capturing and storing a key frame image from one of the frames of the scene, and a component for isolating a bit map key from the stored key frame image, the key corresponding to the selected region for applying image processing; and a component for automatically vectorizing the key to derive a user defined window.

15. The system of claim 14, further comprising:

user controls for adjusting video parameters of the key frame image to isolate the region of interest according to video characteristics;

user controls for adjusting regions of the key frame image to isolate the region of interest according to geometric characteristics.

16. The system of claim 13, further comprising user controls for editing characteristics of the user defined window to allow the user to adapt the window to the region of interest.

17. The system of claim 16, wherein the user controls for editing characteristics of the user defined window include a tool for adjusting the number of points representing the vector representation of the window.

18. The system of claim 13, wherein the user controls for editing characteristics of the user defined window include a tool for adjusting the location of one or more selected points of a window.

19. The system of claim 13, wherein the component for applying image processing comprises:

a circuit responsive to the user defined window for devectorizing the window to obtain a digital matte;

an image processing device; and a keyer for applying image processing via the image processing device in accordance with regions corresponding to the digital matte.

20. The system of claim 19, wherein the digital matte comprises an array of digital values of a predetermined resolution, and wherein the image processing is applied in accordance with the values of the array of the digital values.

21. The system of claim 20, further comprising a softness filter operative for applying image processing on a predetermined gradient to boundaries of the user defined window.

22. The system of claim 19, wherein the image processing device is a digital scene-by-scene color corrector.

23. A computer-implemented process for creating a user defined window for applying image processing to a target image, the process being carried out in a computer system coupled to an image source, comprising the steps of:

in response to a user command, capturing in a key frame buffer the luminance characteristics of a key frame image corresponding to a target image obtained from the image source;

in response to user commands, adjusting video parameters of the key frame image in the key frame buffer to define a region of interest according to video characteristics;

in response to user commands, adjusting regions of the key frame image to define the region of interest according to geometric characteristics;

in response to a user command, vectorizing the region of interest to derive a user defined window comprising a continuous polygon drawn around the key frame image, the continuous polygon comprising a predetermined number of points specified by the user;

in response to user commands, editing characteristics of the user defined window to allow the user to adapt the continuous polygon to an outline of the region of interest in the key frame image; and applying image processing to the target image within the region defined by the user defined window.

24. The computer-implemented process of claim 23, wherein the video parameters of the key frame image comprise the luminance values of the image.

25. The computer-implemented process of claim 23, wherein the step of adjusting parameters of the key frame image to isolate the region of interest according to video characteristics is effected in response to the use of gain, clip, and limit user controls.

26. The computer-implemented process of claim 23, wherein the key frame image is stored as an array of 10-bit luminance values, and further comprising the step of converting the 10-bit luminance values to a 1-bit high contrast image prior to the step of vectorizing.

27. The computer-implemented process of claim 23, wherein the step of adjusting regions of the key frame image to isolate the region of interest according to geometric characteristics is effected in response to the use of a brush tool by the user.

28. The computer-implemented process of claim 23, wherein the step of editing characteristics of the user defined window comprises adjusting the number of points representing the window.

29. The computer-implemented process of claim 23, wherein the step of editing characteristics of the user defined window comprises adjusting the location of one or more selected points of the window.

30. The computer-implemented process of claim 23, further comprising the step of storing the 1-bit key image in memory for later recall, further editing, or use.

31. The computer-implemented process of claim 23, further comprising the step of storing the edited user window in memory for later recall, further editing, or use.

32. The computer-implemented process of claim 23, further comprising steps for:

in response to user commands, defining a first user defined window for a first frame of a scene comprising a plurality of images;

in response to user commands, defining a second user defined window for a last frame of the scene;

automatically transforming the first user defined window into the second user defined window during the plurality of images during a playback of the scene;

applying the image processing within the region defined by the user defined window for each frame of the scene.

33. The computer-implemented process of claim 32, wherein the step of automatically transforming the first user defined window into the second user defined window during the plurality of images during a playback of the scene comprises linearly transforming corresponding points of the first user defined window to corresponding points of the second user defined window successively for each frame of the plurality of frames in the scene.

34. The computer-implemented process of claim 32, wherein the step of automatically transforming the first user defined window into the second user defined window during the plurality of images during a playback of the scene is carried out at a real time rate.

35. The computer-implemented process of claim 23, wherein the process is carried out in a computer-based workstation associated with a scene-by-scene color corrector.

36. The computer-implemented process of claim 23, wherein the image source is associated with a scene-by-scene color corrector.

37. The computer-implemented process of claim 23, further comprising the steps of applying a softness filter to boundaries of the user defined window so as to apply image processing on a predetermined gradient.

38. A system for creating a user defined window for applying image processing to a target image, comprising:

a computer system including a memory, a processor, a display, and user interface devices;

a component for capturing and storing a key frame image corresponding to the target image in the memory;

at least one user control for adjusting at least one parameter of the key frame image to define a region of interest for applying image processing;

a component for vectorizing the defined region of the key frame image to derive a user defined window comprising a continuous polygon drawn around the defined region of interest in the key frame image, the continuous polygon comprising a predetermined number of points specified by the user;

user tools for editing characteristics of the user defined window to allow the user to adapt the continuous polygon to the outline of the defined region of interest in the key frame image; and a component for applying image processing to the target image within the region corresponding to the user defined window.

39. The system of claim 38, wherein the video parameters of the key frame image comprise the luminance values of the target image.

40. The system of claim 38, wherein the at least one user control for adjusting at least one parameter of the key frame image to define the region of interest comprise video gain, clip, and limit controls.

41. The system of claim 38, wherein the key frame image is stored as an array of 10-bit luminance values and further comprising a component for converting the 10-bit luminance values to a 1-bit high contrast image prior to provision to the vectorizing component.

42. The system of claim 38, wherein the user controls for adjusting regions of the key frame image to define the region of interest according to geometric characteristics include a software brush tool.

43. The system of claim 38, wherein the user controls for adjusting regions of the key frame image according to geometric characteristics include tools for adjusting the number of points representing a window.

44. The system of claim 38, wherein the user controls for adjusting regions of the key frame image according to geometric characteristics include tools for adjusting the location of one or more selected points of a window.

45. The system of claim 38, further comprising a component storing the key frame image in memory for later recall, further editing, or use.

46. The system of claim 38, further comprising a component for storing the user defined window in memory for later recall, further editing, or use.

47. The system of claim 38, wherein the component for applying image processing comprises:
a circuit responsive to the user defined window for devectorizing the window to obtain a digital matte;
an image processing device; and
a keyer for applying image processing via the image processing device in accordance with regions corresponding to the digital matte.

48. The system of claim 47, wherein the digital matte comprises an array of digital values of a predetermined resolution, and wherein the image processing is applied in accordance with the values of the array of the digital values.

49. The system of claim 47, further comprising a softness filter operative for applying image processing on a predetermined gradient to boundaries of the user defined window.

50. The system of claim 47, wherein the image processing device is a scene-by-scene color corrector.

51. The system of claim 50, wherein the system is operative for:
defining a first user defined window for a first frame of a scene comprising a plurality of images;
defining a second user defined window for a last frame of the scene;
automatically transforming the first user defined window into the second user defined window during the plurality of images during a playback of the scene;
applying the image processing within the region defined by the user defined window for each frame of the scene.

52. The system of claim 51, wherein the operation of automatically transforming the first user defined window into the second user defined window during the plurality of images during a playback of the scene comprises linearly transforming corresponding points of the first user defined window to corresponding points of the second user defined window successively for each frame of the plurality of frames in the scene.

53. The system of claim 51, wherein the operation of automatically transforming the first user defined window into the second user defined window during the plurality of images during a playback of the scene is carried out at a real time rate.

54. A computer-implemented process for applying image processing to a scene of images comprising a plurality of frames, the process being carried out in a computer system coupled to an image source, the computer system including a processor, a display and a memory, comprising the steps of:
obtaining a first key frame image from an image provided by an image source;
defining a first user defined window comprising a continuous polygon corresponding to a region of interest in the key frame image;
storing the first user defined window in the memory;
obtaining a second key frame image from an image provided by the image source;
defining a second user defined window comprising a continuous polygon corresponding to a region of interest in the second key frame image;

storing the second user defined window in the memory;
retrieving the first user defined window from the memory;
displaying the first user defined window on the display;
in response to user commands, modifying the first user defined window to adapt the first user defined window to a region of interest in a first frame of the scene;
retrieving the second user defined window from the memory;
displaying the second user defined window on the display;
in response to user commands, modifying the second user defined window to adapt the second user defined window to a region of interest in a final frame of the scene;
automatically transforming the first user defined window into the second user defined window during playback of the scene from the first frame of the scene to the final frame of the scene; and
applying the image processing within the region defined by the user defined window for each frame of the scene during playback of the scene.

55. The computer-implemented process of claim 54, further comprising the steps of:
in response to a user command, capturing the key frame image from a selected image of the scene in the memory;
in response to user commands, defining the region of interest in the key frame image; and
in response to a user command, vectorizing the region of interest the key image to derive the user defined window.

56. The computer-implemented process of claim 55, wherein the step of defining the region of interest in the key frame image comprises adjusting video parameters of the key frame image to isolate the region of interest according to video characteristics.

57. The computer-implemented process of claim 56, wherein the step of adjusting video parameters of the key frame image is effected in response to the use of gain, clip, and limit user controls.

58. The computer-implemented process of claim 55, wherein the key frame image is stored as an array of 10-bit luminance values, and further comprising the step of converting the 10-bit luminance values to a 1-bit high contrast image prior to the step of vectorizing.

59. The computer-implemented process of claim 55, wherein the step of defining the region of interest in the key frame image comprises adjusting regions of the key frame image according to geometric characteristics.

60. The computer-implemented process of claim 59, wherein the step of adjusting regions of the key frame image according to geometric characteristics is effected in response to the use of a brush tool by the user.

61. The computer-implemented process of claim 54, further comprising the steps of:
in response to user commands, editing characteristics of the user defined window to allow the user to adapt the continuous polygon to the outline of the region of interest.

62. The computer-implemented process of claim 54, wherein the steps of modifying a user defined window comprises adjusting the number of points representing a window.

63. The computer-implemented process of claim 54, wherein the steps of modifying a user defined window comprises adjusting the location of one or more selected points of a window.

64. The computer-implemented process of claim 54, wherein the step of automatically transforming the first user defined window into the second user defined window during playback of the scene comprises linearly transforming corresponding points of the first user defined window to corresponding points of the second user defined window successively for each frame of the plurality of frames in the scene.

65. The computer-implemented process of claim 64, wherein the step of automatically transforming the first user defined window into the second user defined window during the plurality of images during a playback of the scene is carried out at a real time rate.

66. The computer-implemented process of claim 54, wherein the process is carried out in a computer-based workstation associated with a scene-by-scene color corrector.

67. The computer-implemented process of claim 54, further comprising the steps of applying a softness filter to boundaries of the user defined windows so as to apply image processing on a predetermined gradient.

68. The computer-implemented process of claim 1, further comprising the steps of:

deriving a matte corresponding to the user defined window, the matte including a processing region, and wherein the step of applying image processing within the region of the target image corresponding to the user defined window comprises image processing within the processing region.

69. The system of claim 38, wherein the parameters of the key frame image comprise video parameters.

70. The system of claim 38, wherein the parameters of the key frame image comprise geometric characteristics.

71. The system of claim 38, wherein the parameters of the key frame image comprise geometric parameters.

* * * * *